US009181484B2

(12) United States Patent
Tojo et al.

(10) Patent No.: US 9,181,484 B2
(45) Date of Patent: Nov. 10, 2015

(54) COMPOUND HAVING 2-FLUOROPHENYLOXYMETHANE STRUCTURE

(71) Applicant: DIC CORPORATION, Tokyo (JP)

(72) Inventors: Kenta Tojo, Kita-adachi-gun (JP); Tetsuo Kusumoto, Kita-adachi-gun (JP); Masashi Osawa, Kita-adachi-gun (JP); Masakazu Kaneoya, Kita-adachi-gun (JP); Kiyofumi Takeuchi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/353,417

(22) PCT Filed: Apr. 24, 2013

(86) PCT No.: PCT/JP2013/062077
§ 371 (c)(1),
(2) Date: Apr. 22, 2014

(87) PCT Pub. No.: WO2013/172162
PCT Pub. Date: Nov. 21, 2013

(65) Prior Publication Data
US 2015/0087847 A1      Mar. 26, 2015

(30) Foreign Application Priority Data
May 15, 2012    (JP) ................................. 2012-111507

(51) Int. Cl.
| | | |
|---|---|---|
| *C07D 315/00* | (2006.01) | |
| *C09K 19/52* | (2006.01) | |
| *C09K 19/30* | (2006.01) | |
| *C09K 19/12* | (2006.01) | |
| *C09K 19/00* | (2006.01) | |
| *C09K 19/34* | (2006.01) | |
| *C09K 19/20* | (2006.01) | |
| *C09K 19/32* | (2006.01) | |
| *C09K 19/04* | (2006.01) | |

(52) U.S. Cl.
CPC .............. *C09K 19/3402* (2013.01); *C09K 19/20* (2013.01); *C09K 19/3066* (2013.01); *C09K 19/322* (2013.01); *C09K 2019/0466* (2013.01); *C09K 2019/3422* (2013.01)

(58) Field of Classification Search
CPC ... C09K 19/12; C09K 19/544; C09K 19/3003
USPC ........... 549/427; 252/299.01, 299.66, 299.63; 428/1.1
See application file for complete search history.

(56) References Cited

U.S. PATENT DOCUMENTS

| | | | |
|---|---|---|---|
| 5,032,313 A | 7/1991 | Goto et al. | |
| 5,324,449 A | 6/1994 | Kurmeier et al. | |
| 5,487,845 A | 1/1996 | Reiffenrath et al. | |
| 6,200,654 B1 | 3/2001 | Poetsch et al. | |
| 6,210,603 B1 * | 4/2001 | Kondo et al. | ............ 252/299.66 |
| 6,579,577 B2 * | 6/2003 | Kondo et al. | .................. 428/1.1 |
| 2005/0092966 A1 | 5/2005 | Heckmeier et al. | |
| 2009/0302273 A1 | 12/2009 | Tanaka | |
| 2010/0127211 A1 | 5/2010 | Tanaka | |
| 2010/0328600 A1 | 12/2010 | Shimada et al. | |
| 2011/0193022 A1 | 8/2011 | Tanaka et al. | |

FOREIGN PATENT DOCUMENTS

| | | | |
|---|---|---|---|
| JP | 02-501311 A | | 5/1990 |
| JP | 02-233626 A | | 9/1990 |
| JP | 04-501575 A | | 3/1992 |
| JP | 06-504032 A | | 5/1994 |
| JP | 09-157202 A | | 6/1997 |
| JP | 10-101599 A | | 4/1998 |
| JP | 2000-355560 A | | 12/2000 |
| JP | 2004-355560 A | | 12/2004 |
| JP | 2005-517079 A | | 6/2005 |
| JP | 5263461 B1 | | 8/2013 |
| JP | 5382268 B1 | | 1/2014 |
| KR | 10-2006-0119879 A | | 11/2006 |
| WO | 98/23564 A1 | | 6/1998 |
| WO | 2005/019377 A1 | | 3/2005 |

(Continued)

OTHER PUBLICATIONS

International Search Report for PCT/JP2013/062077, Mailing Date of Aug. 6, 2013.

(Continued)

*Primary Examiner* — Andrew D Kosar
*Assistant Examiner* — Raymond Covington
(74) *Attorney, Agent, or Firm* — Westerman, Hattori, Daniels & Adrian, LLP

(57) ABSTRACT

There is provided a compound having a good miscibility with another liquid crystal compound and having a combination of a low viscosity ($\eta$), high storage stability, and high $T_{-i}$ even after being used to produce a liquid crystal composition. In particular, it is a compound having a 2-fluorophenyloxymethane structure is provided. Since the compound having a 2-fluorophenyloxymethane structure is highly miscible with another liquid crystal compound, using the compound having a 2-fluorophenyloxymethane structure as a component of a liquid crystal composition enables a production of a liquid crystal composition which exhibits a liquid crystal phase at low viscosity and in a wide temperature range and which has a high storage stability and enables production of a liquid crystal display device which responds fast and which has excellent display characteristics.

10 Claims, No Drawings

(56) References Cited

FOREIGN PATENT DOCUMENTS

| WO | 2008/105286 A1 | 9/2008 |
|---|---|---|
| WO | 2009/034867 A1 | 3/2009 |
| WO | 2009/150963 A1 | 12/2009 |
| WO | 2010/047260 A1 | 4/2010 |
| WO | 2012/161178 A1 | 11/2012 |
| WO | 2013/099754 A1 | 7/2013 |

OTHER PUBLICATIONS

Decision to Grant a Patent for JP 2013-544601, mailing Date of Nov. 14, 2013.

* cited by examiner

COMPOUND HAVING 2-FLUOROPHENYLOXYMETHANE STRUCTURE

TECHNICAL FIELD

The present invention relates to a compound having a 2-fluorophenyloxymethane structure, the compound being useful as organic electronic materials, medicine, and agricultural chemicals, in particular, useful as the materials of liquid crystal display devices.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and a vertical alignment type and IPS (in-plane switching) type in which a TFT (thin film transistor) is used. Liquid crystal compositions used for such liquid crystal display devices need to satisfy the following requirements: being stable to external elements such as moisture, air, heat, and light; exhibiting a liquid crystal phase (nematic phase, smectic phase, or blue phase) in a wide temperature range mainly including room temperature as much as possible; having a low viscosity; and enabling a low driving voltage. In addition, liquid crystal compositions need to have, for example, dielectric anisotropy ($\Delta\in$) and refractive index anisotropy ($\Delta n$) optimum to individual display devices.

A liquid crystal composition having positive $\Delta\in$ is used in horizontal alignment-type displays such as a TN type, an STN type, and an IPS type. There has been a report on another type of driving; in particular, molecules of a liquid crystal composition having positive $\Delta\in$ are vertically aligned in a state in which voltage is not applied, and then a horizontal electric field is applied for performing display. A demand for a liquid crystal composition having positive $\Delta\in$ has therefore further increased. In all types of driving, however, there have been demands for improvement of response speed, and a liquid crystal composition having a lower viscosity than typical liquid crystal compositions is needed to satisfy such demands. In order to develop the liquid crystal composition having a low viscosity, it is effective to decrease the viscosity of individual compounds contained in the liquid crystal composition. In the case where a liquid crystal composition is applied to, for example, display devices, the liquid crystal composition needs to exhibit a liquid crystal phase stable in a wide temperature range.

In general, in terms of production of a compound having a low viscosity, it has been believed that the compound preferably has a molecular framework in which multiple cyclic structures are directly bonded to each other via no linking group, namely a structure called directly connected rings. Compounds having positive $\Delta\in$ and a structure in which three or more rings are directly connected to each other are generally highly crystalline; in the case where a liquid crystal composition containing such a compound is stored for a long time, the crystals of this compound precipitate, which is problematic. In order to improve the storage stability of such a compound, a variety of compounds into which linking groups are introduced have been studied. Although the introduction of linking groups increases viscosity to some extent, miscibility in a liquid crystal composition can be enhanced, and the precipitation of crystals can be reduced (see Patent Literatures 1 to 8). A compound having a —CH$_2$O— group as a linking group is highly chemically stable, and a liquid crystal composition containing such a compound exhibits a liquid crystal phase stable in a wide temperature range; however, the viscosity of this liquid crystal composition is extraordinarily high, which is problematic.

In order to produce a liquid crystal composition that exhibits a stable liquid crystal phase in a wide temperature range, a composition having a high clearing point ($T_{-i}$) is effectively used. In general, increasing the number of ring structures contained in a compound is effective to produce a compound having a high $T_{-i}$. Increasing the number of ring structures contained in a compound, however, leads to an enhancement in crystallinity with the result that crystals are likely to precipitate from the liquid crystal composition, which is problematic.

CITATION LIST

Patent Literature

PTL 1: Japanese Unexamined Patent Application Publication No. 10-101599

PTL 2: Japanese Unexamined Patent Application Publication (Translation of PCT Application) No. 2-501311

PTL 3: Japanese Unexamined Patent Application Publication No. 9-157202

PTL 4: Japanese Unexamined Patent Application Publication (Translation of PCT Application) No. 2005-517079

PTL 5: Japanese Unexamined Patent Application Publication No. 2-233626

PTL 6: Japanese Unexamined Patent Application Publication (Translation of PCT Application) No. 4-501575

PTL 7: Japanese Unexamined Patent Application Publication (Translation of PCT Application) No. 6-504032

PTL 8: WO 98/23564

SUMMARY OF INVENTION

Technical Problem

It is an object of the present invention to provide a compound having a good miscibility with another liquid crystal compound and having a combination of low viscosity ($\eta$), high storage stability, and high $T_{-i}$ even after being used to produce a liquid crystal composition; it is another object of the present invention to provide a liquid crystal composition containing such a compound; and it is another object of the present invention to provide a liquid crystal display device in which the compound is used.

Solution to Problem

The inventors have studied a variety of compounds to achieve the above-mentioned objects and found that a compound having a 2-fluorophenyloxymethane structure effectively enables the objects to be achieved, thereby accomplishing the present invention.

An aspect of the present invention provides a compound represented by General Formula (1)

[Chem. 1]

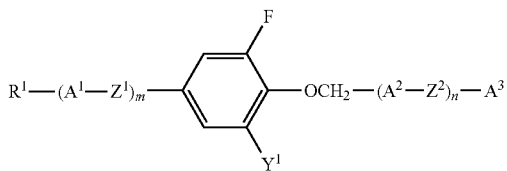

(1)

(where $R^1$ represents an alkyl group having 1 to 15 carbon atoms or an alkenyl group having 2 to 15 carbon atoms, and one —$CH_2$— moiety or at least two —$CH_2$— moieties not adjoining each other in $R^1$ are each independently optionally substituted with —O—, —S—, —COO—, —OCO—, or —CO—;

$A^1$ and $A^2$ are each independently a group selected from the group consisting of (a) a 1,4-cyclohexylene group (where one —$CH_2$— moiety or at least two —$CH_2$— moieties not adjoining each other are each independently optionally substituted with —O— or —S—) and (b) a 1,4-phenylene group (where one —CH= moiety or at least two —CH= moieties not adjoining each other are optionally substituted with —N=, and a hydrogen atom is optionally substituted with a fluorine atom);

$A^3$ is a group represented by General Formula (A-1) or (A-2)

[Chem. 2]

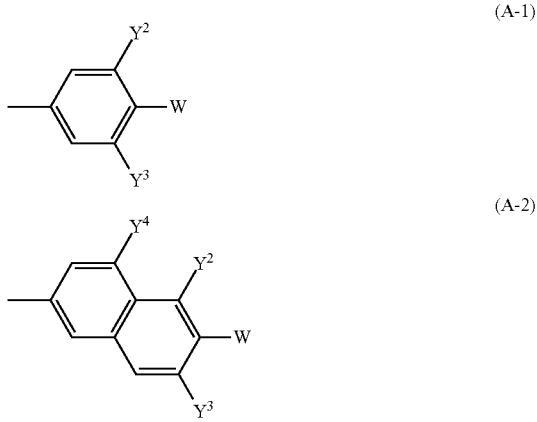

(where W represents a fluorine atom, a chlorine atom, a cyano group, a trifluoromethyl group, a trifluoromethoxy group, or a difluoromethoxy group, and $Y^2$, $Y^3$, and $Y^4$ each independently represent a hydrogen atom, a fluorine atom, or a chlorine atom);

$Z^1$ and $Z^2$ each independently represent —$CH_2O$—, —$OCH_2$—, —$CF_2O$—, —$OCF_2$—, —COO—, —OCO—, —$CH_2CH_2$—, —$CF_2CF_2$—, —CH=CH—, —CF=CF—, —C≡C—, or a single bond;

$Y^1$ represents a hydrogen atom, a fluorine atom, or a chlorine atom; and m and n each independently represent 0, 1, 2, or 3 and satisfy the relationship of m+n=3, wherein in the case where multiple $A^1$ moieties are present, the $A^1$ moieties are the same as or different from each other; in the case where multiple $A^2$ moieties are present, the $A^2$ moieties are the same as or different from each other; in the case where multiple $Z^1$ moieties are present, the $Z^1$ moieties are the same as or different from each other; and in the case where multiple $Z^2$ moieties are present, the $Z^2$ moieties are the same as or different from each other). Furthermore, other aspects of the present invention provide a liquid crystal composition containing such a compound and a liquid crystal display device in which such a liquid crystal composition is used.

Advantageous Effects of Invention

According to an aspect of the present invention, the compound represented by General Formula (1) has a good miscibility with another liquid crystal compound and a combination of low viscosity (η), high storage stability, and high $T_{-i}$ even after being used to produce a liquid crystal composition.

Hence, use of the compound represented by General Formula (1) as a component of a liquid crystal composition enables a production of a liquid crystal composition which exhibits a liquid crystal phase at low viscosity and in a wide temperature range and which has a high storage stability. Thus, such a compound is very useful as a component of a liquid crystal composition used for a liquid crystal display device which needs to quickly respond.

DESCRIPTION OF EMBODIMENTS

In a compound represented by General Formula (1), $R^1$ is preferably an alkyl group having 1 to 8 carbon atoms or an alkenyl group having 2 to 8 carbon atoms, especially preferably an alkyl group having 1 to 5 carbon atoms or an alkenyl group having 2 to 5 carbon atoms, to decrease the viscosity. In addition, R preferably has a linear structure.

In order to decrease the viscosity, $A^1$ and $A^2$ are preferably each independently a trans-1,4-cyclohexylene group or an unsubstituted 1,4-phenylene group, more preferably a trans-1,4-cyclohexylene group; in order to enhance Δ∈, $A^1$ and $A^2$ are preferably selected from the following groups.

[Chem. 3]

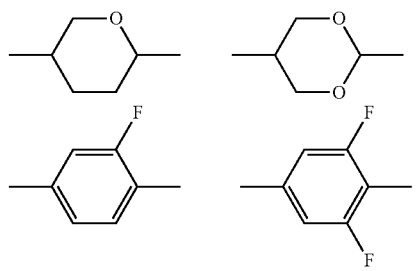

In order to enhance the solubility, the following

[Chem. 4]

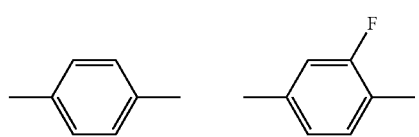

are preferred.

In order to enhance ΔE, $A^3$ is preferably selected from the following groups.

[Chem. 5]

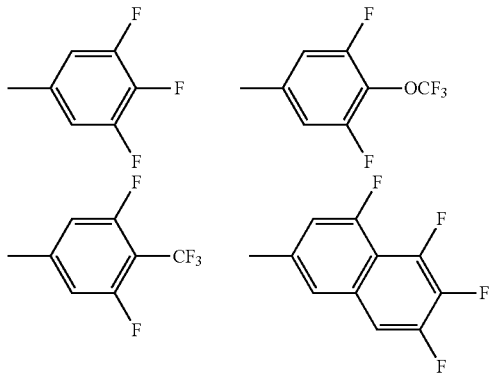

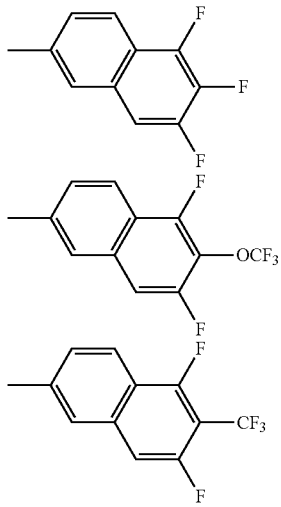

In order to decrease the viscosity and enhance the solubility, the following groups

[Chem. 6]

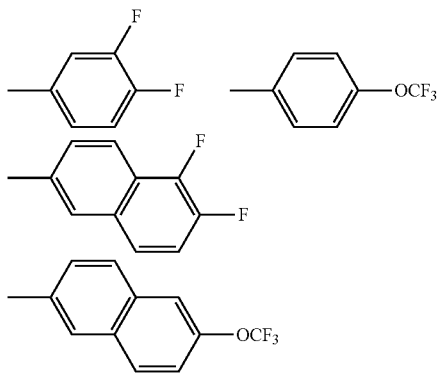

are preferred.

In order to decrease the viscosity, $Z^1$ and $Z^2$ are preferably each independently —CH$_2$O—, —OCH$_2$—, —CF$_2$O—, —OCF$_2$—, —CF=CF—, or a single bond, and more preferably —CF$_2$O—, —OCF$_2$—, —CH$_2$O—, —OCH$_2$—, or a single bond.

In order to decrease the viscosity, $Y^1$ is preferably a hydrogen atom or a fluorine atom; a fluorine atom is preferred in terms of an enhancement in ΔE, and a fluorine atom is preferred also in terms of an enhancement in the solubility.

m is preferably 3 in view of the viscosity, preferably 2 or 3 in view of ΔE, and preferably 1 or 2 in view of the solubility.
n is preferably 0 in view of the viscosity, preferably 0 or 1 in view of ΔE, and preferably 0 or 1 in view of the solubility.

The compound represented by General Formula (1) does not have a structure in which hetero atoms are directly connected to each other.

Preferred examples of such a compound will now be specifically described; however, the compound of the present invention is not limited thereto. Preferred examples of the compound represented by General Formula (1) include compounds represented by General Formulae (1-1) to (69-9):

[Chem. 7]

(1-1)
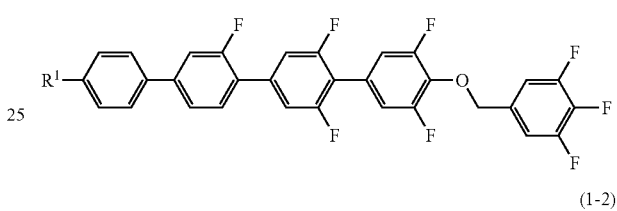

(1-2)
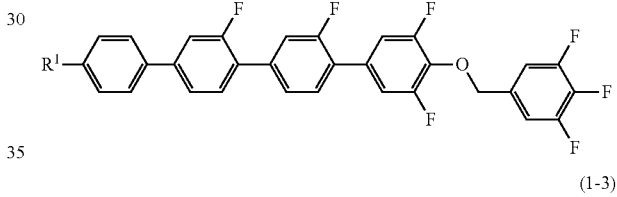

(1-3)
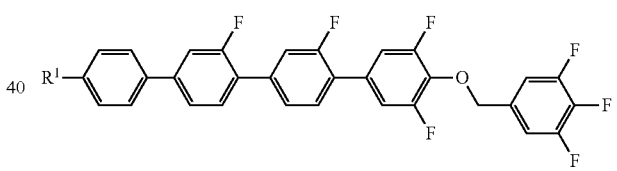

(1-4)
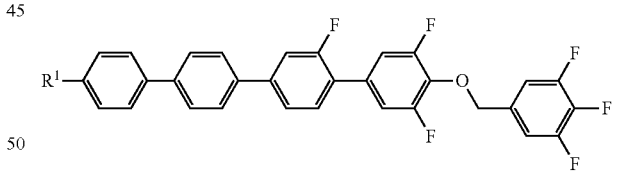

(1-5)
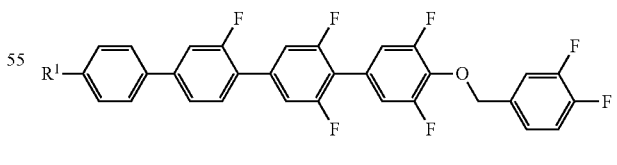

(1-6)
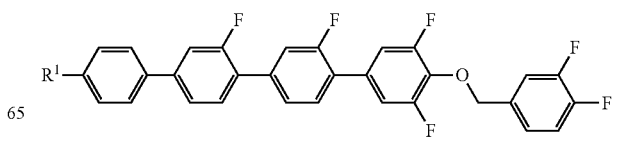

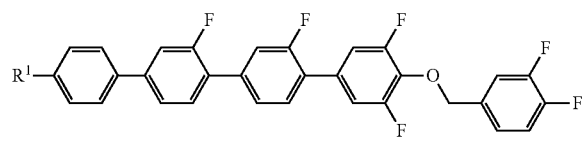
(1-7)
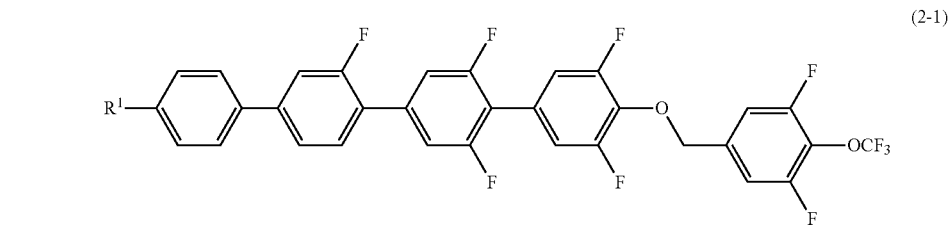
(1-8)
[Chem. 8]
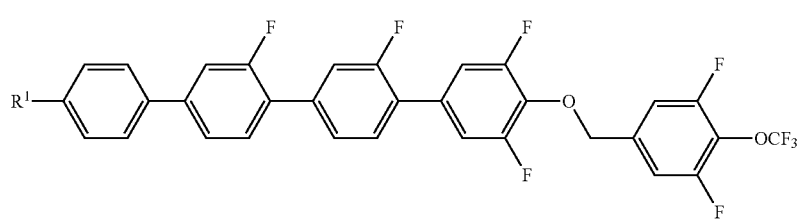
(2-1)
(2-2)
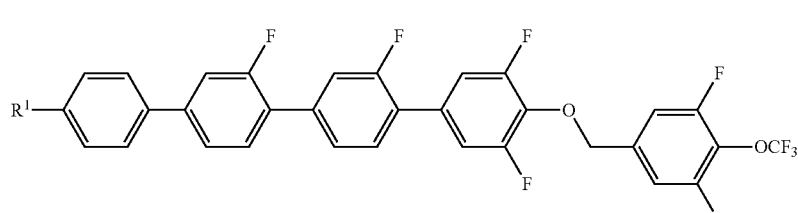
(2-3)
(2-4)
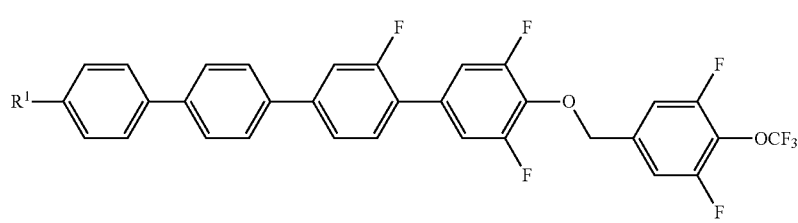
(2-5)
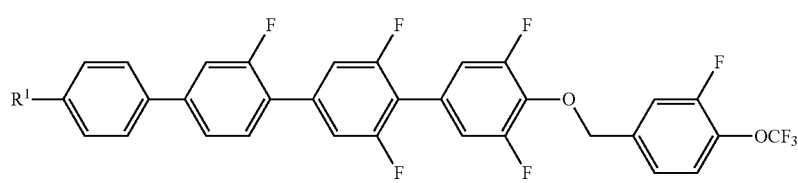
(2-6)
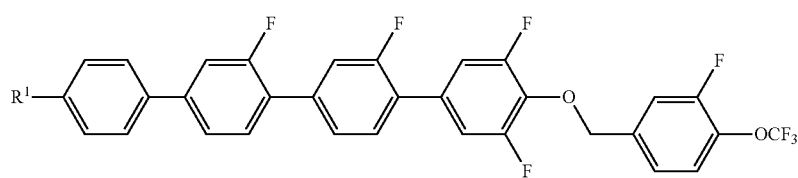

(2-7)
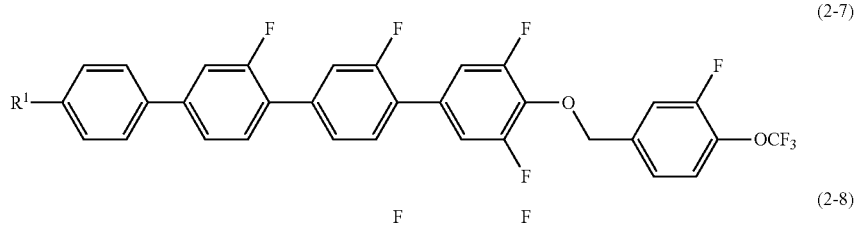
(2-8)
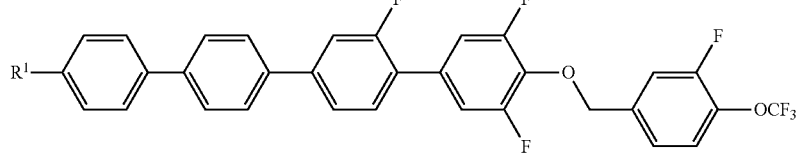
[Chem. 9]
(3-1)
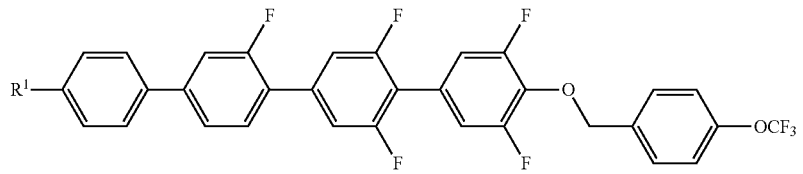
(3-2)
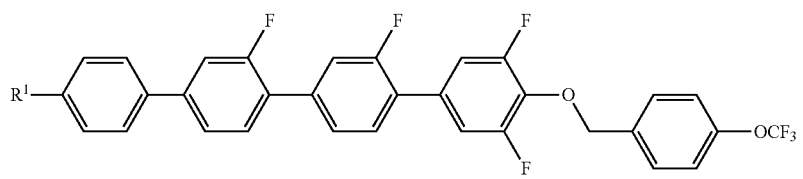
(3-3)
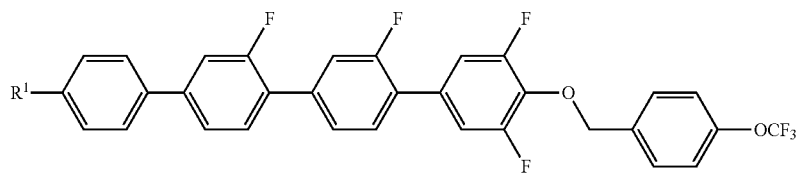
(3-4)
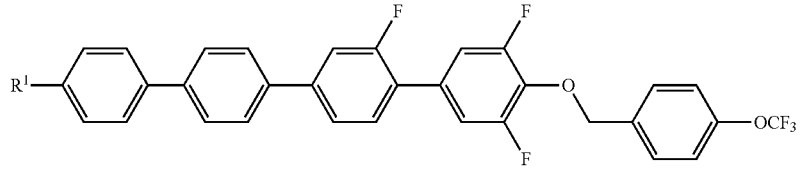
(3-5)
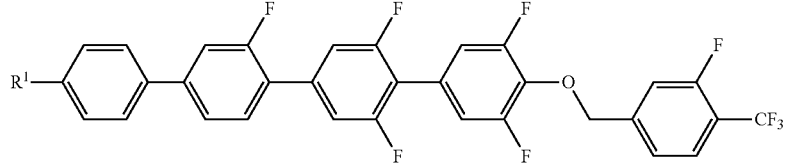
(3-6)
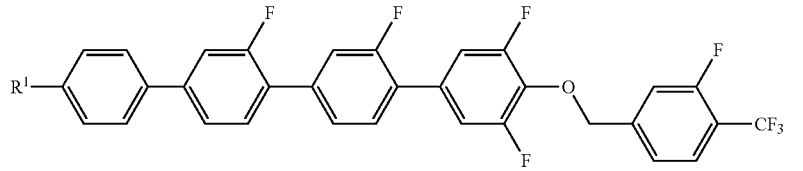

-continued
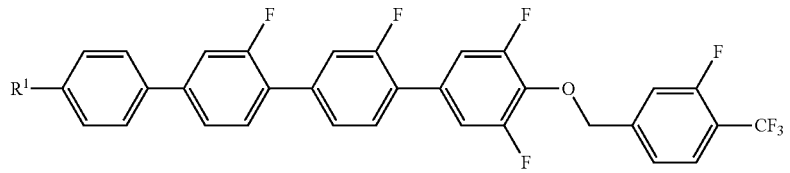 (3-7)
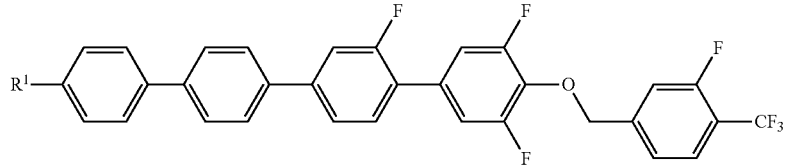 (3-8)
[Chem. 10]
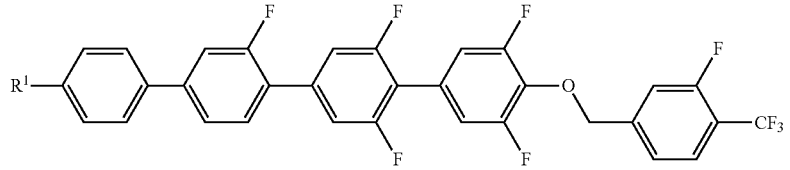 (4-1)
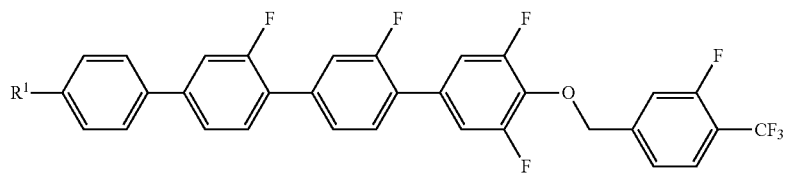 (4-2)
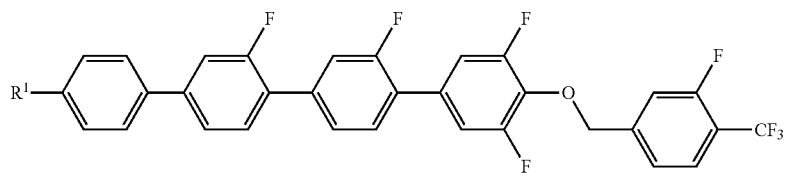 (4-3)
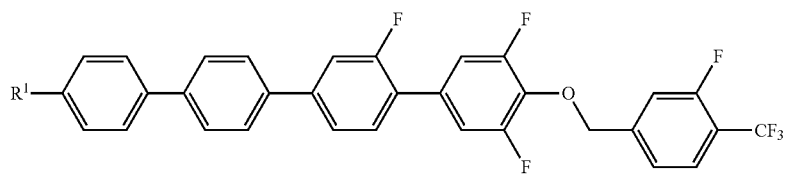 (4-4)
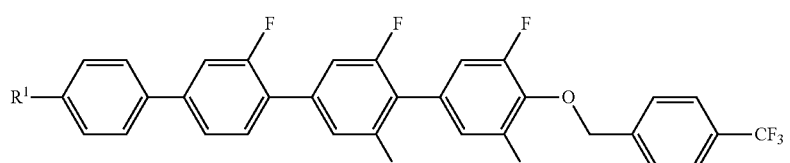 (4-5)
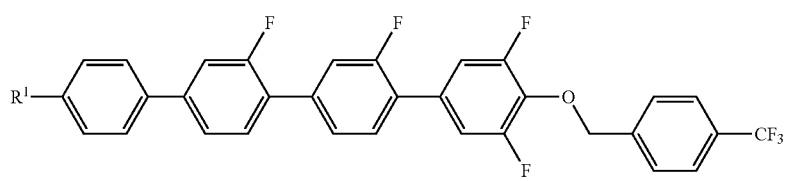 (4-6)

(4-7)
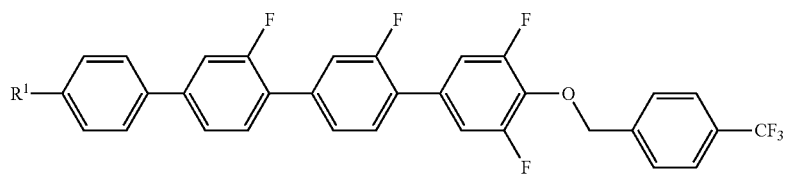
(4-8)
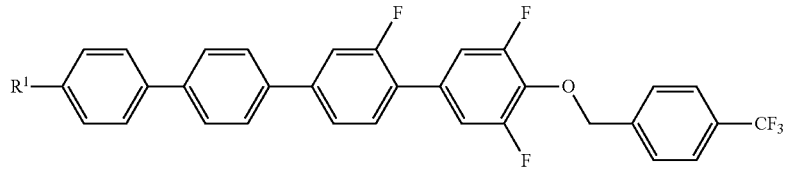
[Chem. 11]
(5-1)
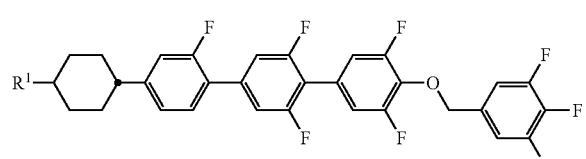
(5-2)
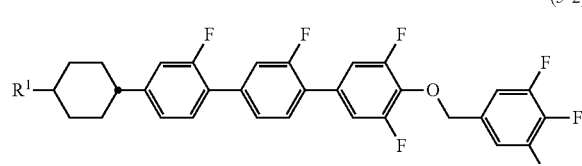
(5-3)
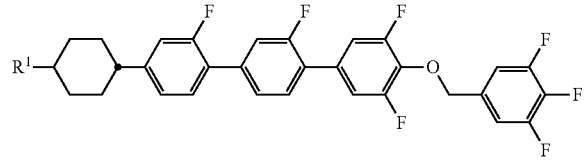
(5-4)
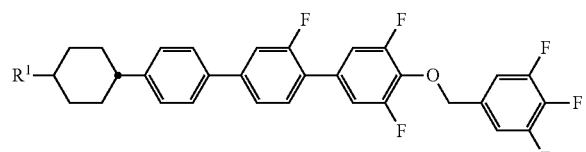
(5-5)
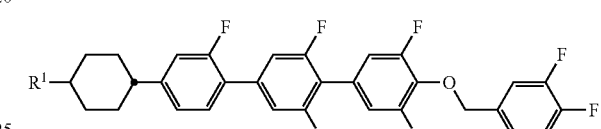
(5-6)
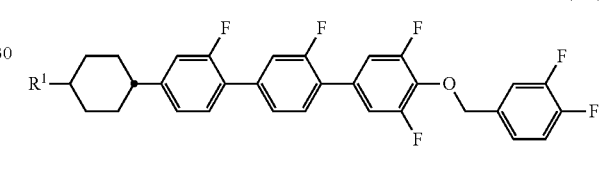
(5-7)
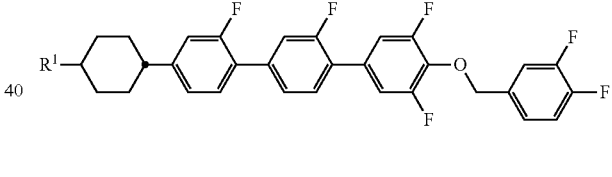
(5-8)
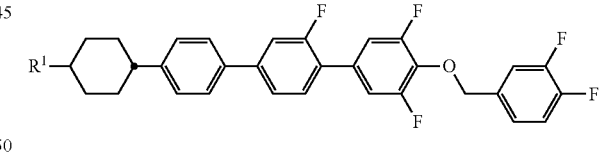
[Chem. 12]
(6-1)
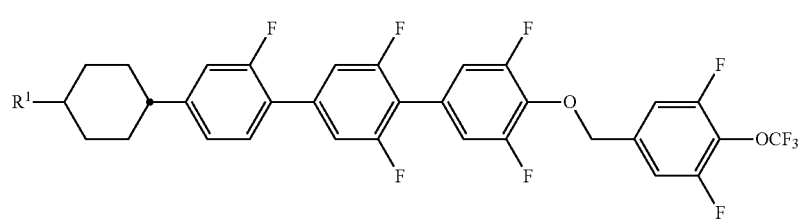

-continued
(6-2)
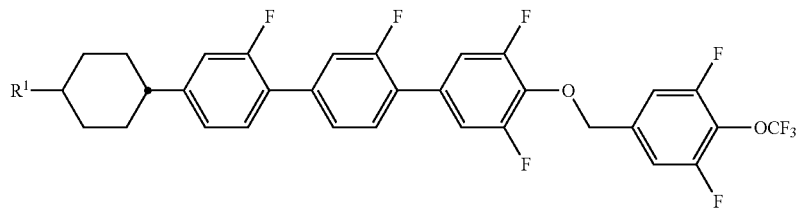
(6-3)
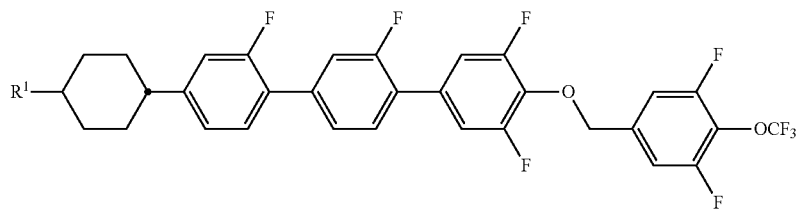
(6-4)
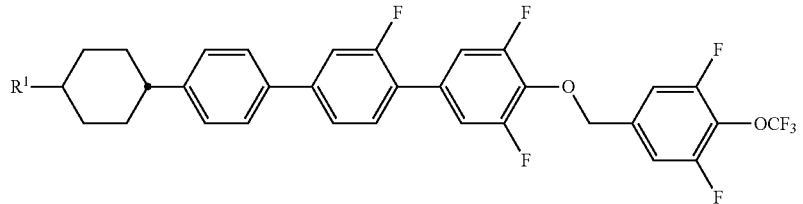
(6-5)
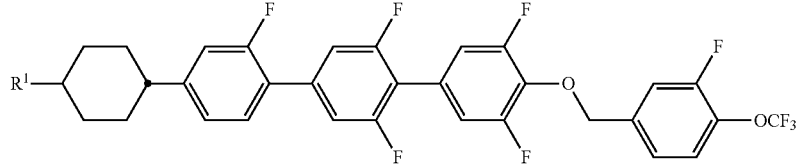
(6-6)
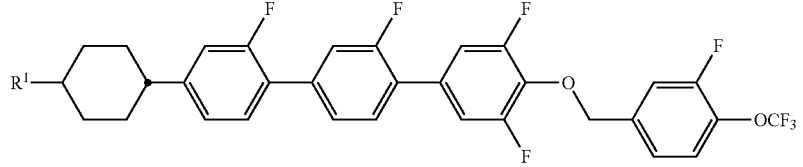
(6-7)
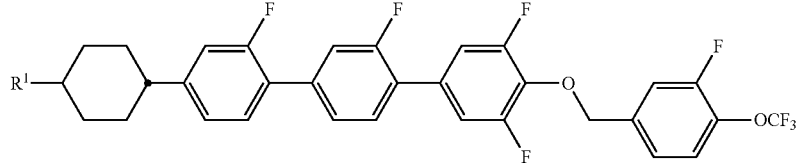
(6-8)
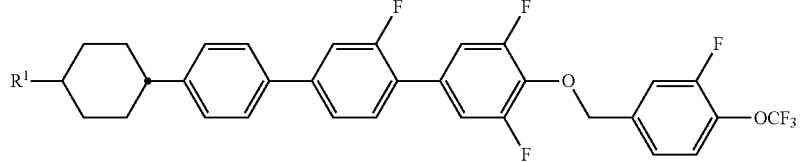

[Chem. 13]
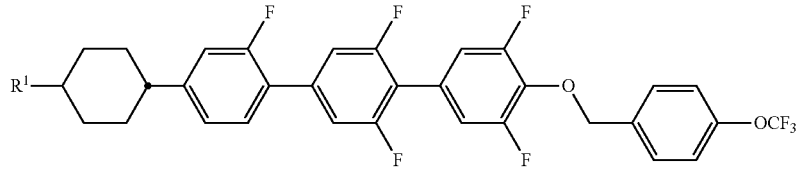
(7-1)
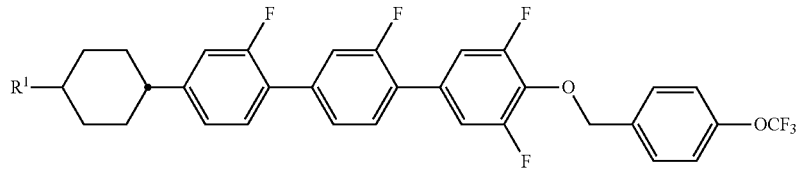
(7-2)
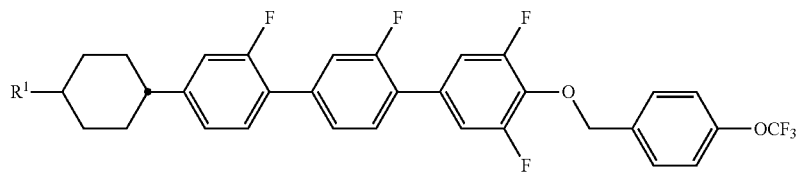
(7-3)
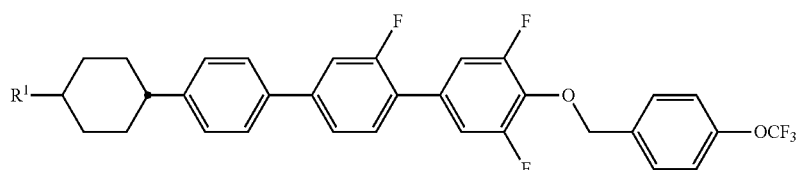
(7-4)
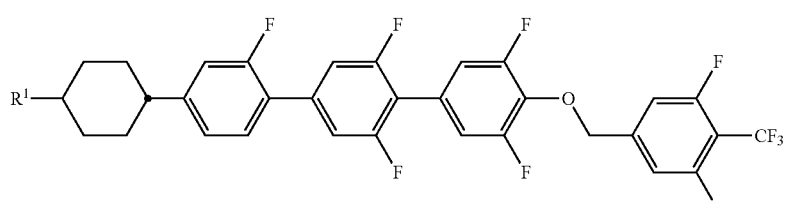
(7-5)
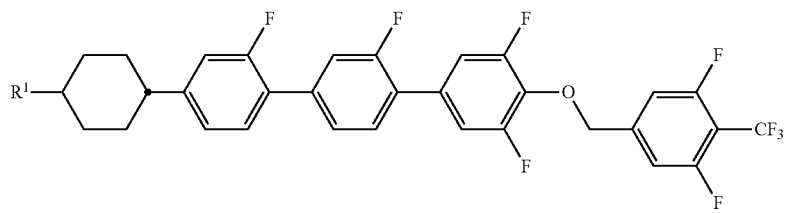
(7-6)
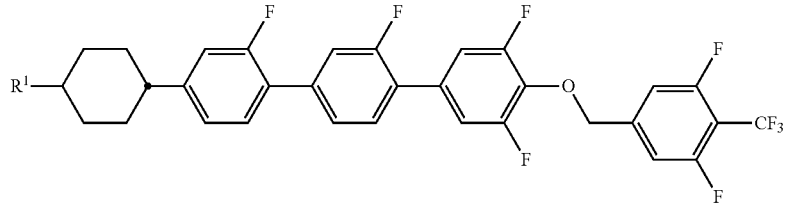
(7-7)
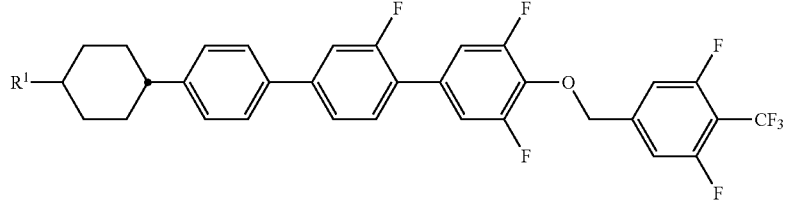
(7-8)

[Chem. 14]
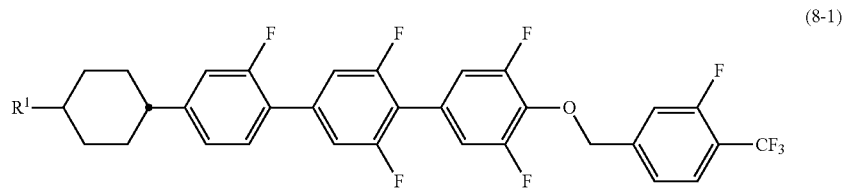
(8-1)
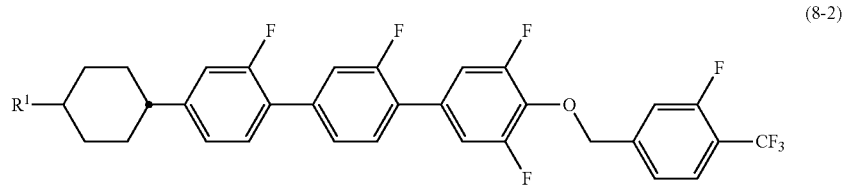
(8-2)
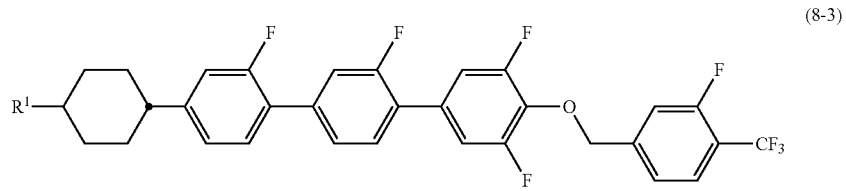
(8-3)
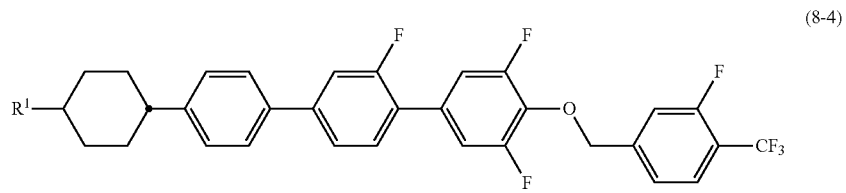
(8-4)
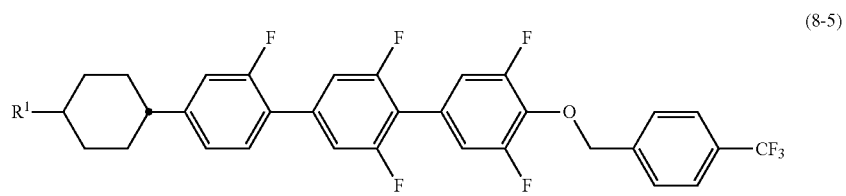
(8-5)
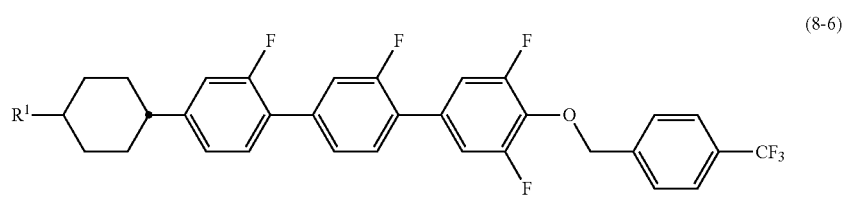
(8-6)
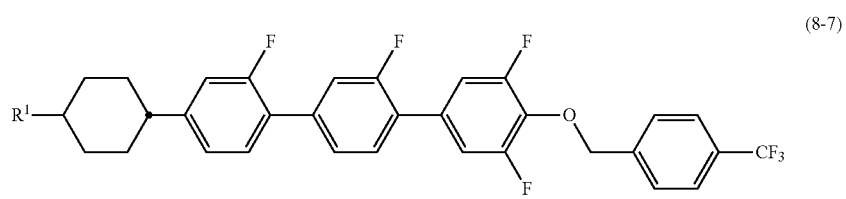
(8-7)
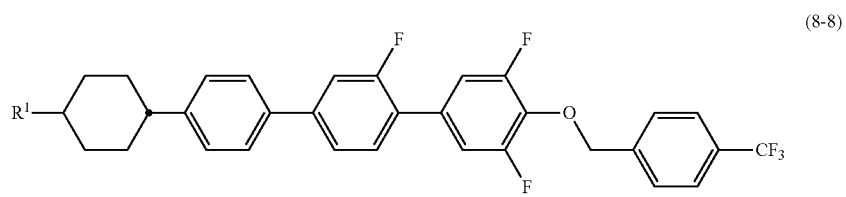
(8-8)

[Chem. 15]
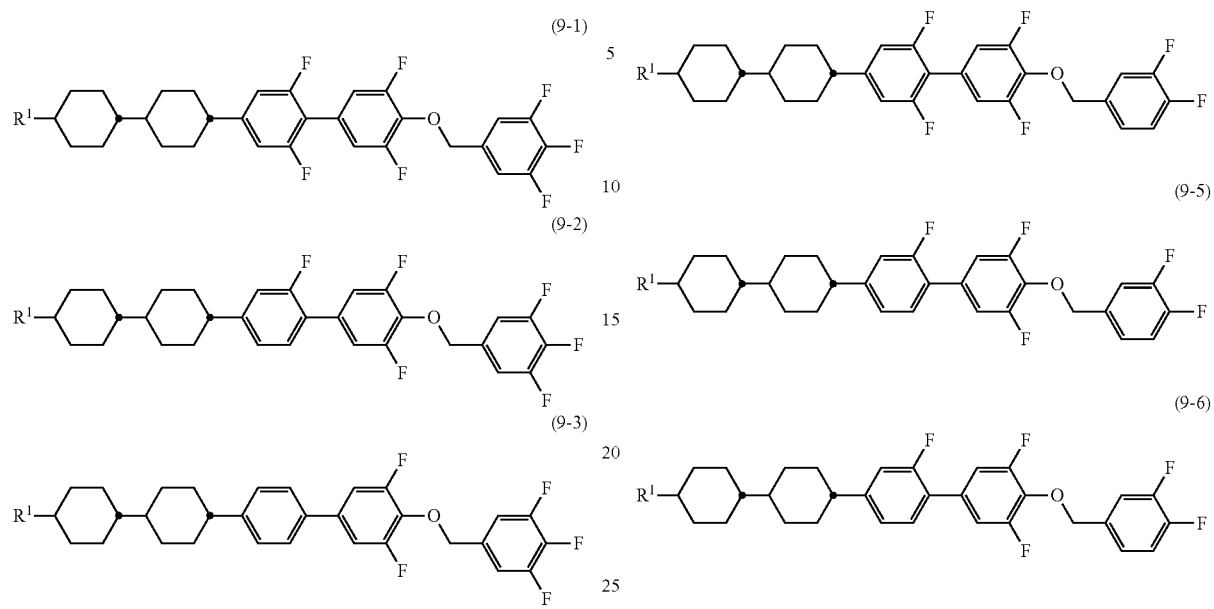
[Chem. 16]
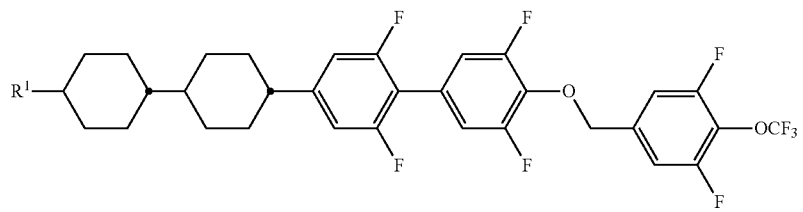
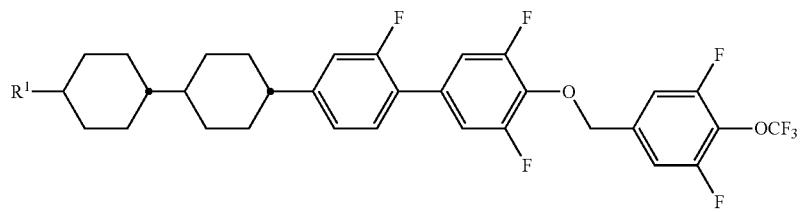
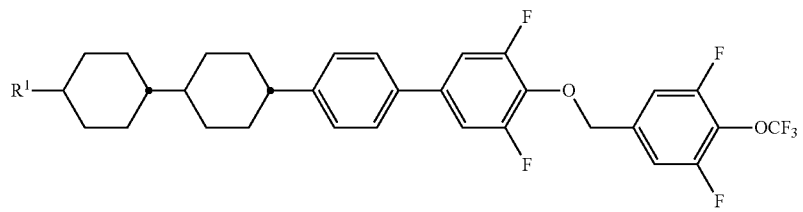
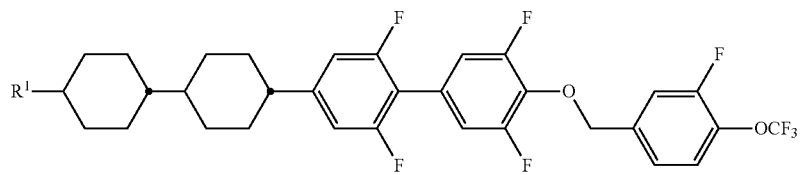

-continued
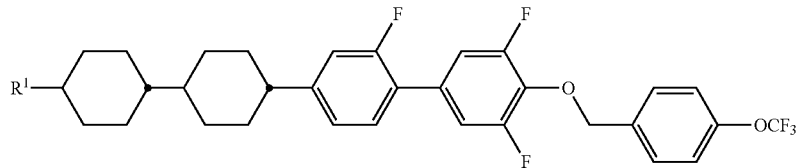
(10-5)
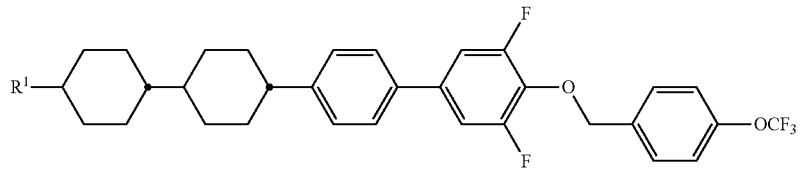
(10-6)
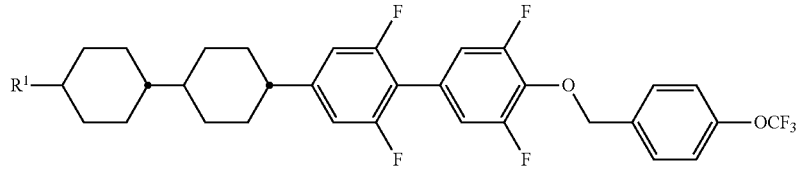
(10-7)
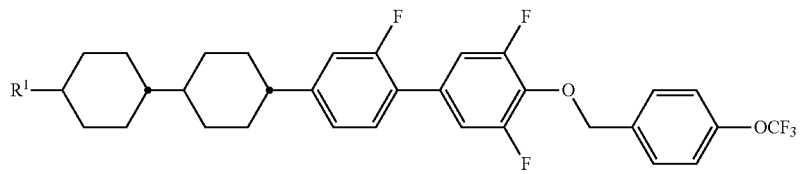
(10-8)
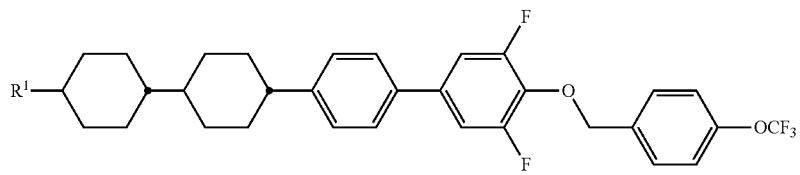
(10-7)
[Chem. 17]
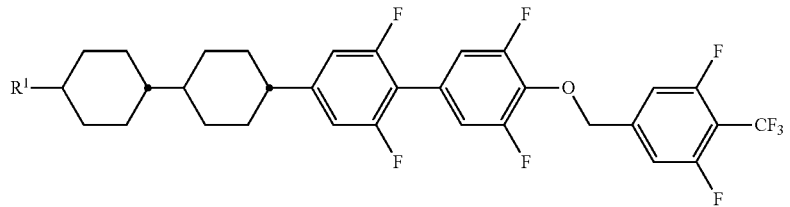
(11-1)
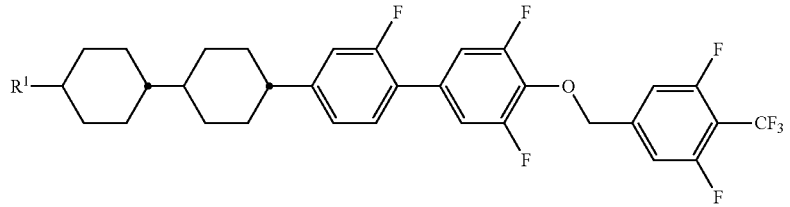
(11-2)

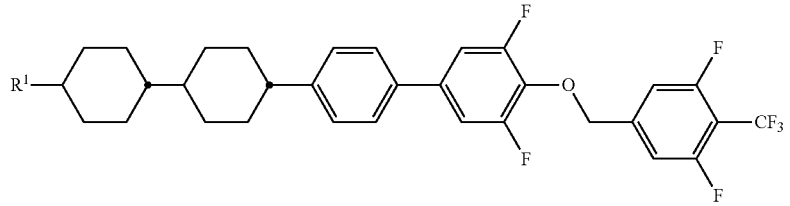
(11-3)
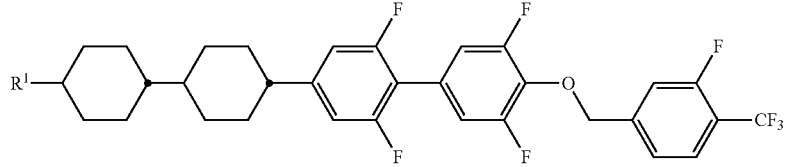
(11-4)
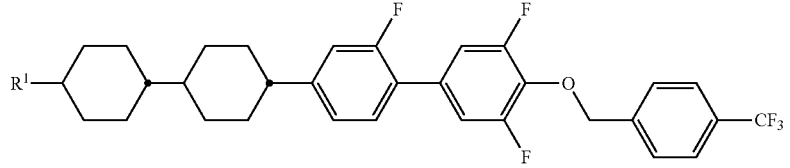
(11-5)
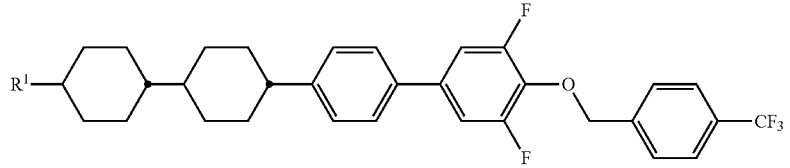
(11-6)
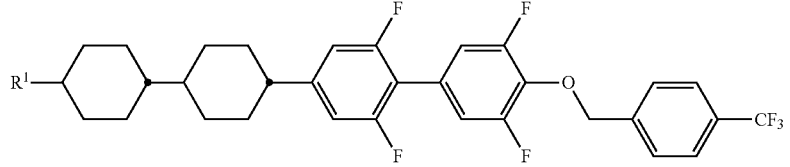
(11-7)
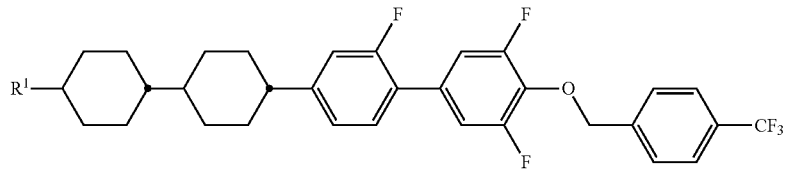
(11-8)
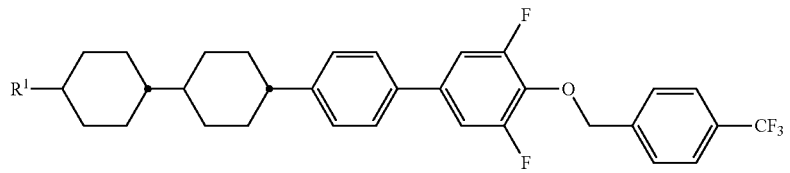
(11-7)
[Chem. 18]
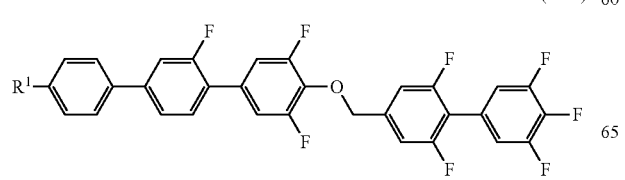
(12-1)
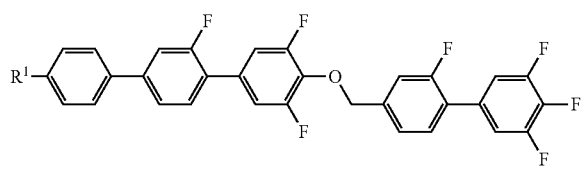
(12-2)

(12-3)
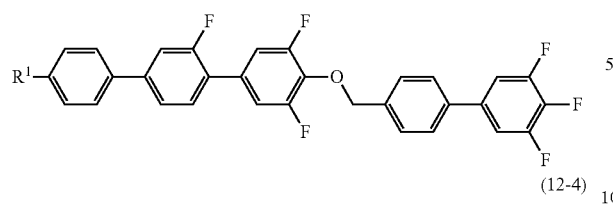
(12-4)
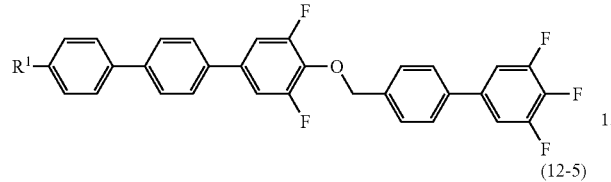
(12-5)
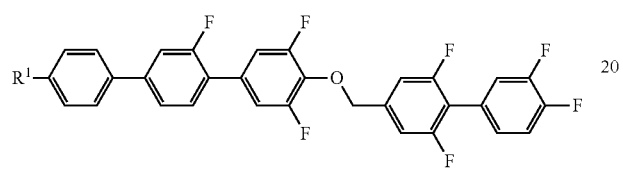
(12-6)
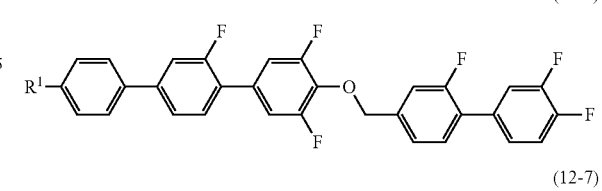
(12-7)
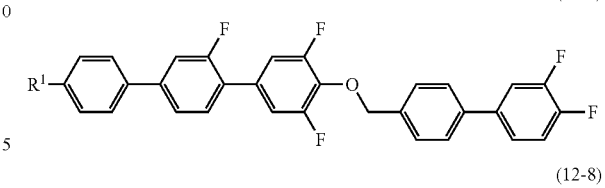
(12-8)
[Chem. 19]
(13-1)
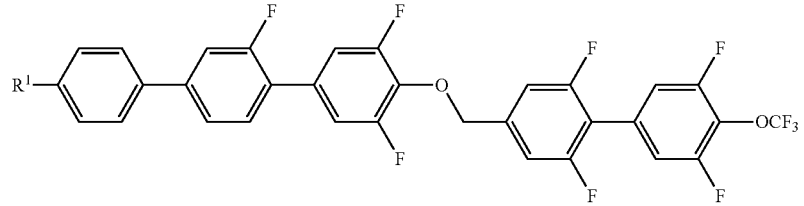
(13-2)
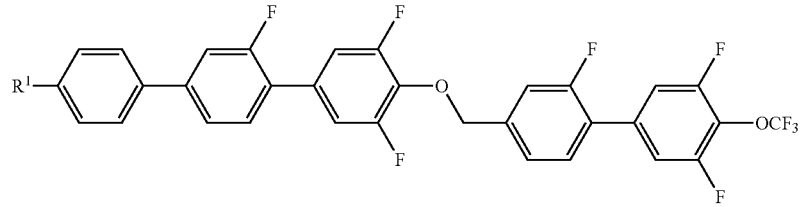
(13-3)
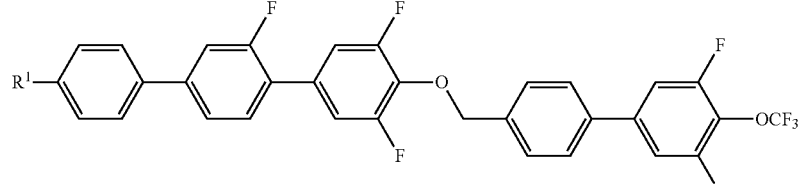
(13-4)
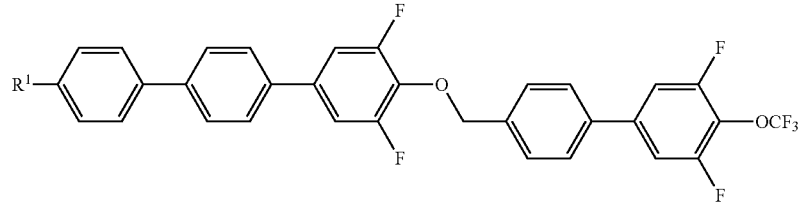

(13-5)
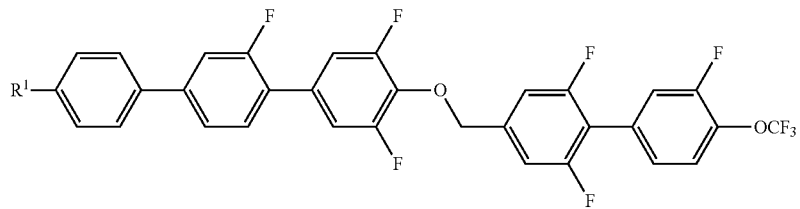
(13-6)
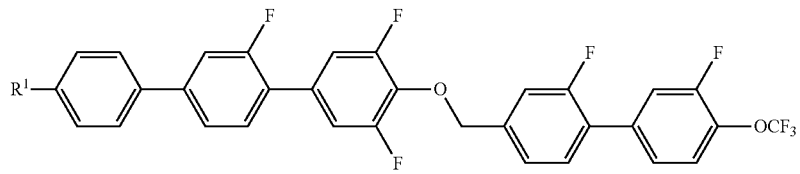
(13-7)
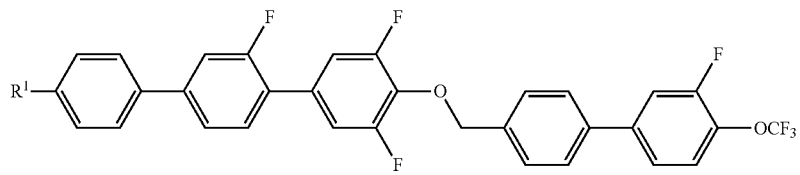
(13-8)
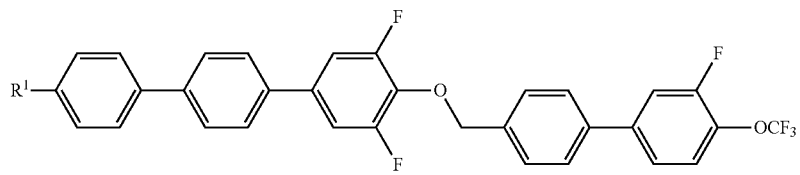
[Chem. 20]
(14-1)
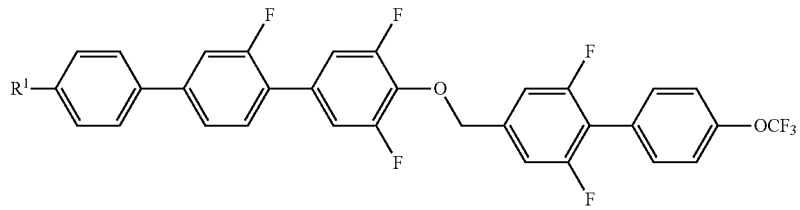
(14-2)
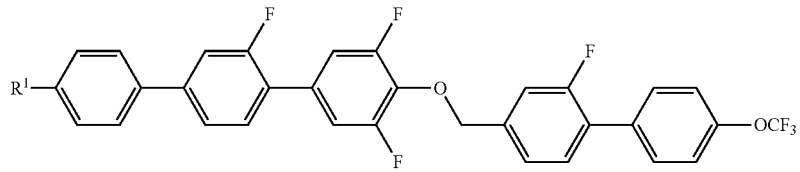
(14-3)
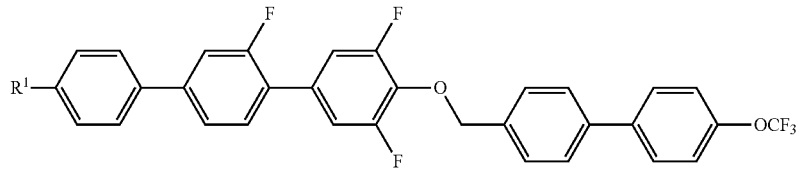
(14-4)
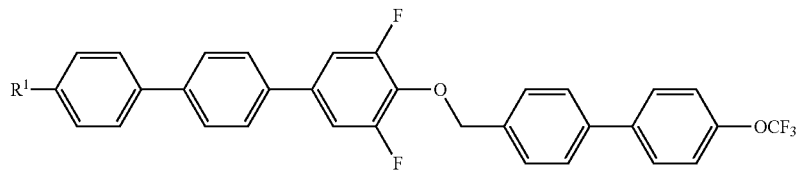

(14-5)
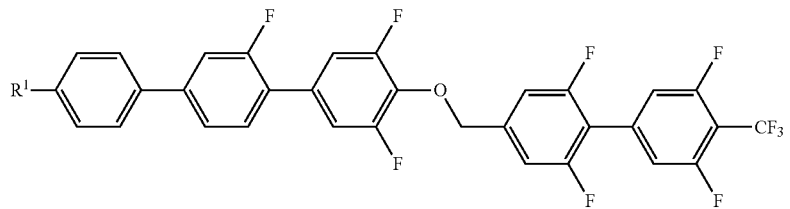
(14-6)
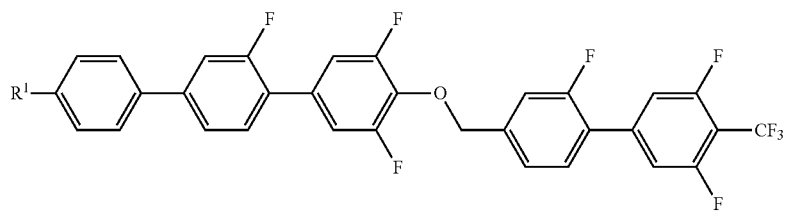
(14-7)
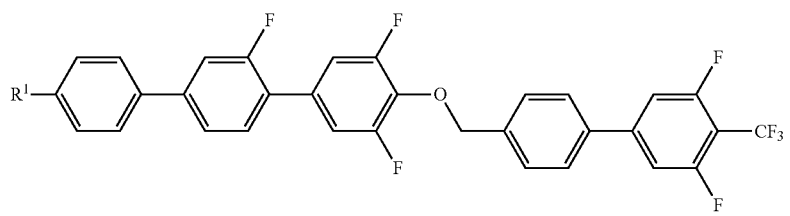
(14-8)
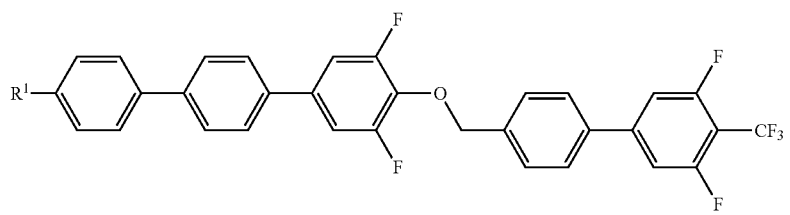
[Chem. 21]
(15-1)
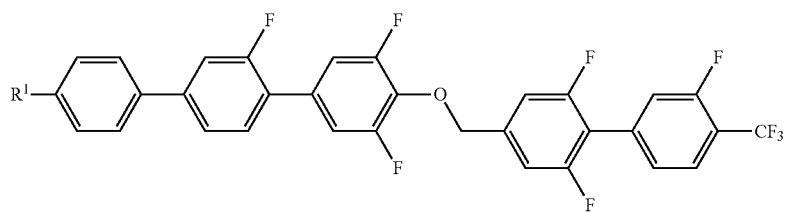
(15-2)
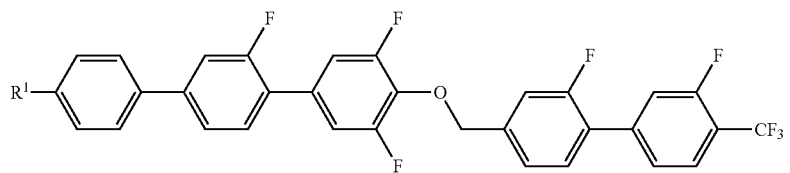
(15-3)
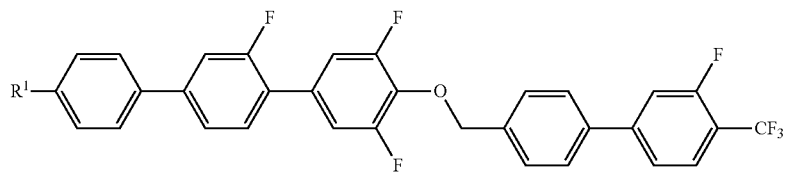

(15-4)
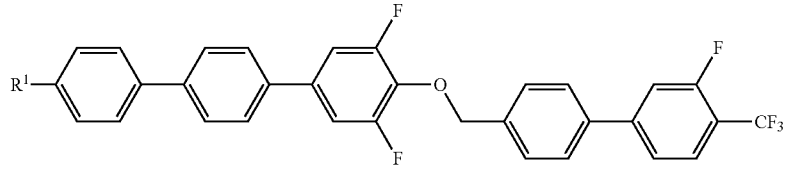
(15-5)
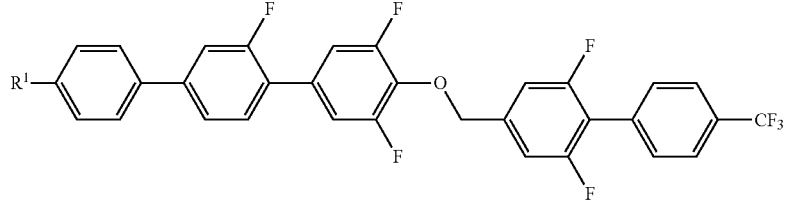
(15-6)
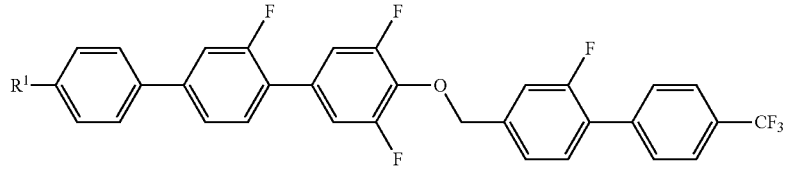
(15-7)
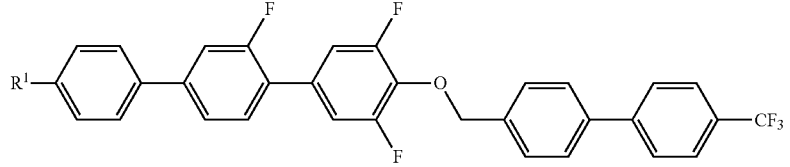
(15-8)
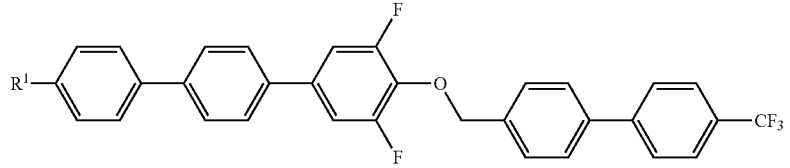
[Chem. 22]
(16-1)
(16-2)
(16-3)
(16-4)
(16-5)
(16-6)
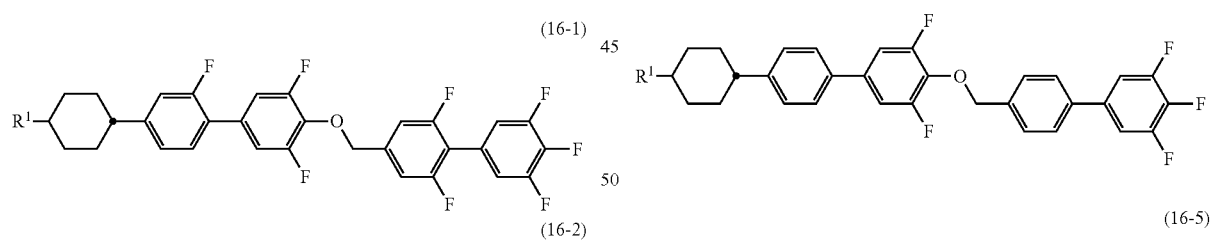
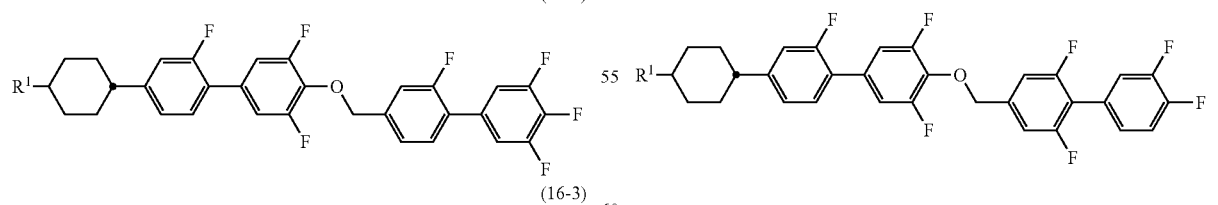
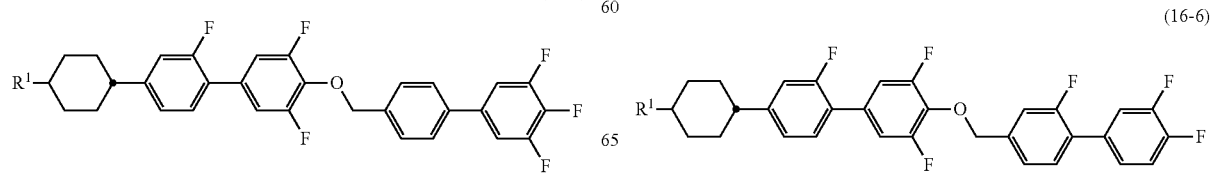

(16-7)
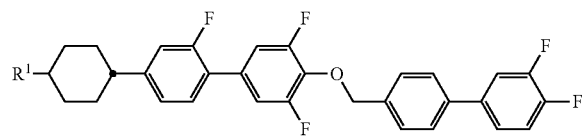
(16-8)
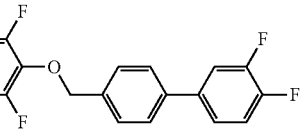
[Chem. 23]
(18-1)
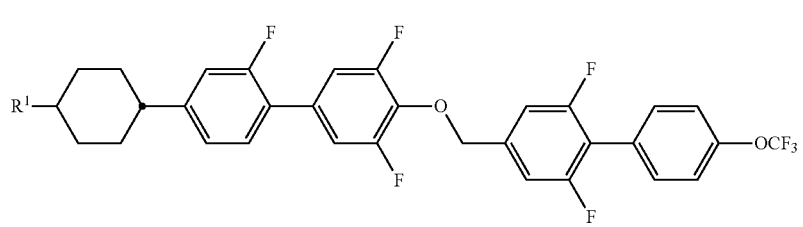
(18-2)
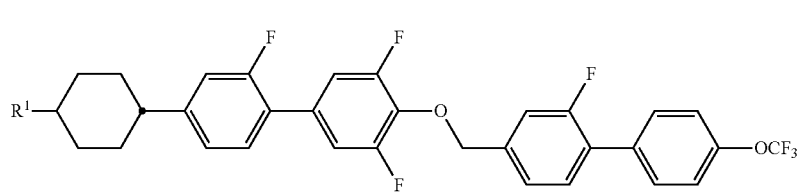
(18-3)
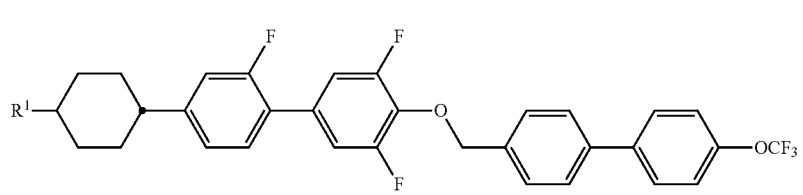
(18-4)
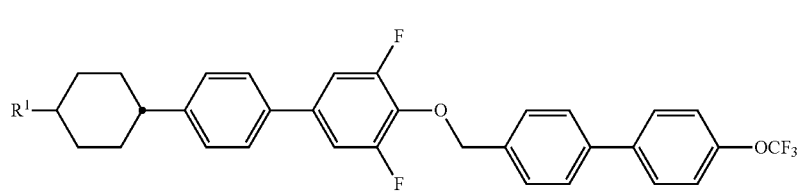
(18-5)
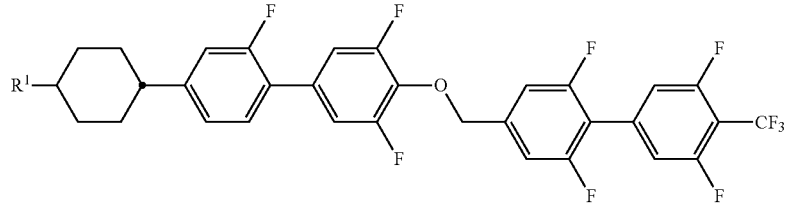
(18-6)
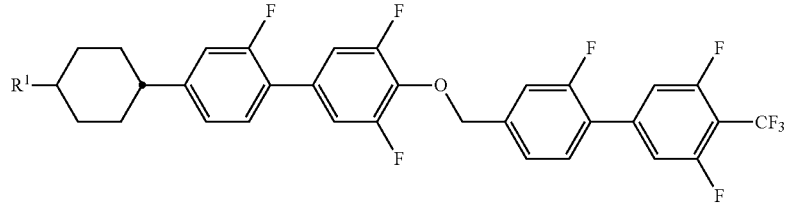

-continued
(18-7)
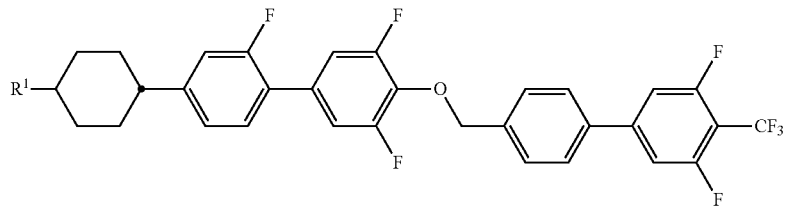
(18-8)
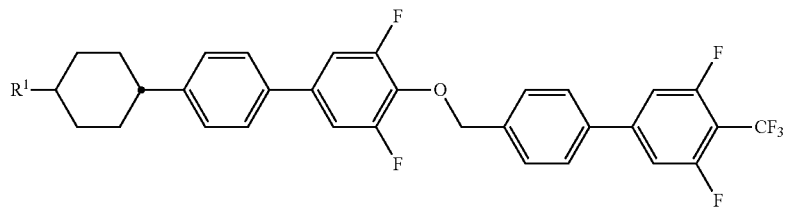
[Chem. 24]
(19-1)
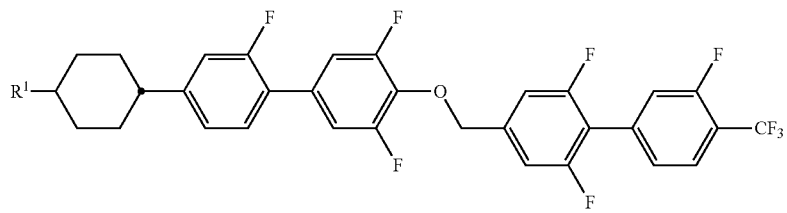
(19-2)
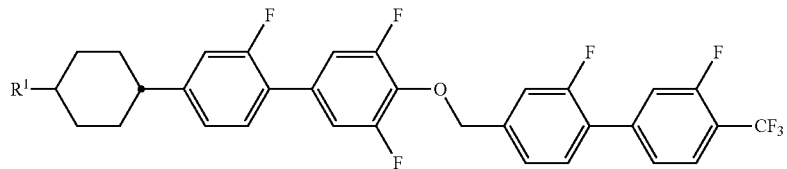
(19-3)
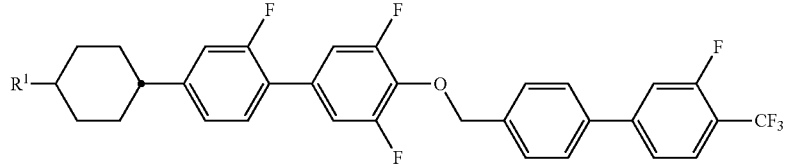
(19-4)
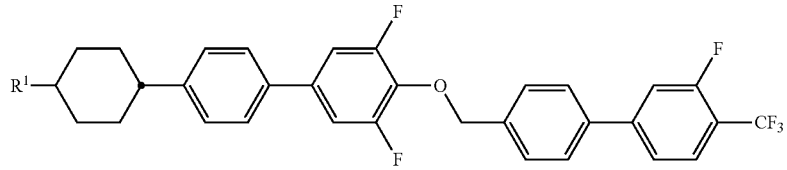
(19-5)
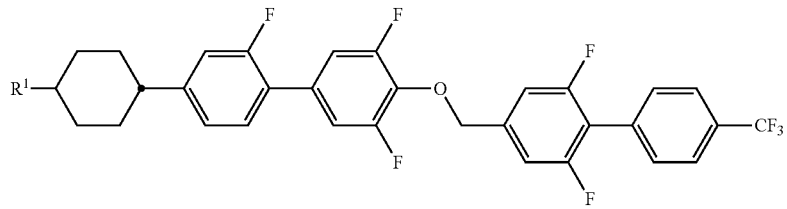

-continued
(19-6)
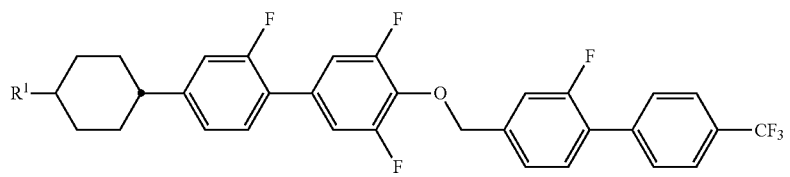
(19-7)
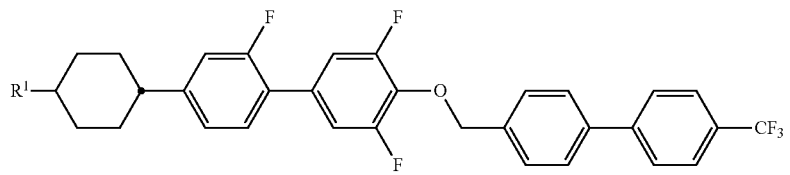
(19-8)
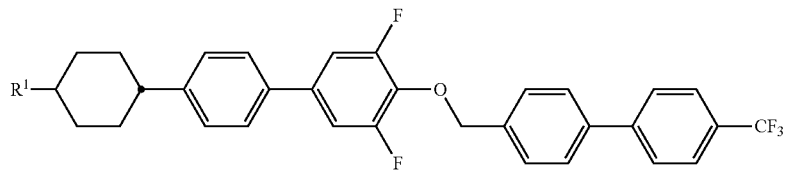
[Chem. 25]
(20-1)
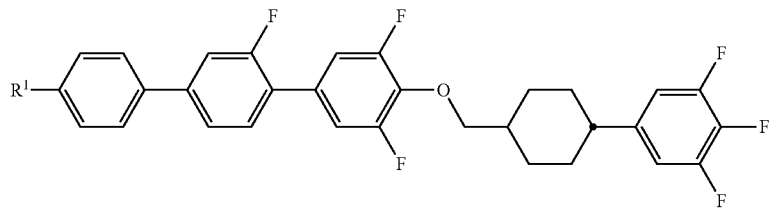
(20-2)
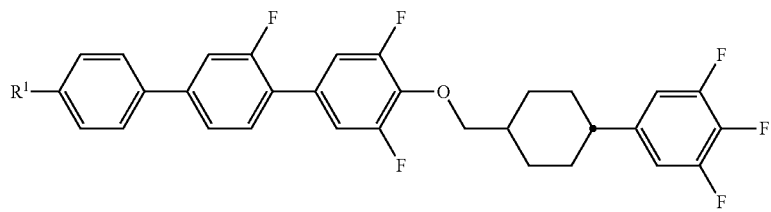
(20-3)
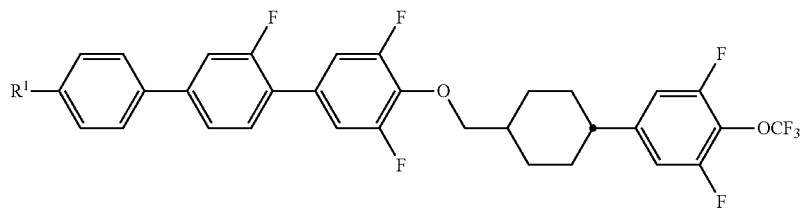
(20-4)
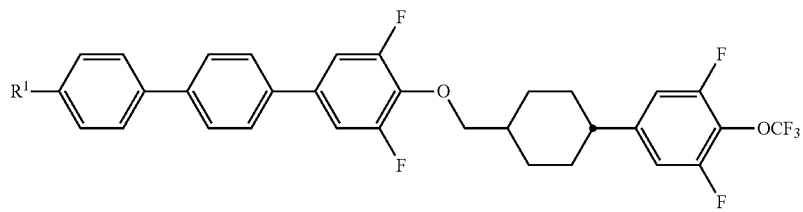

-continued
(20-5)
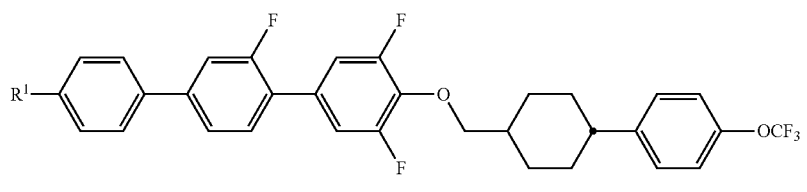
(20-6)
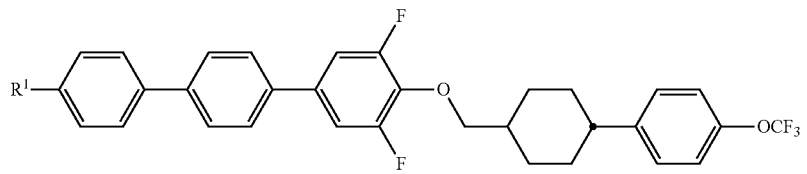
(20-7)
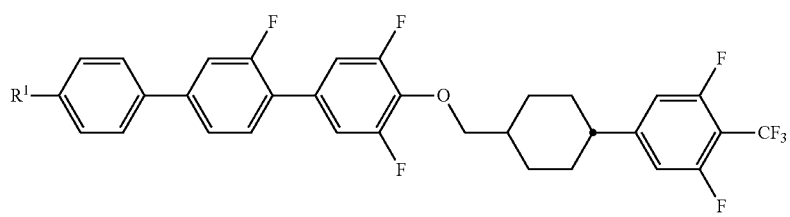
(20-8)
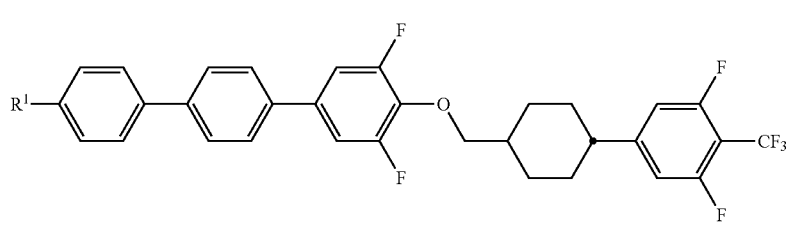
(20-9)
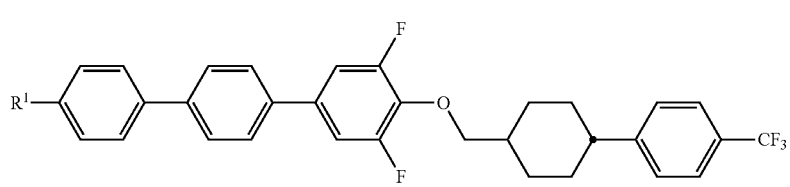
(20-10)
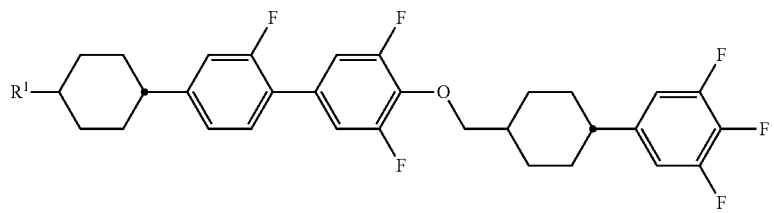
[Chem. 26]
(21-1)

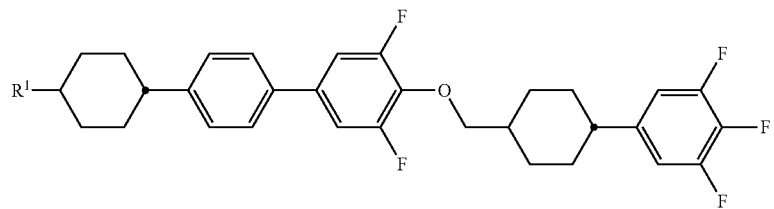
(21-2)
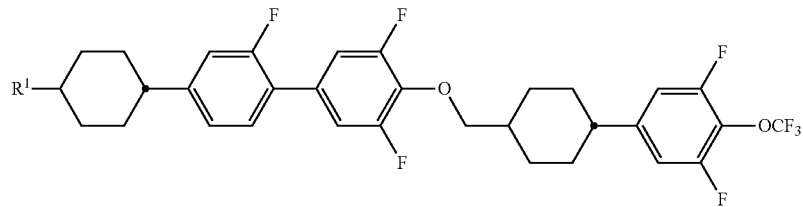
(21-3)
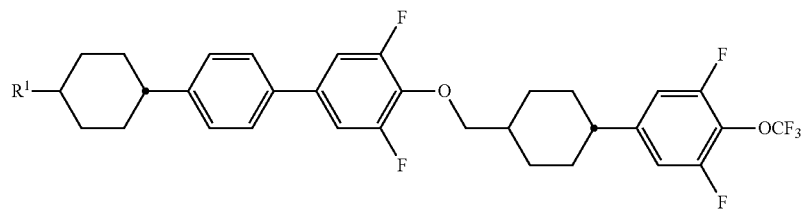
(21-4)
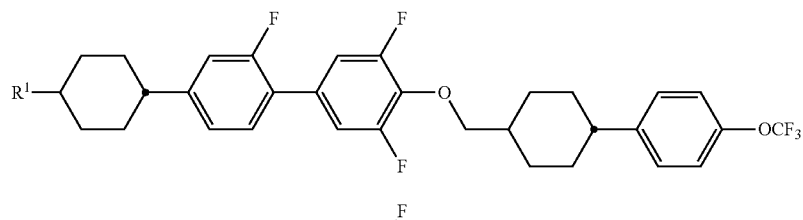
(21-5)
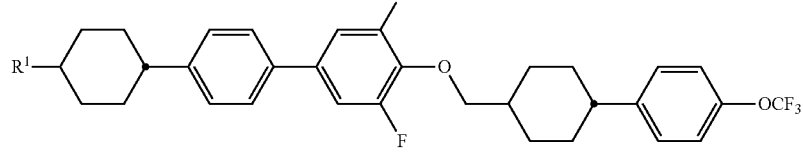
(21-6)
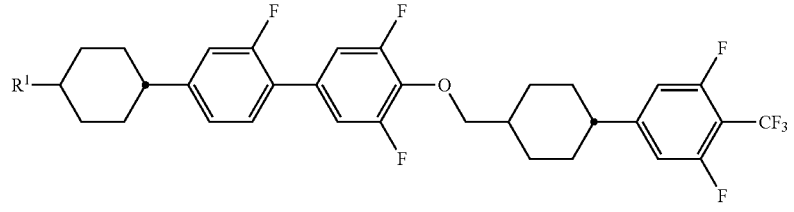
(21-7)
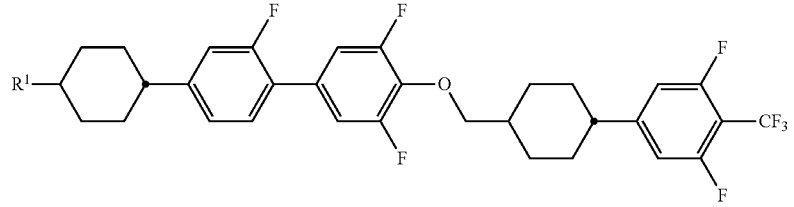
(21-8)
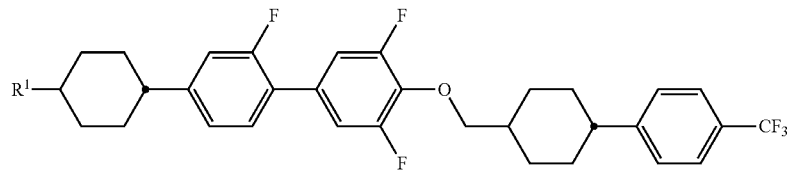
(21-9)

(21-10)
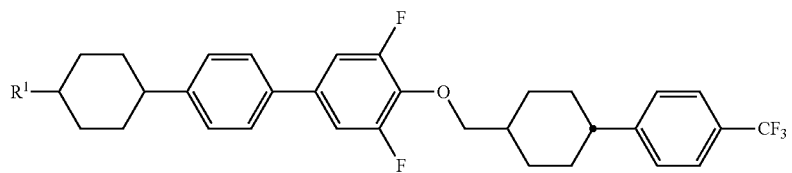
[Chem. 27]
(22-1)
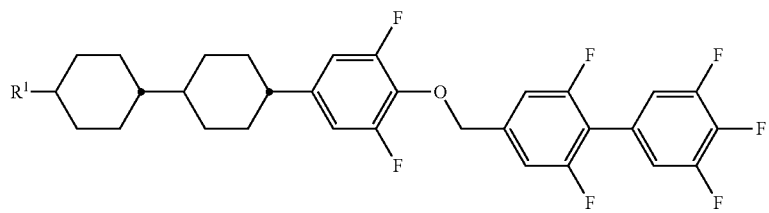
(22-2)
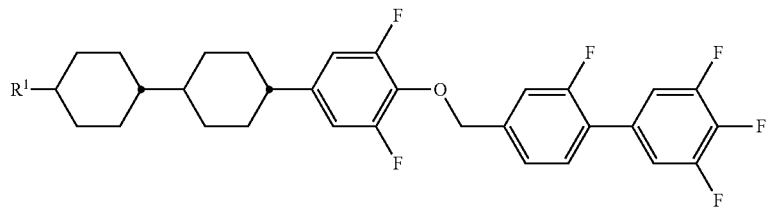
(22-3)
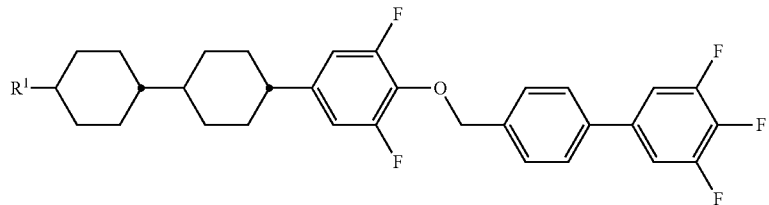
(22-4)
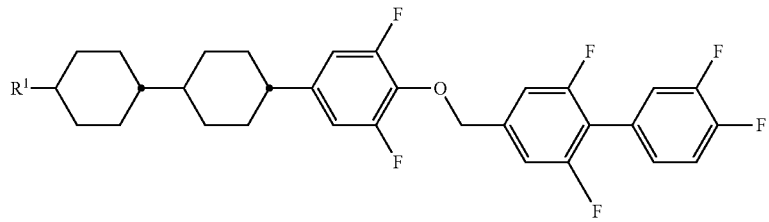
(22-5)
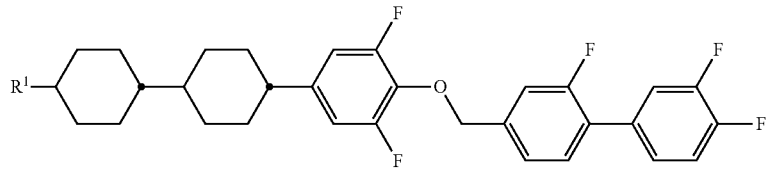
(22-6)
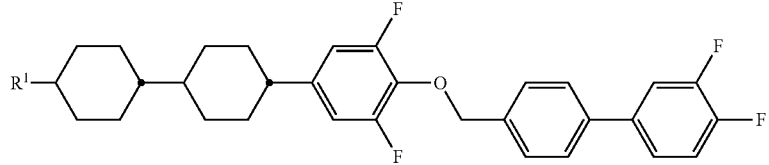

(22-7)
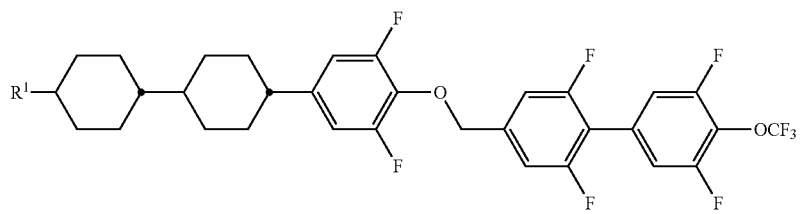
(22-8)
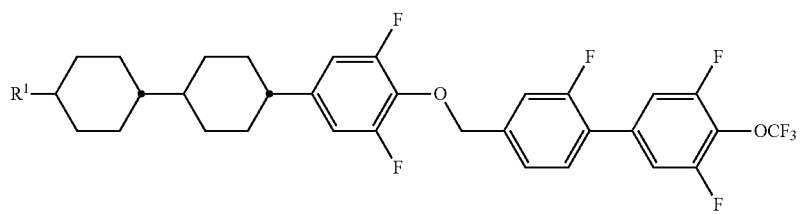
(22-9)
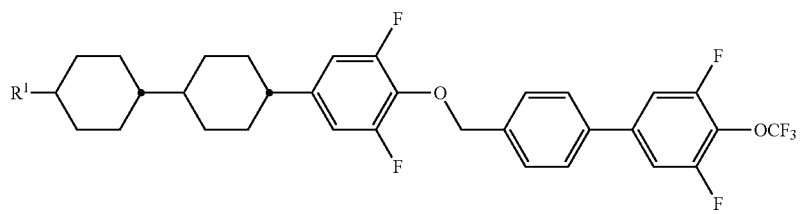
[Chem. 28]
(23-1)
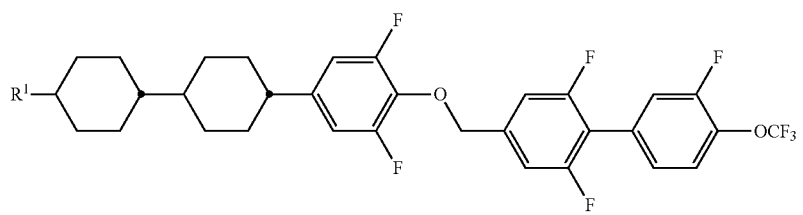
(23-2)
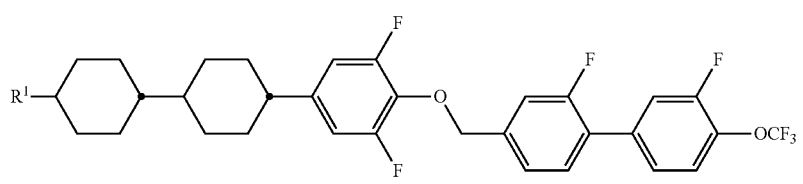
(23-3)
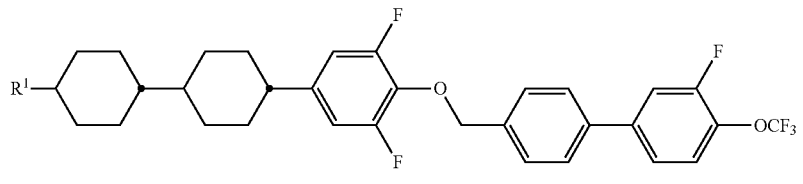
(23-4)
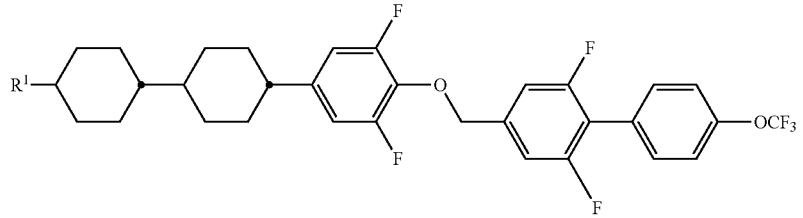

(23-5)
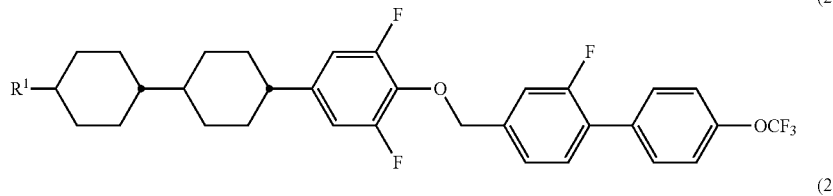
(23-6)
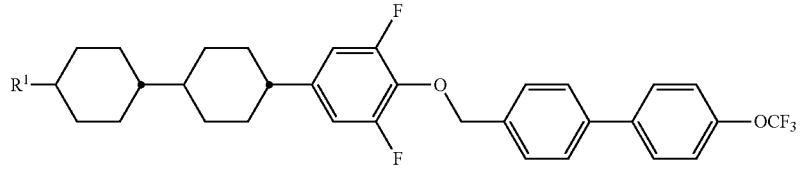
(23-7)
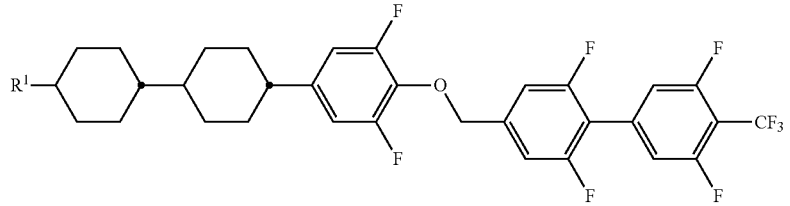
(23-8)
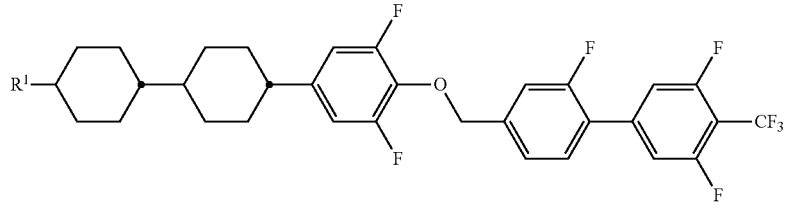
(23-9)
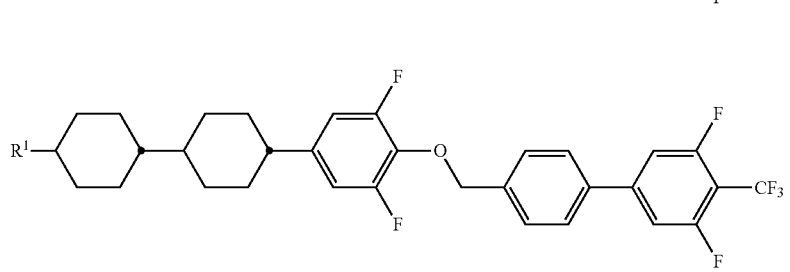
[Chem. 29]
(24-1)
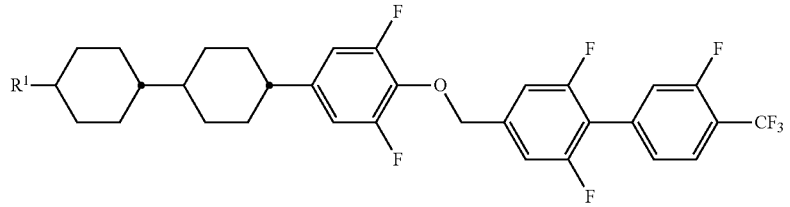
(24-2)
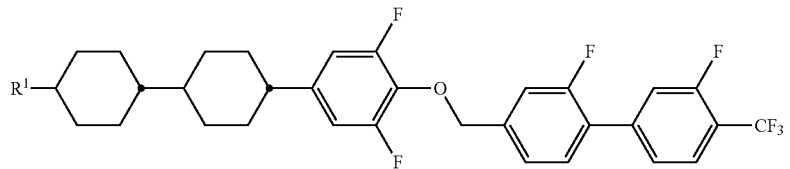

-continued
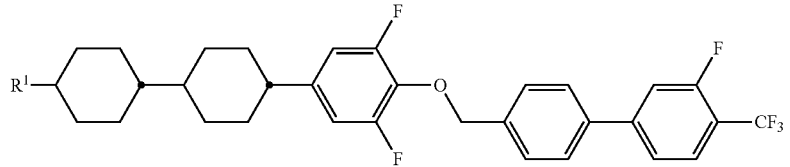
(24-3)
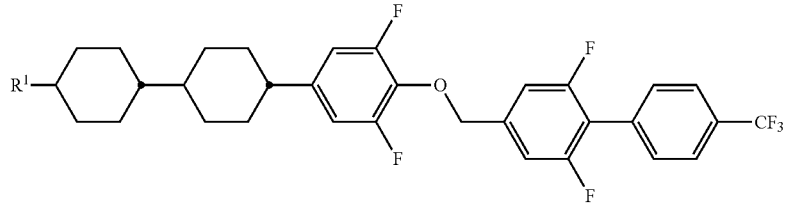
(24-4)
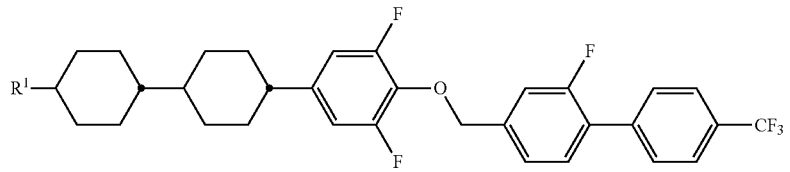
(24-5)
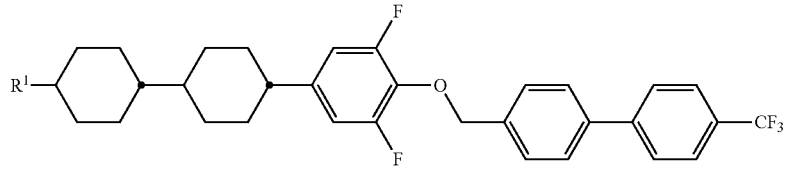
(24-6)
[Chem. 30]
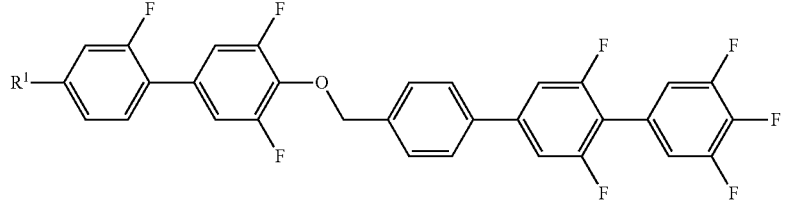
(25-1)
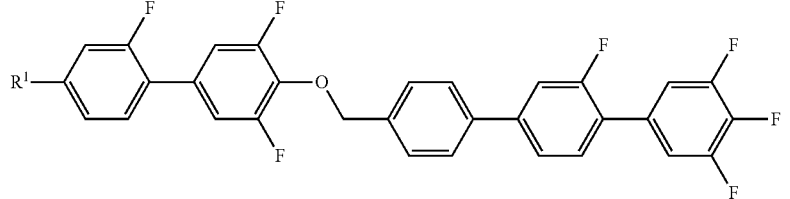
(25-2)
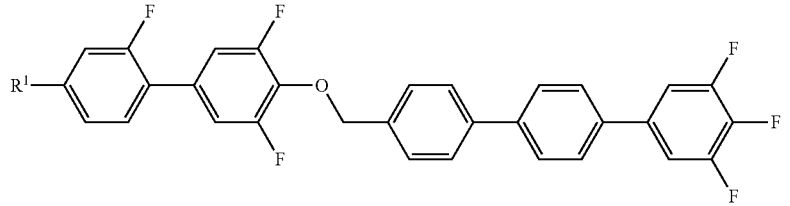
(25-3)

(25-4)
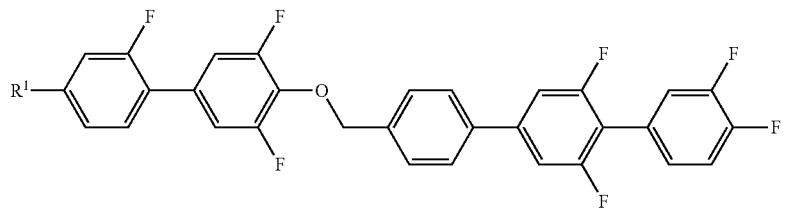
(25-5)
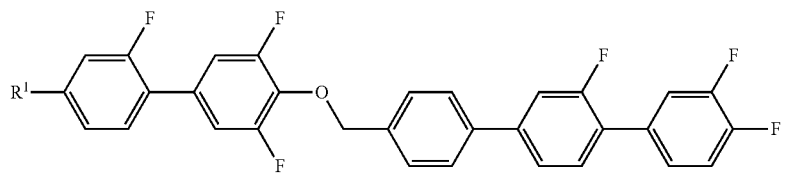
(25-6)
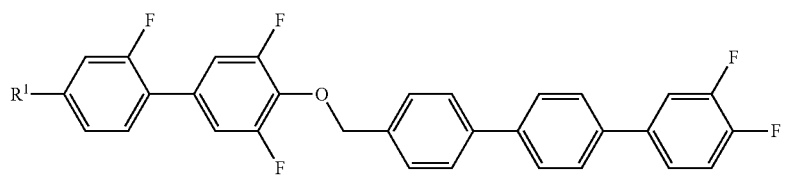
[Chem. 31]
(26-1)
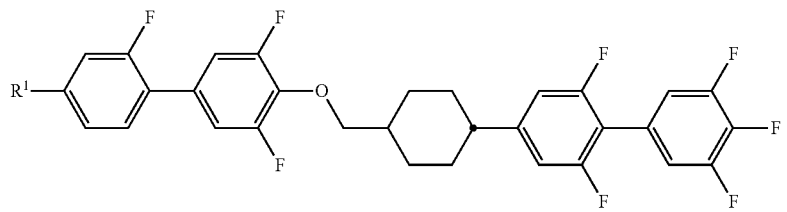
(26-2)
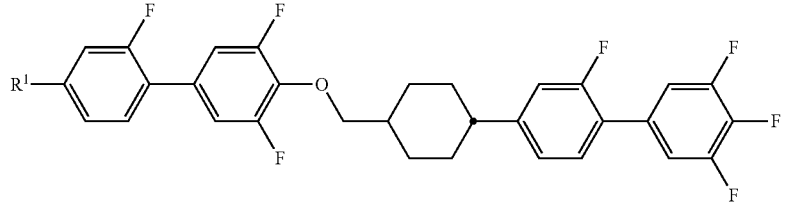
(26-3)
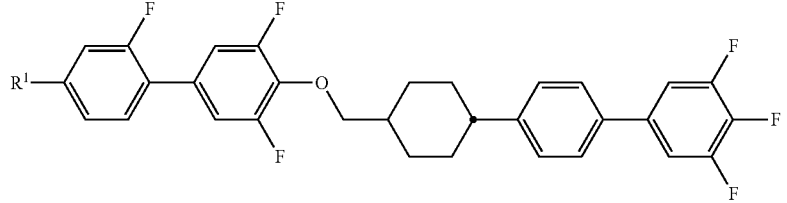
(26-4)
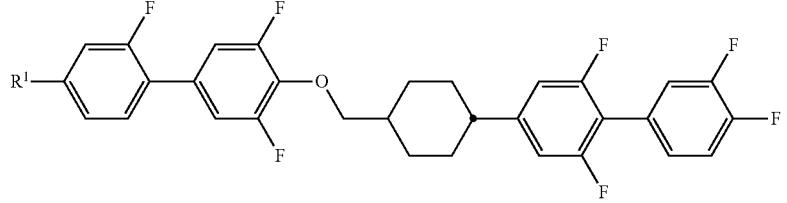

(26-5)
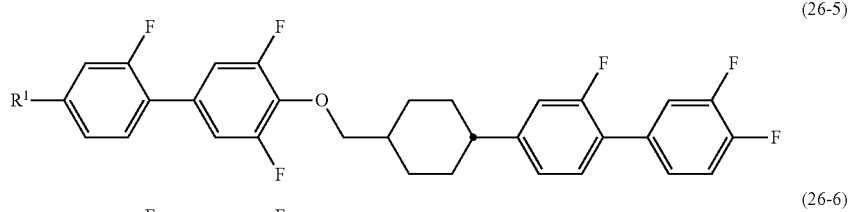
(26-6)
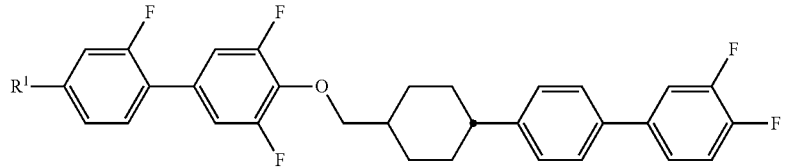
[Chem. 32]
(27-1)
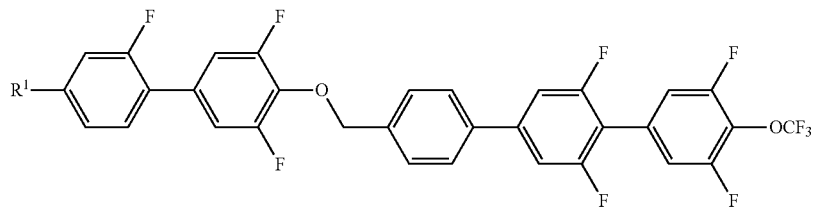
(27-2)
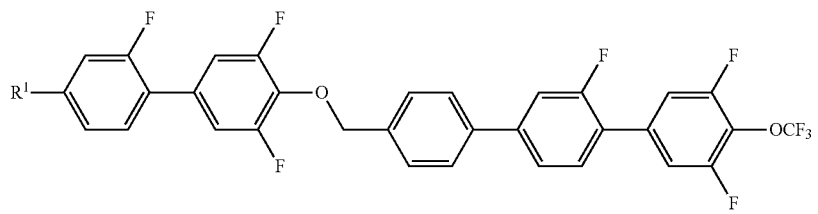
(27-3)
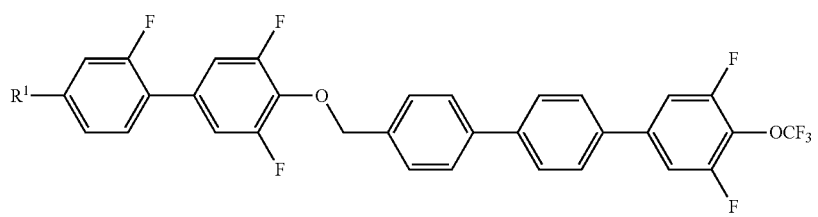
(27-4)
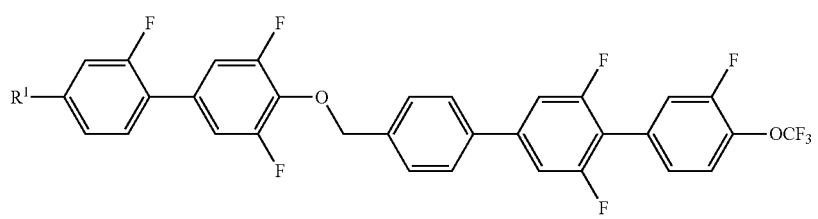
(27-5)
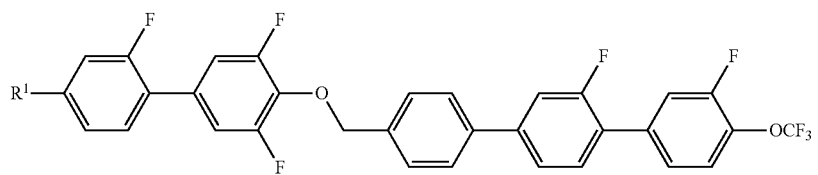

(27-6)
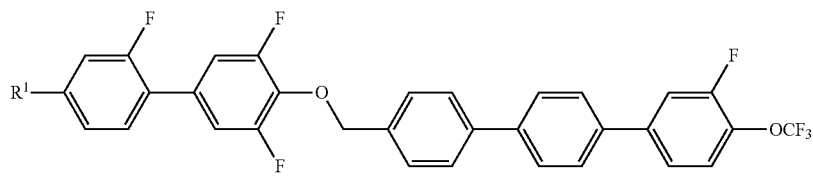
(27-7)
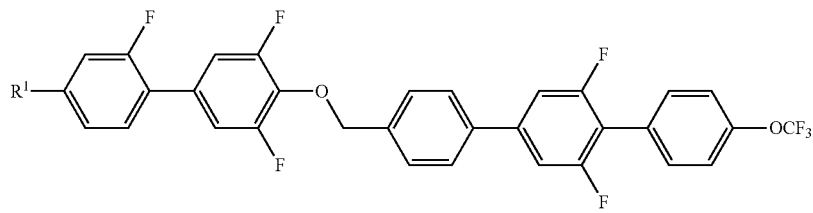
(27-8)
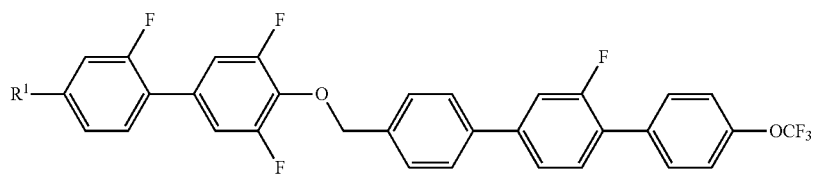
(27-9)
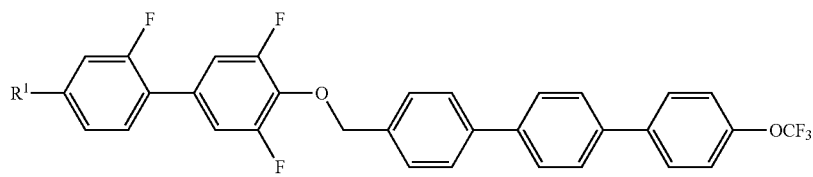
[Chem. 33]
(28-1)
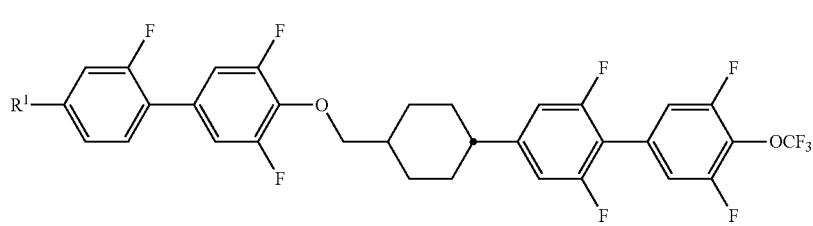
(28-2)
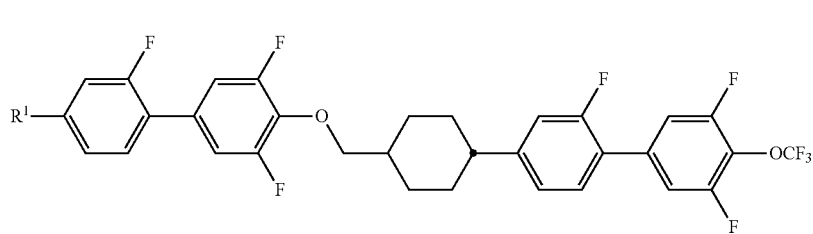
(28-3)
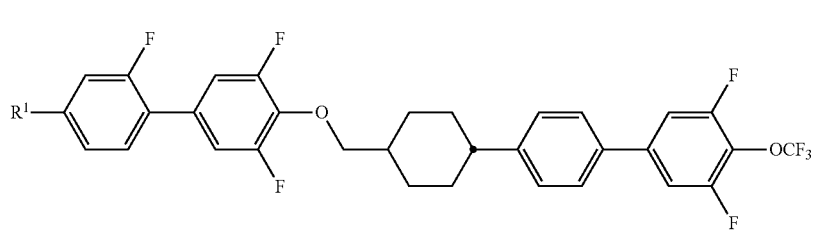

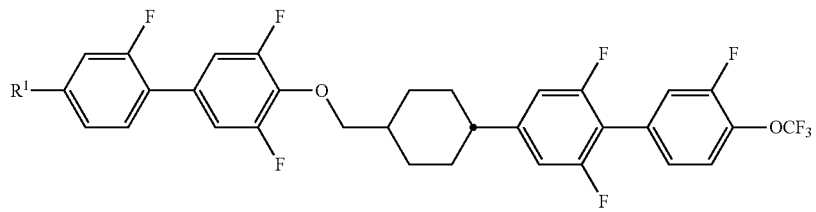
(28-4)
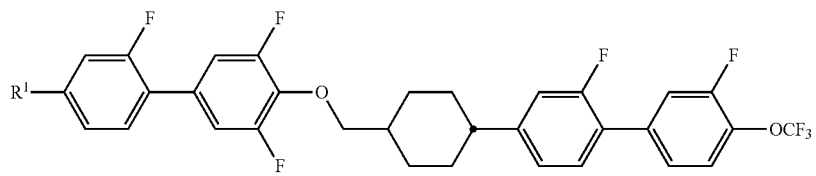
(28-5)
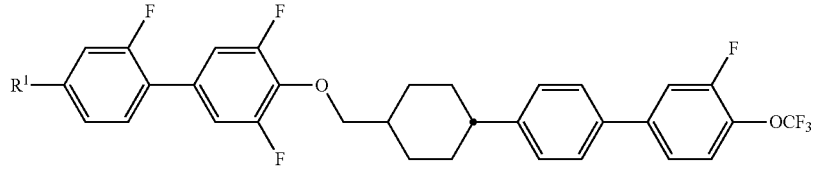
(28-6)
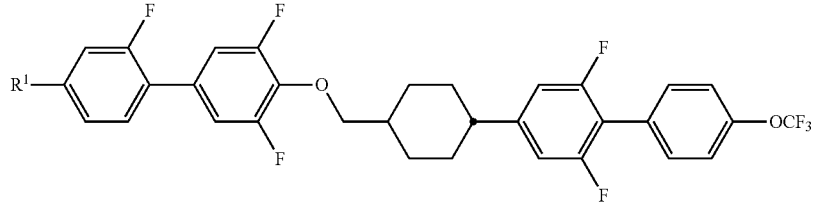
(28-7)
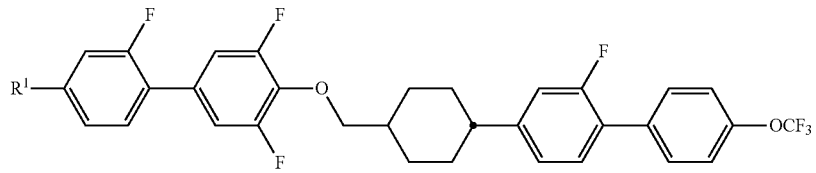
(28-8)
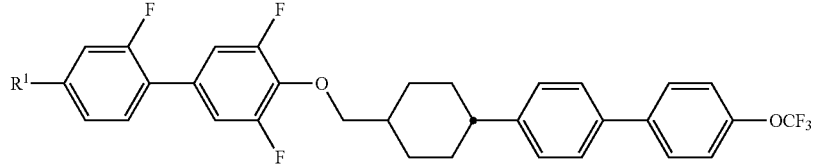
(28-9)
[Chem. 34]
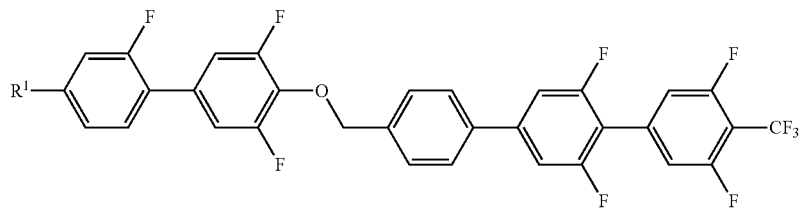
(29-1)

-continued
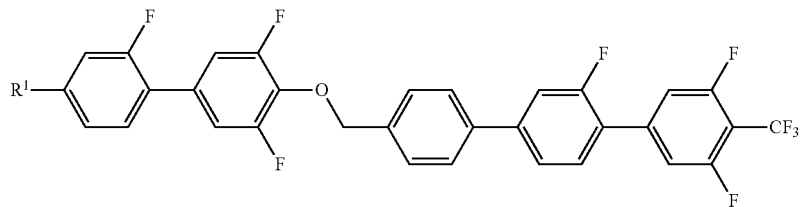
(29-2)
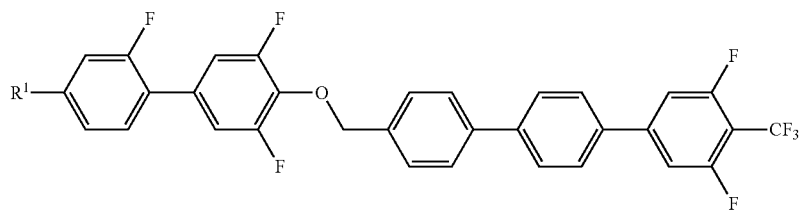
(29-3)
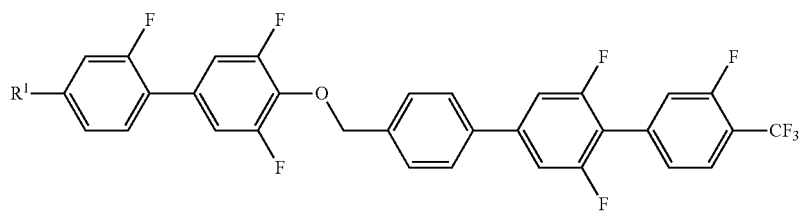
(29-4)
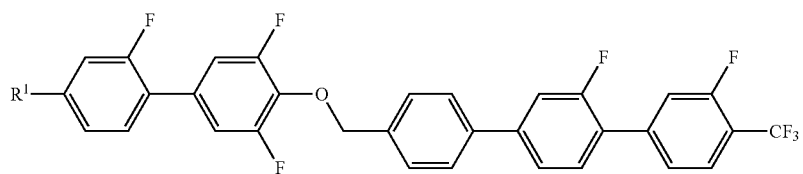
(29-5)
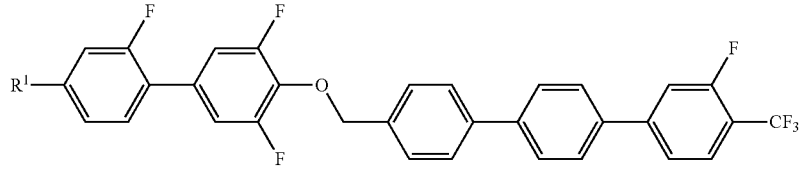
(29-6)
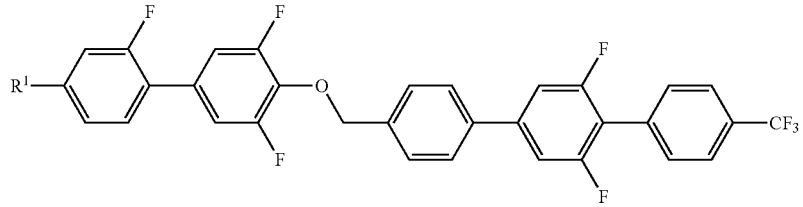
(29-7)
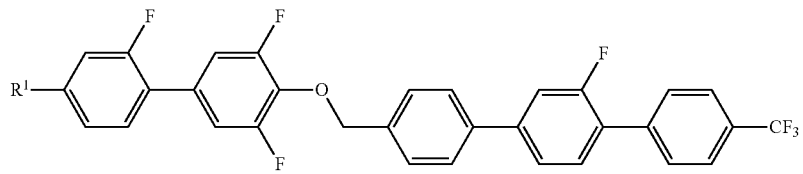
(29-8)
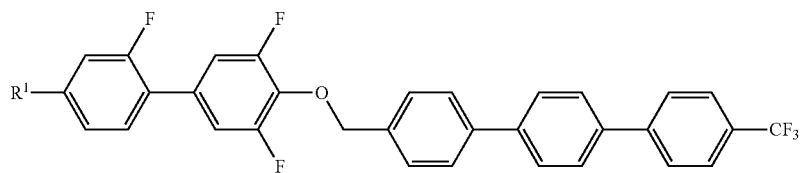
(29-9)

[Chem. 35]
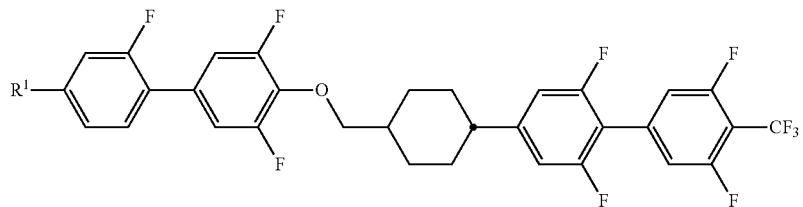
(30-1)
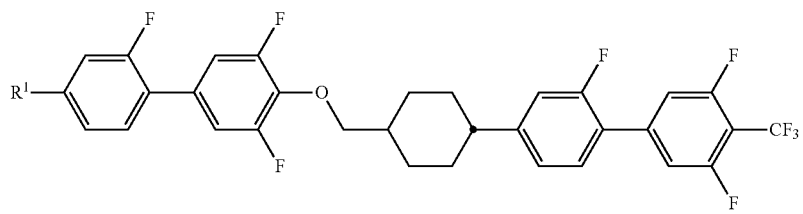
(30-2)
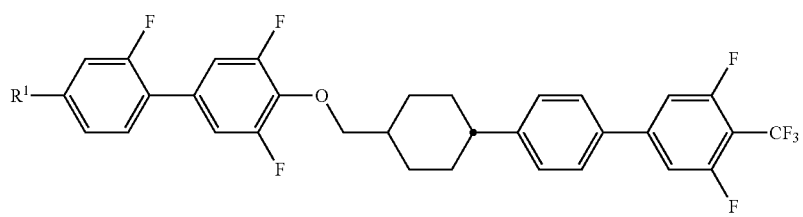
(30-3)
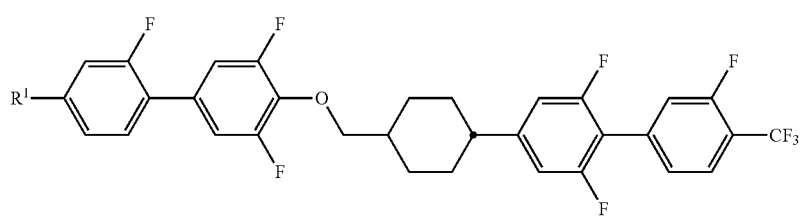
(30-4)
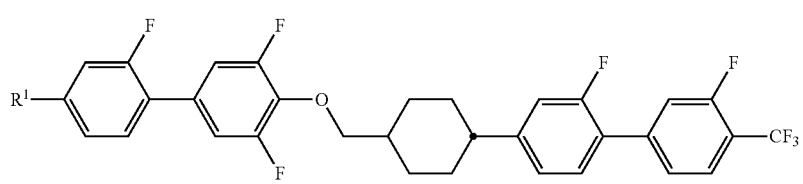
(30-5)
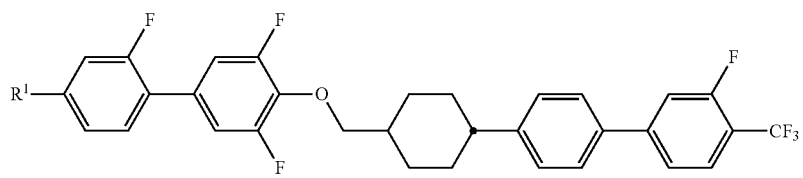
(30-6)
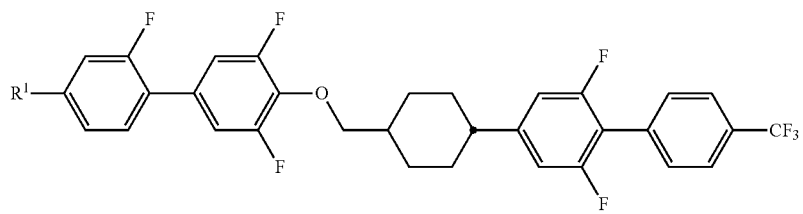
(30-7)

(30-8)
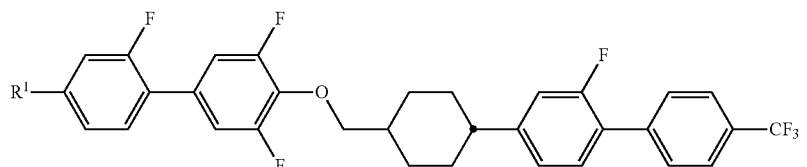
(30-9)
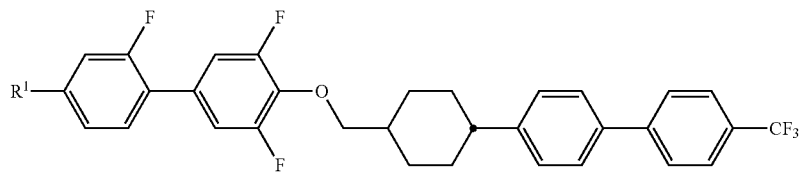
[Chem. 36]
(31-1)
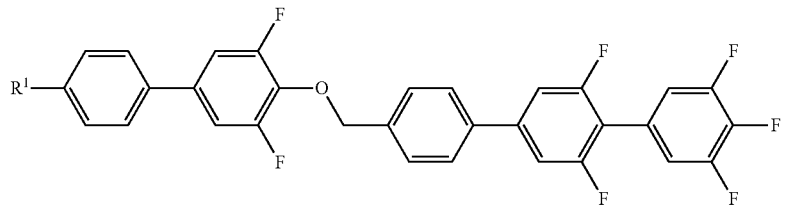
(31-2)
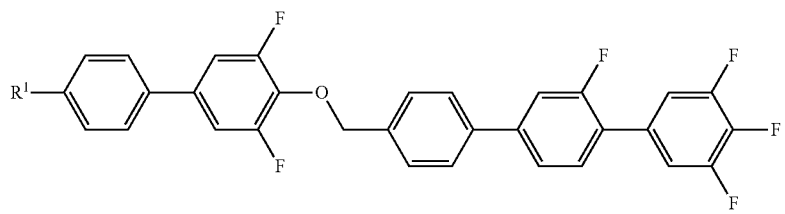
(31-3)
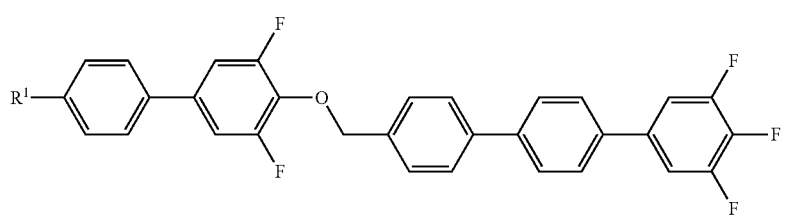
(31-4)
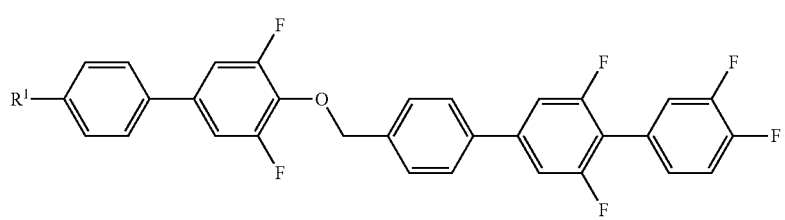
(31-5)
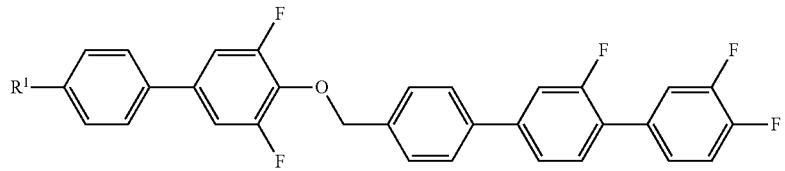

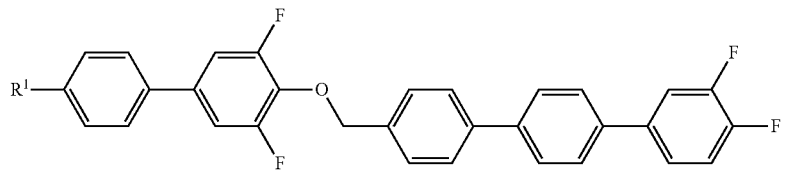
(31-6)
[Chem. 37]
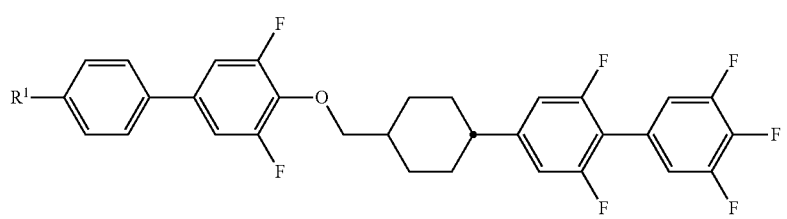
(32-1)
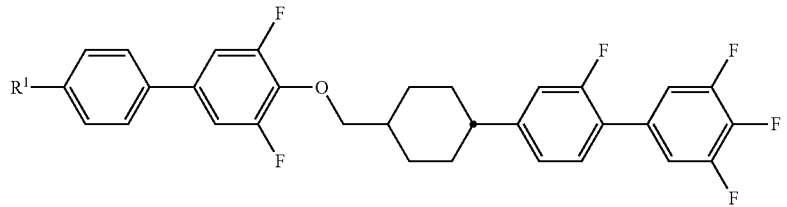
(32-2)
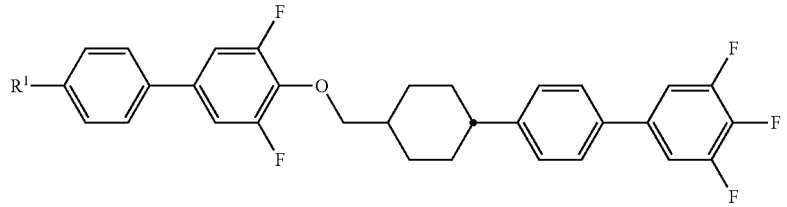
(32-3)
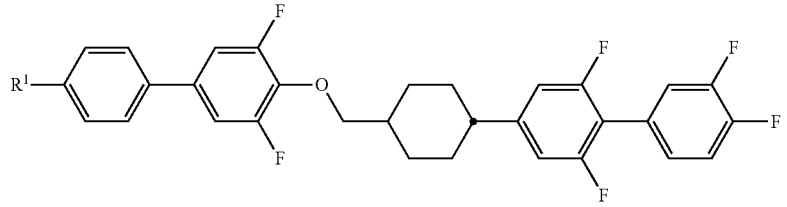
(32-4)
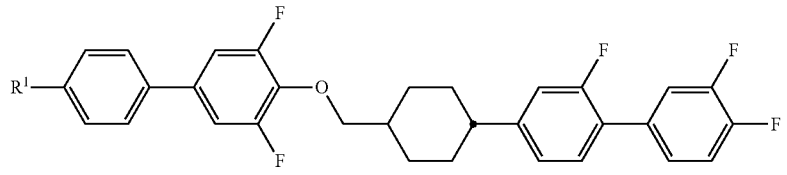
(32-5)
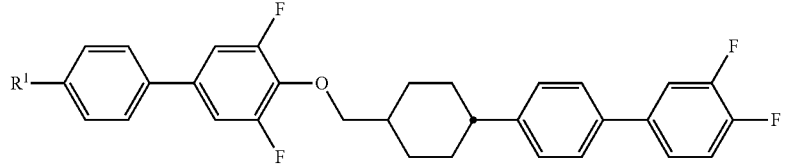
(32-6)

[Chem. 38]
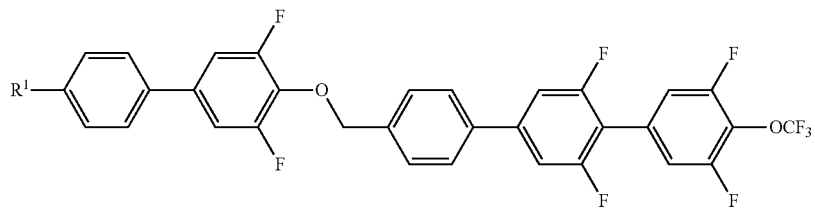
(33-1)
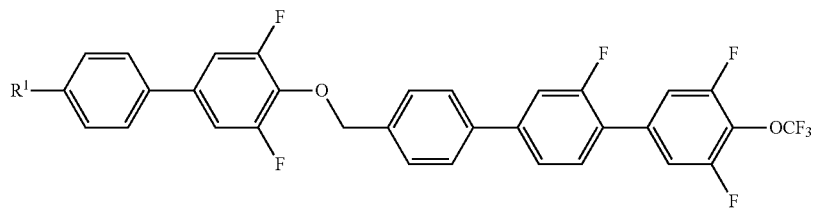
(33-2)
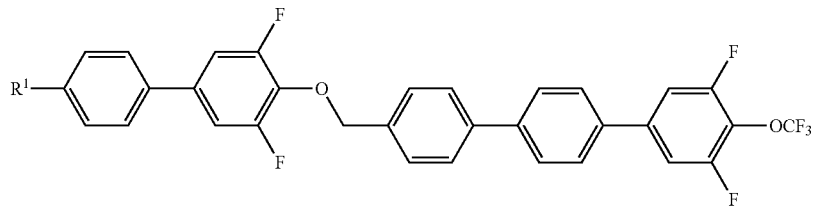
(33-3)
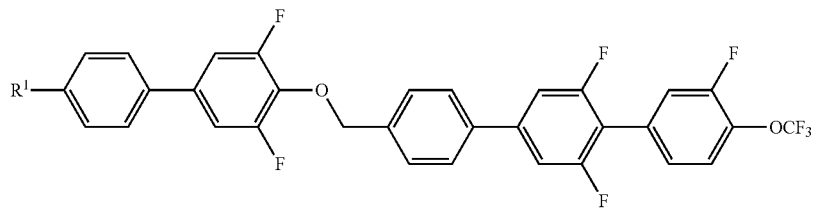
(33-4)
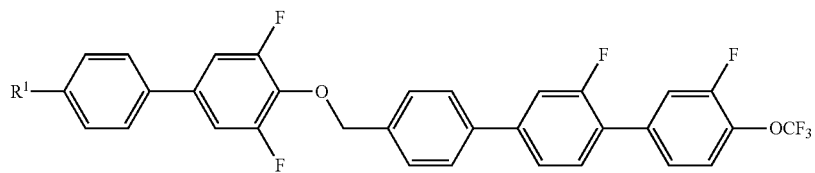
(33-5)
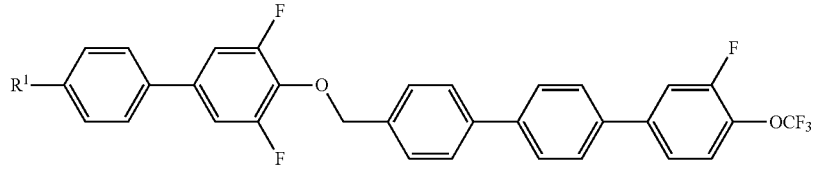
(33-6)
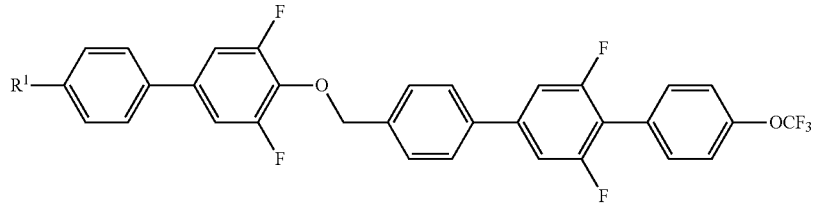
(33-7)

(33-8)
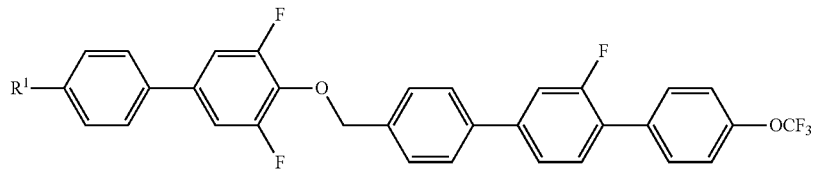
(33-9)
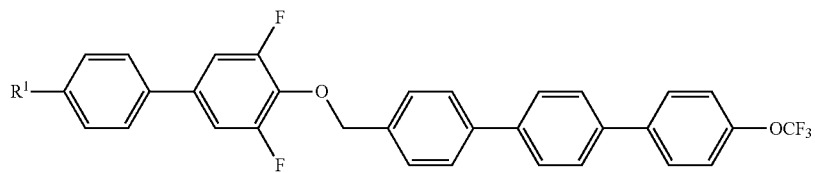
[Chem. 39]
(34-1)
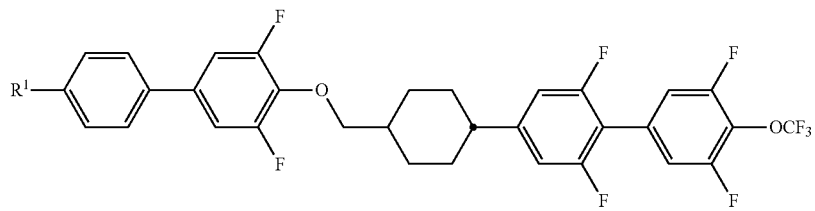
(34-2)
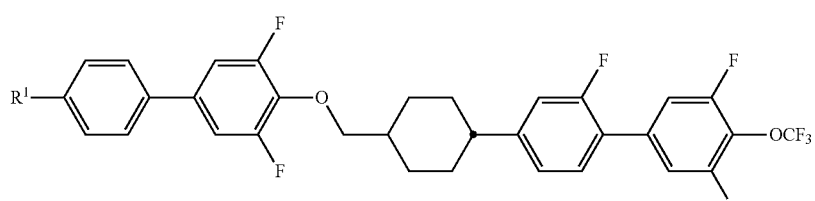
(34-3)
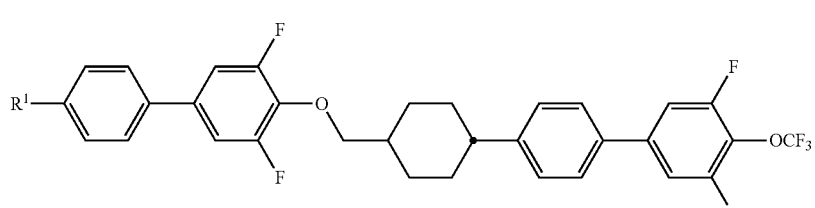
(34-4)
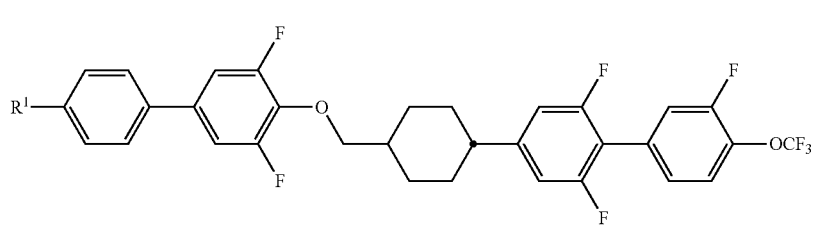
(34-5)
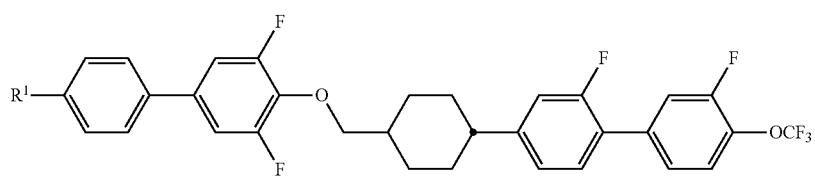

(34-6)
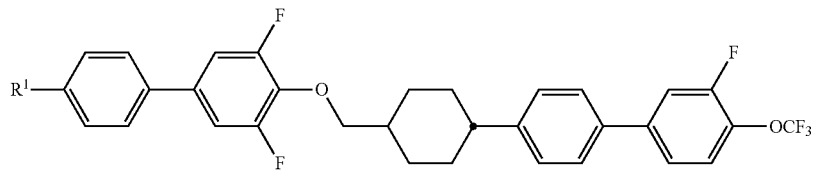
(34-7)
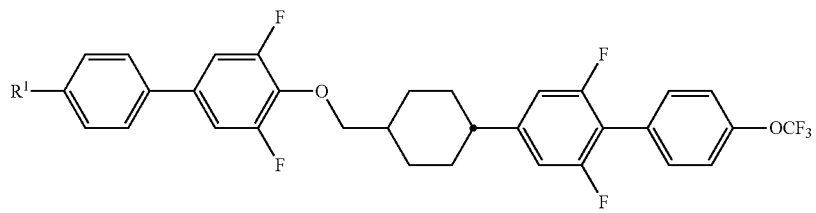
(34-8)
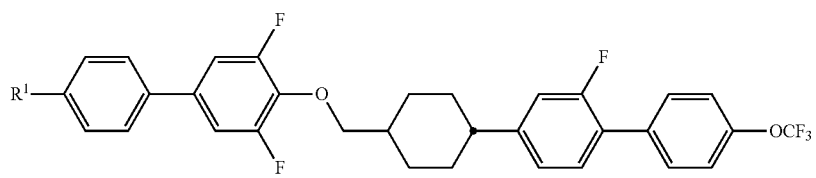
(34-9)
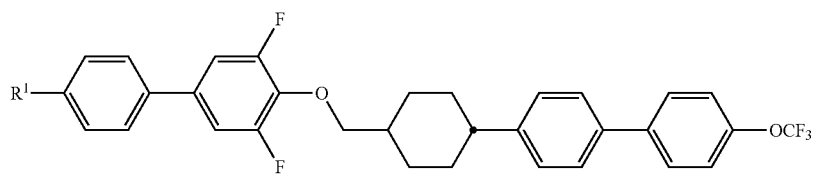
[Chem. 40]
(35-1)
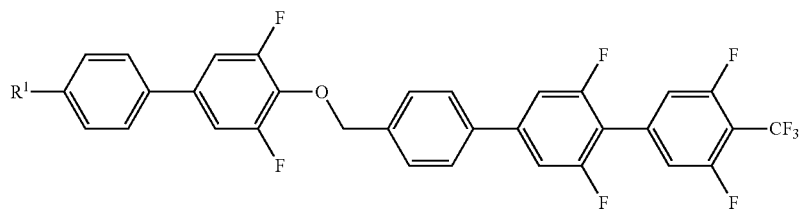
(35-2)
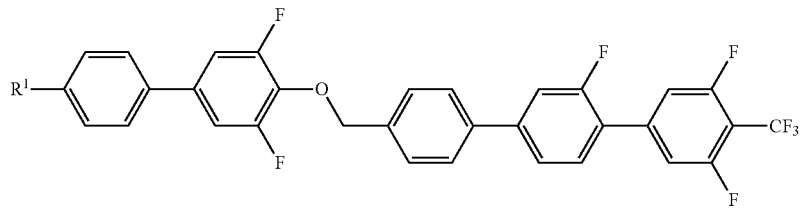
(35-3)
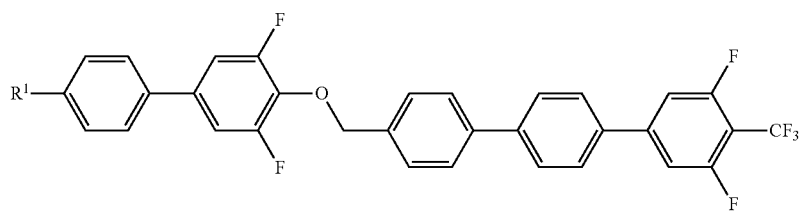

-continued
(35-4)
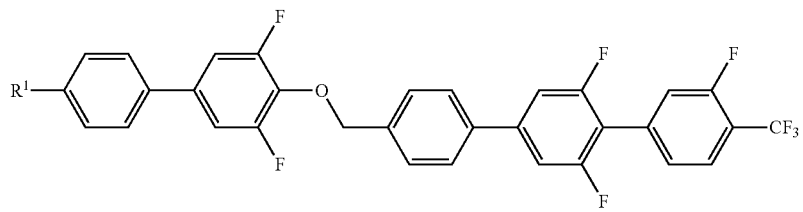
(35-5)
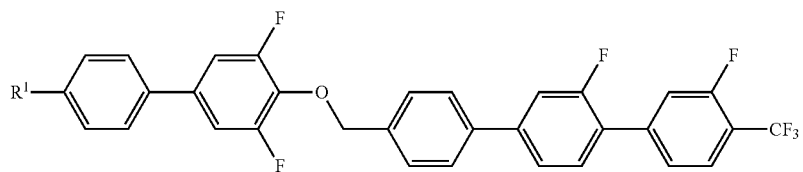
(35-6)
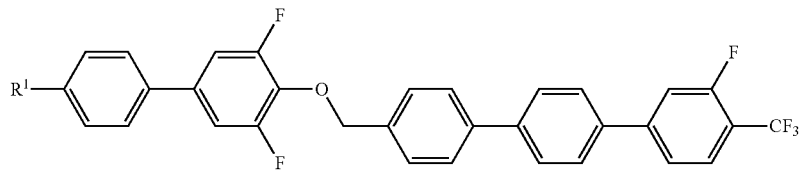
(35-7)
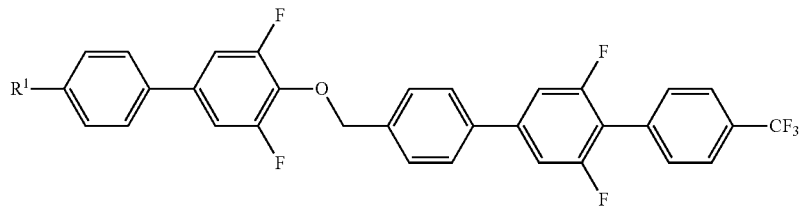
(35-8)
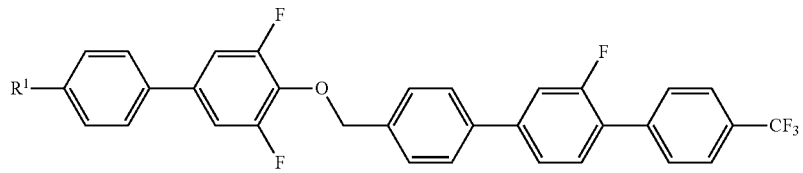
(35-9)
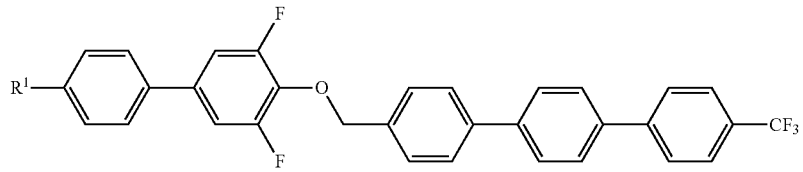
[Chem. 41]
(36-1)
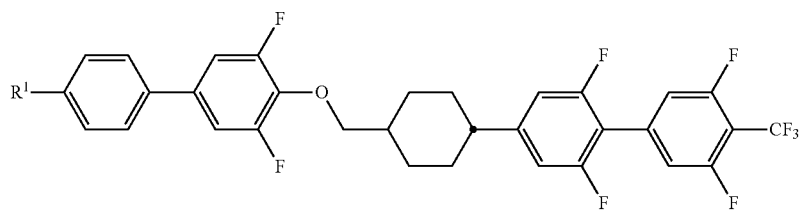

(36-2)
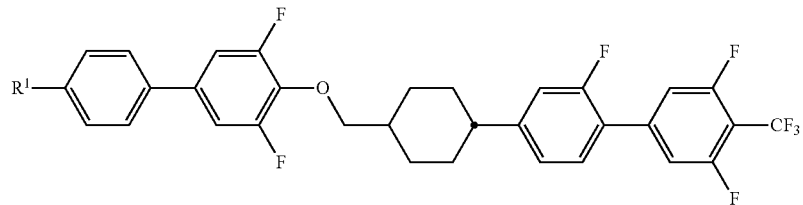
(36-3)
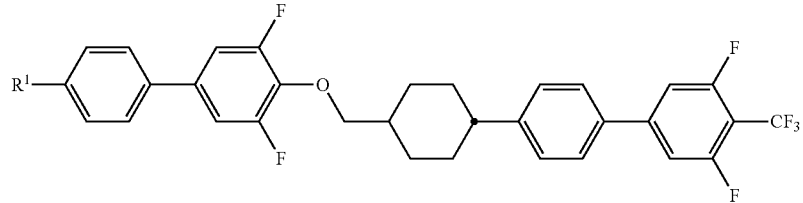
(36-4)
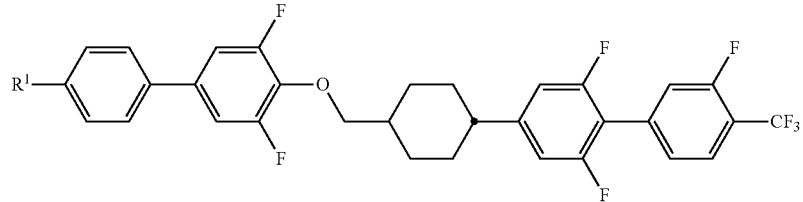
(36-5)
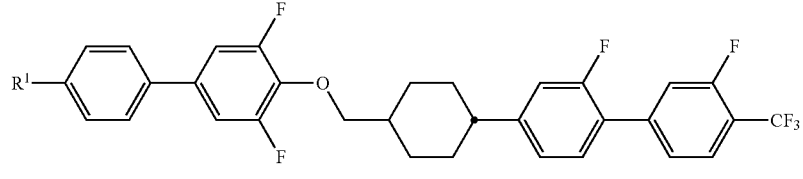
(36-6)
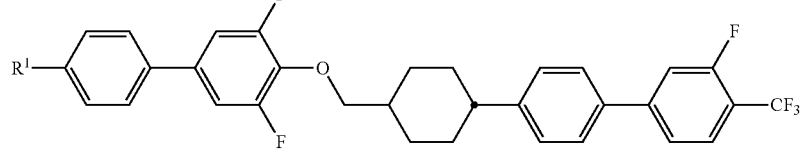
(36-7)
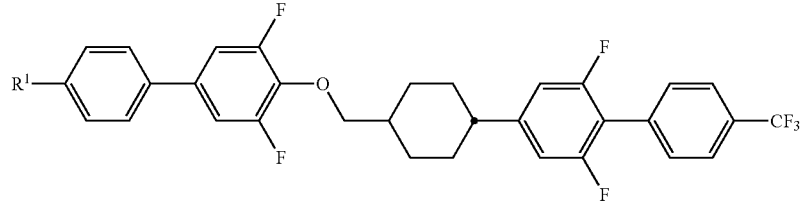
(36-8)
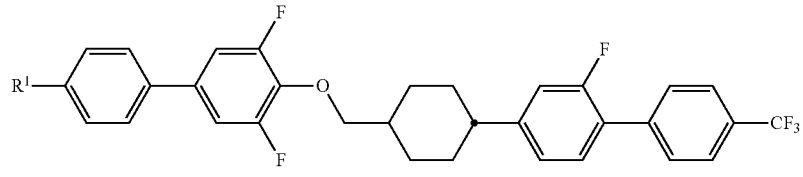
(36-9)
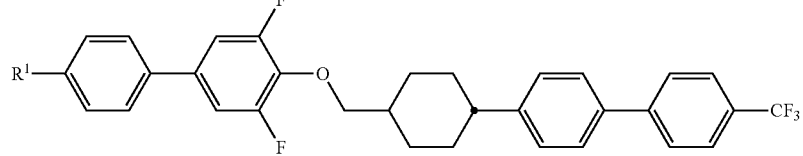

[Chem. 42]
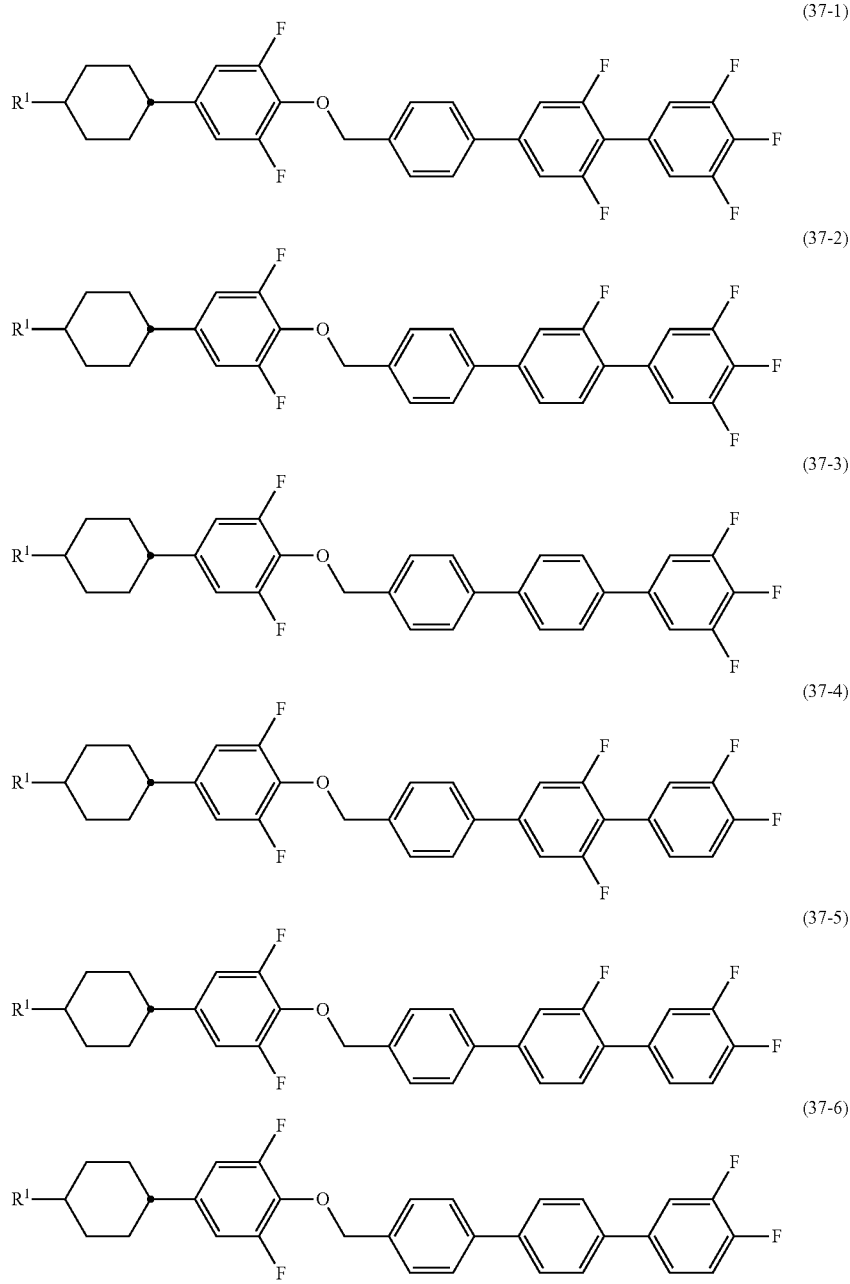
[Chem. 43]
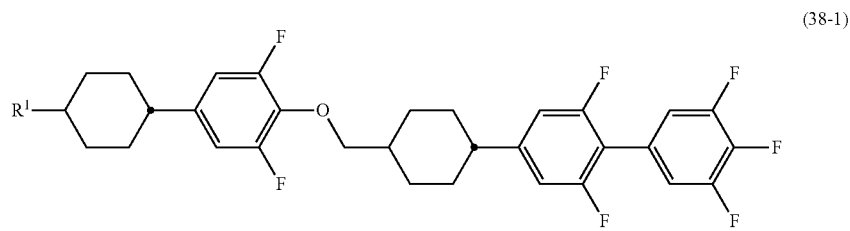

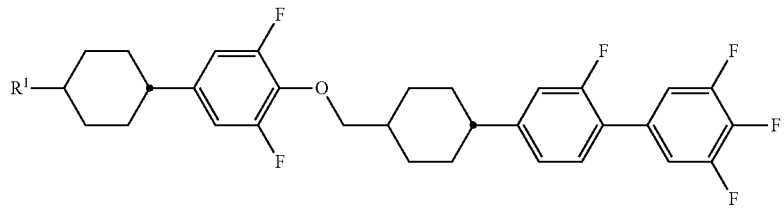
(38-2)
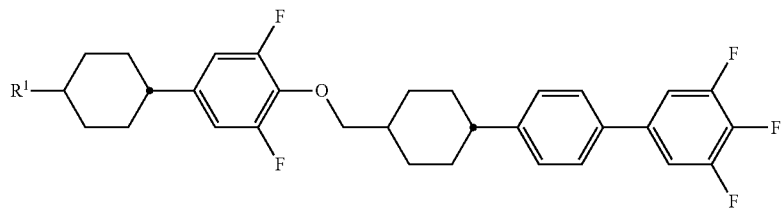
(38-3)
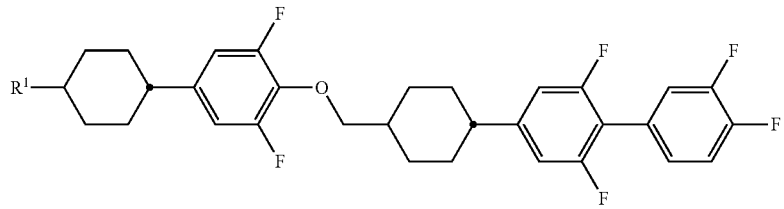
(38-4)
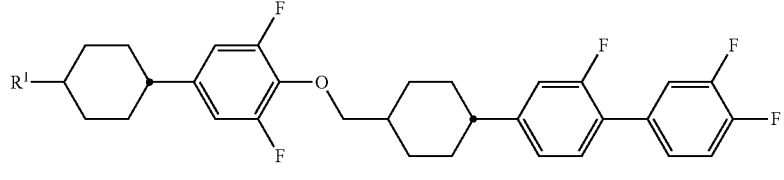
(38-5)
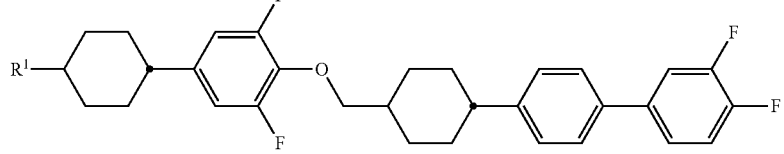
(38-6)
[Chem. 44]
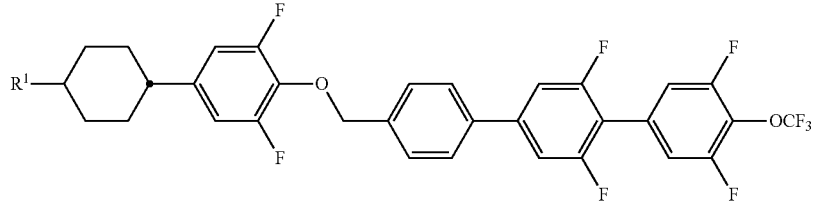
(39-1)
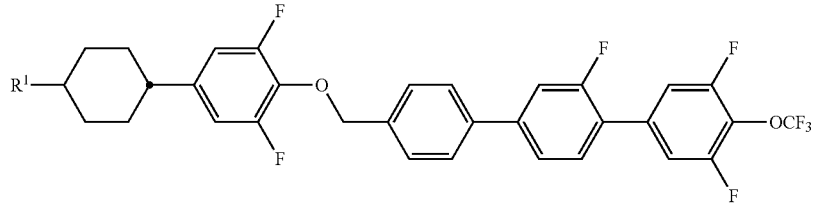
(39-2)

(39-3)
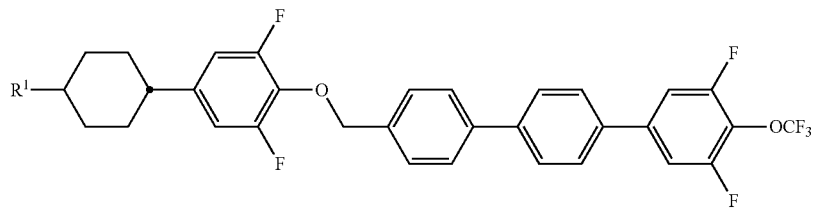
(39-4)
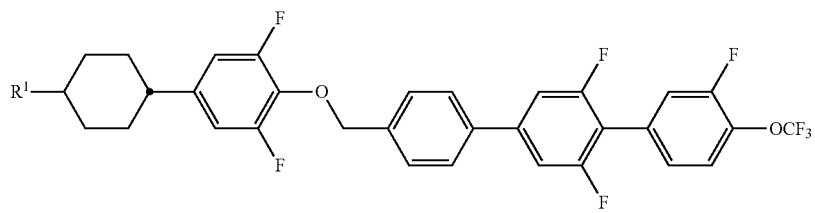
(39-5)
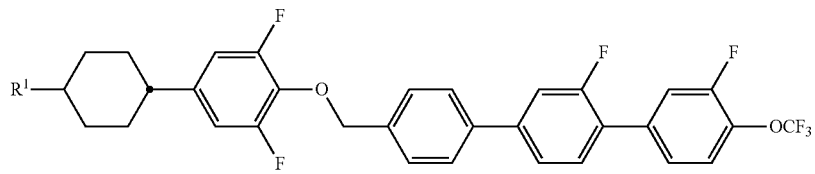
(39-6)
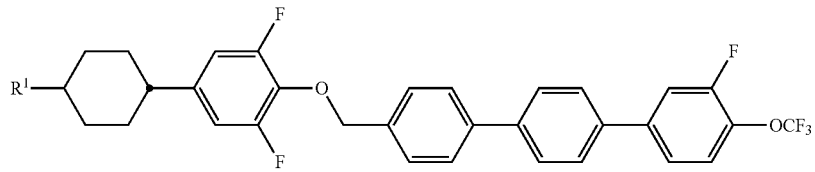
(39-7)
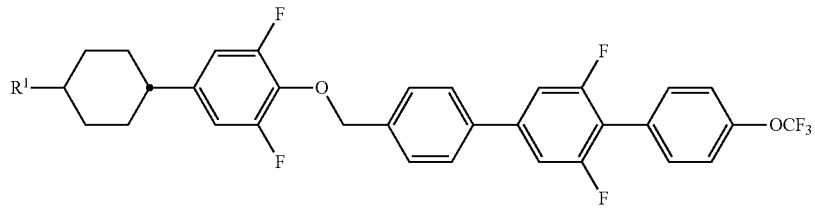
(39-8)
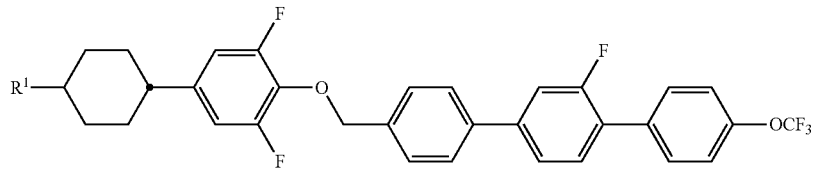
(39-9)
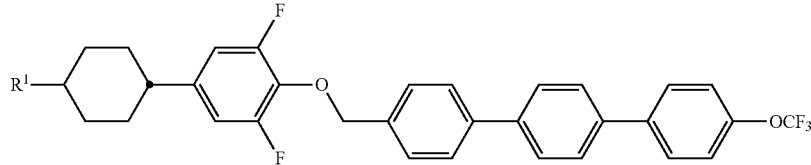

[Chem. 45]
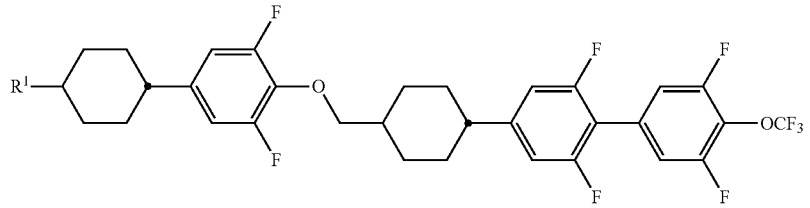
(40-1)
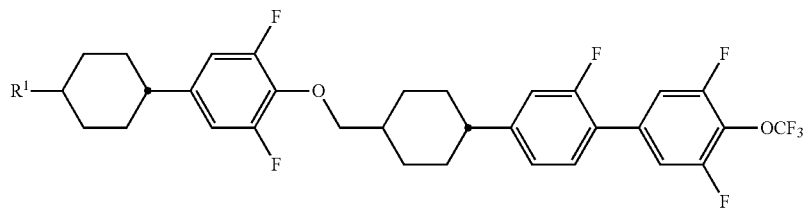
(40-2)
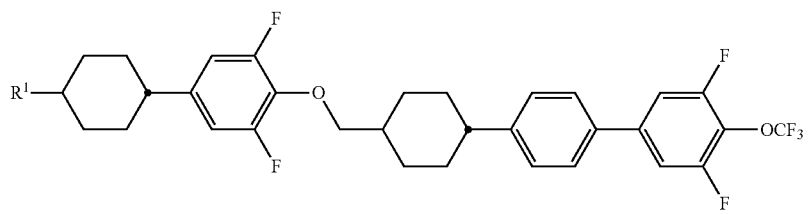
(40-3)
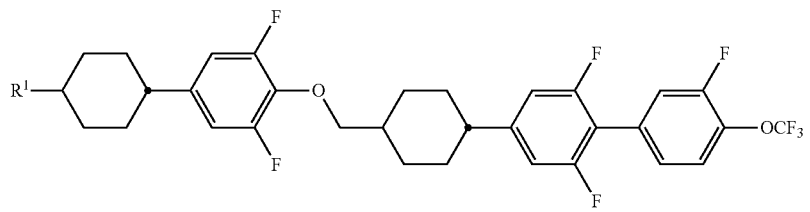
(40-4)
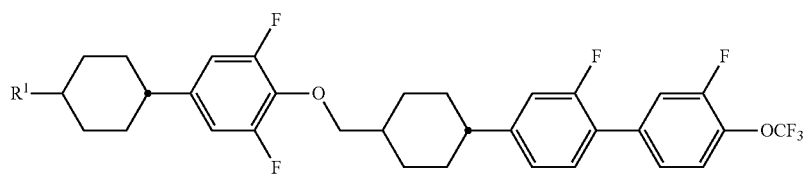
(40-5)
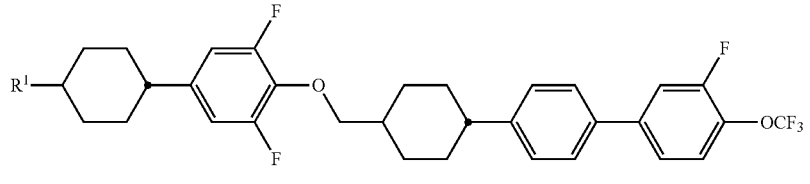
(40-6)
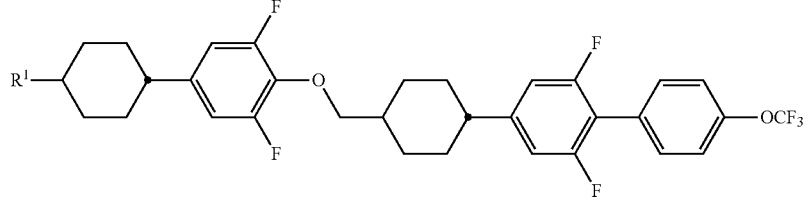
(40-7)

(40-8)
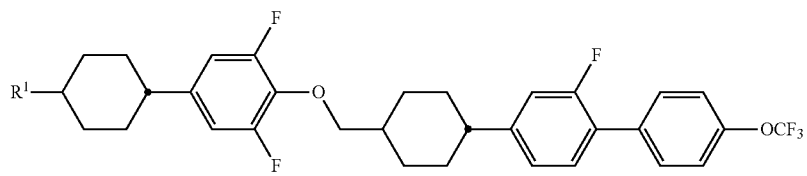
(40-9)
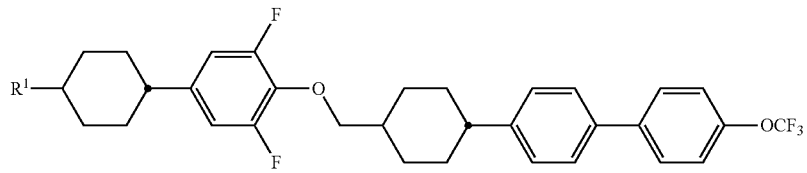
[Chem. 46]
(41-1)
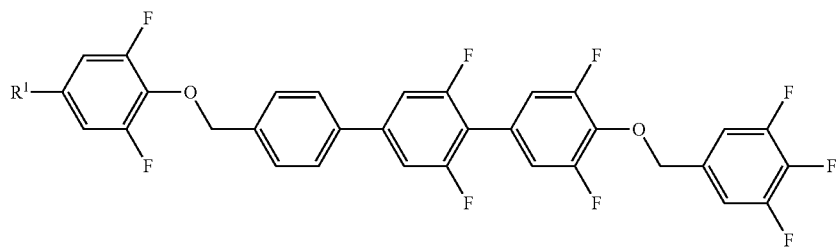
(41-2)
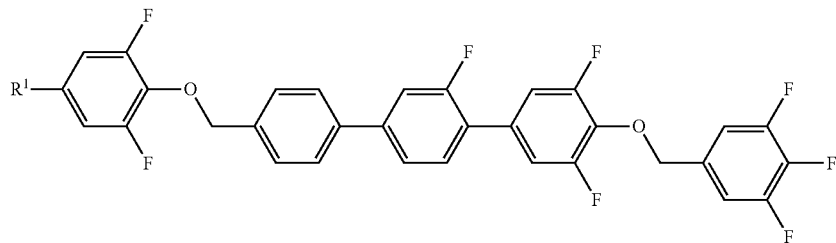
(41-3)
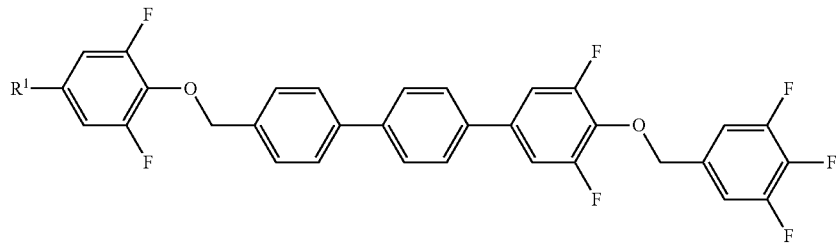
(41-4)
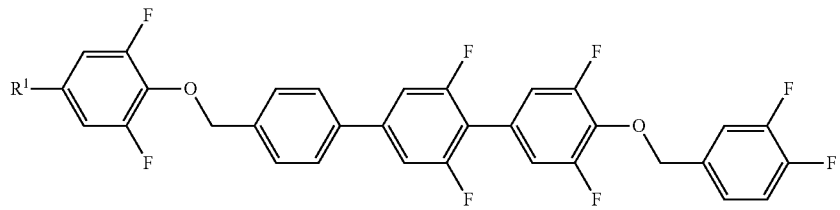

-continued
(41-5)
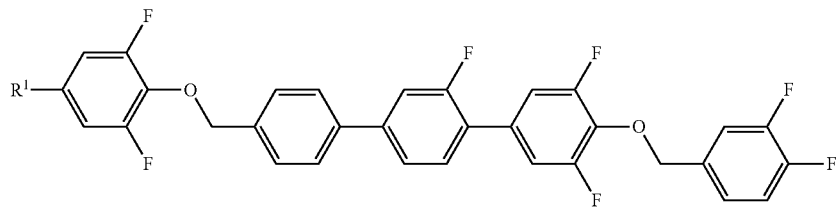
(41-6)
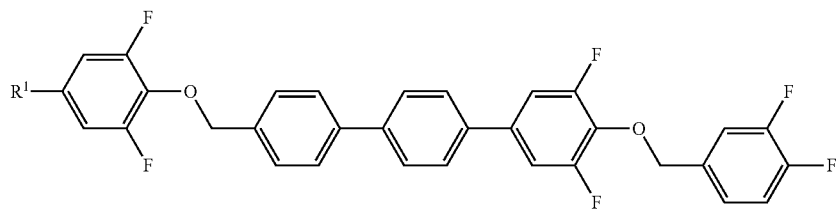
[Chem. 47]
(42-1)
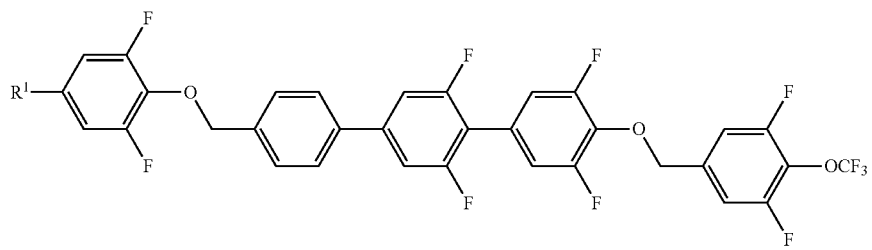
(42-2)
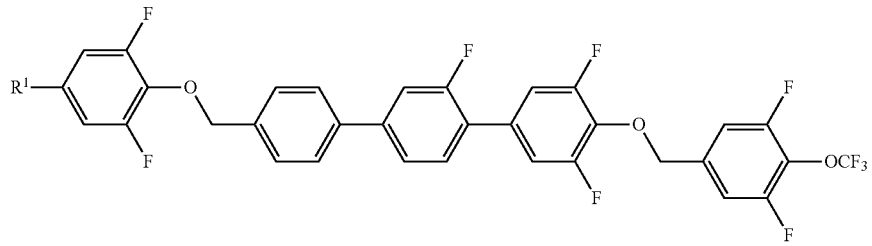
(42-3)
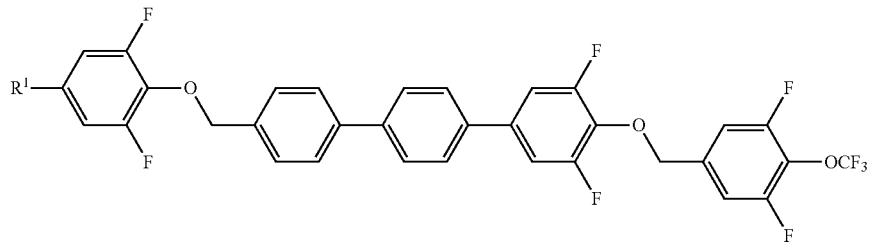
(42-4)
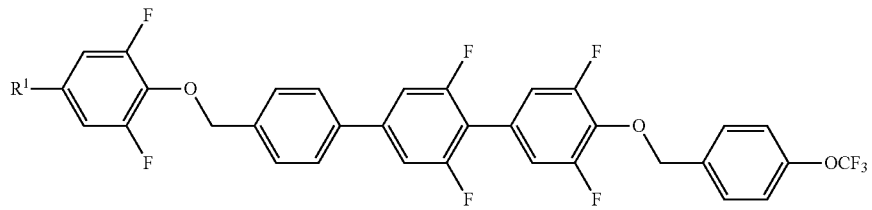

-continued
(42-5)
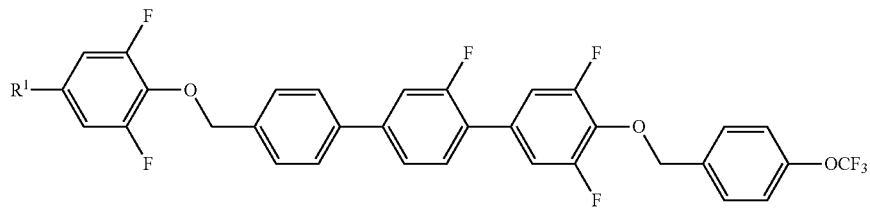
(42-6)
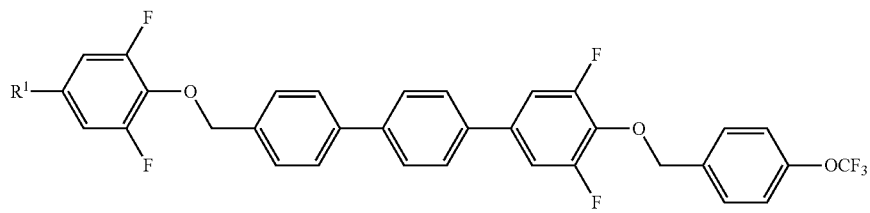
[Chem. 48]
(43-1)
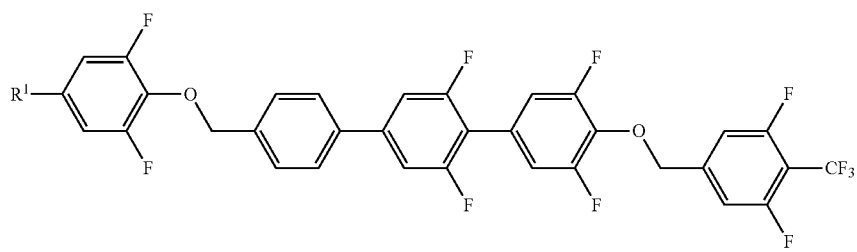
(43-2)
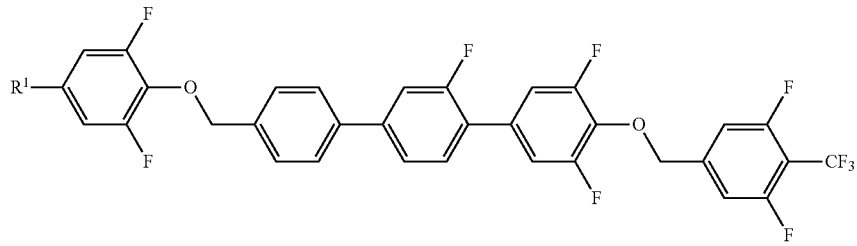
(43-3)
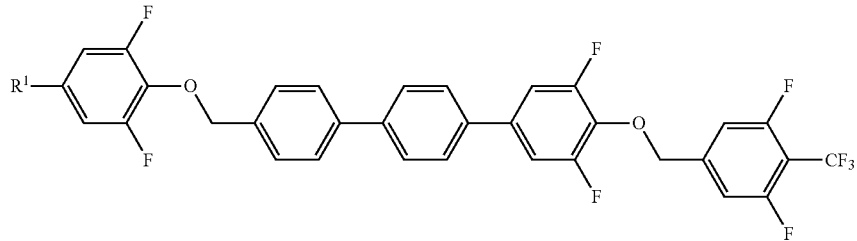
(43-4)
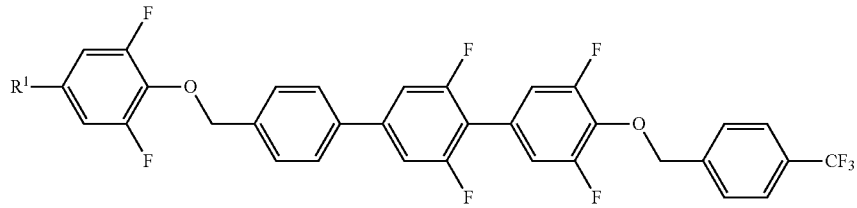

(43-5)
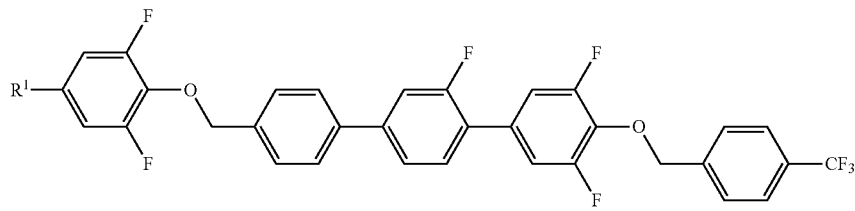
(43-6)
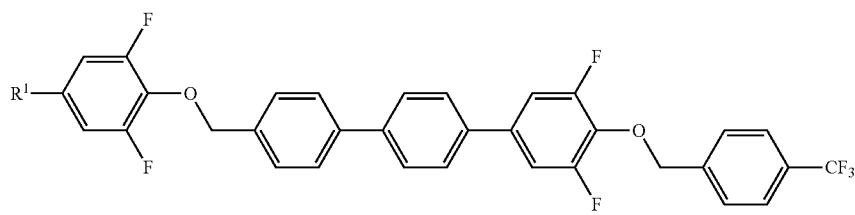
[Chem. 49]
(44-1)
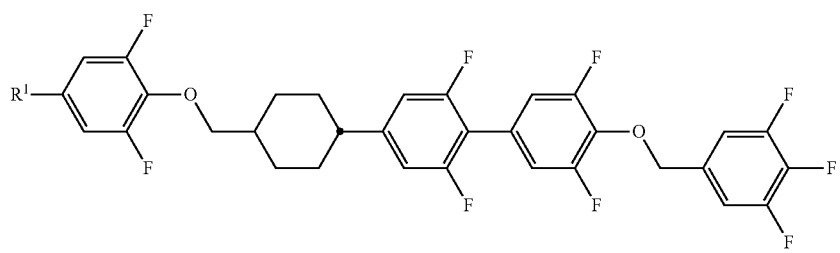
(44-2)
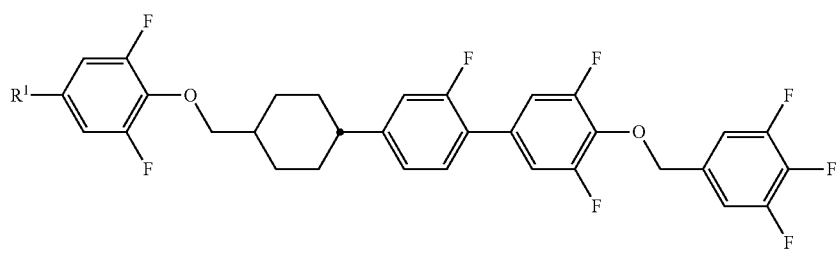
(44-3)
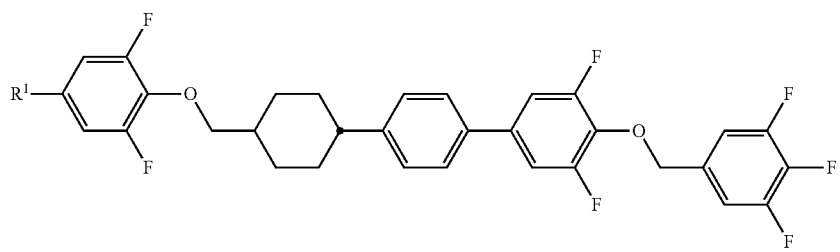
(44-4)
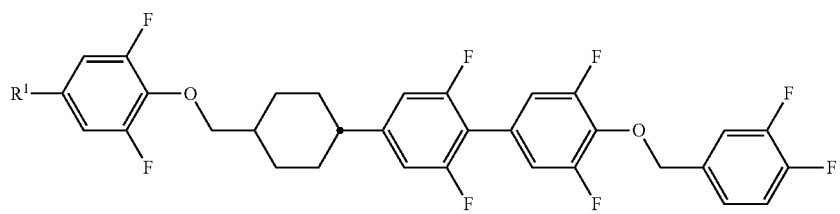

(44-5)
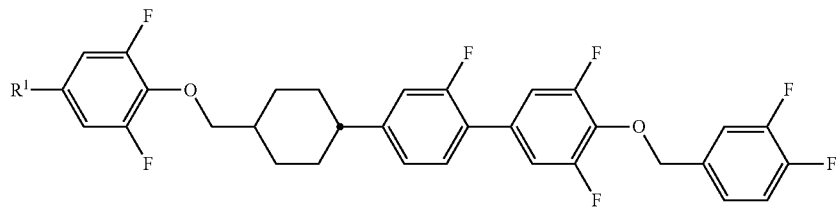
(44-6)
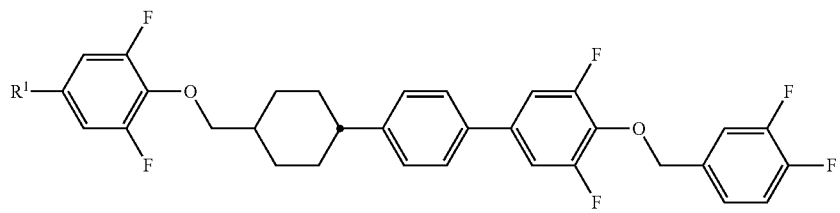
[Chem. 50]
(45-1)
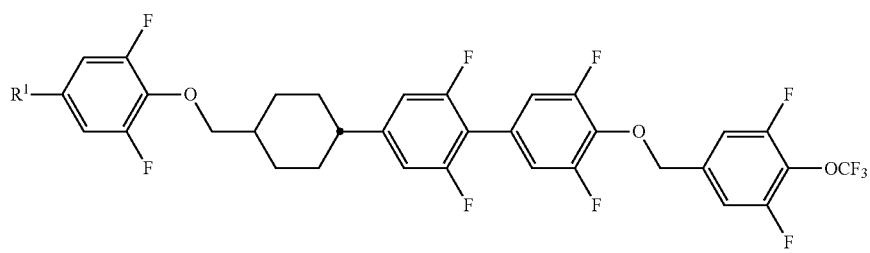
(45-2)
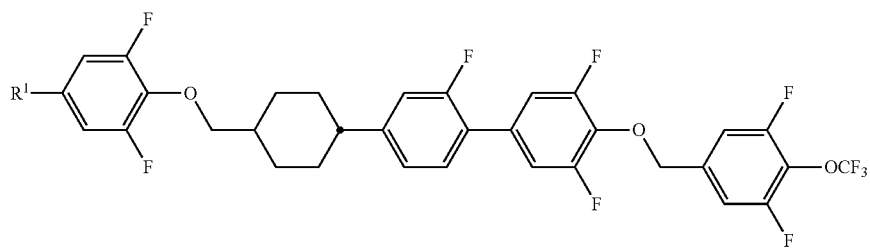
(45-3)
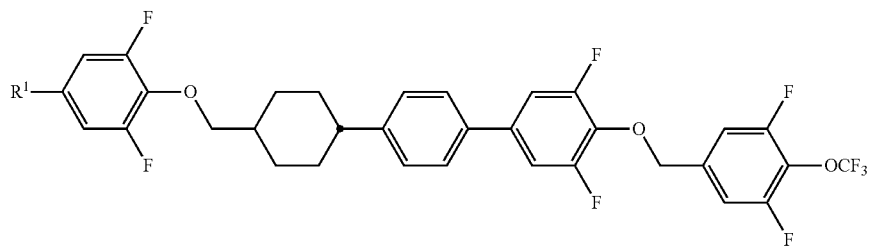
(45-4)
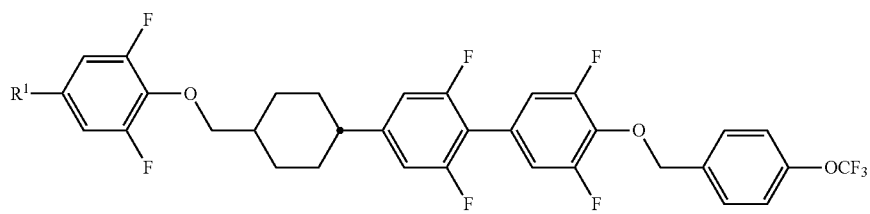

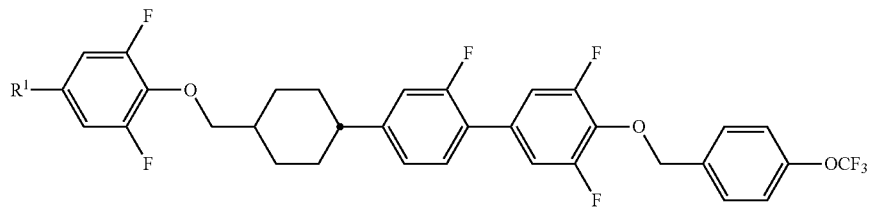
(45-5)
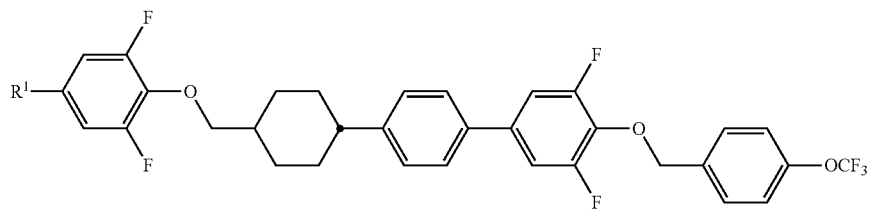
(45-6)
[Chem. 51]
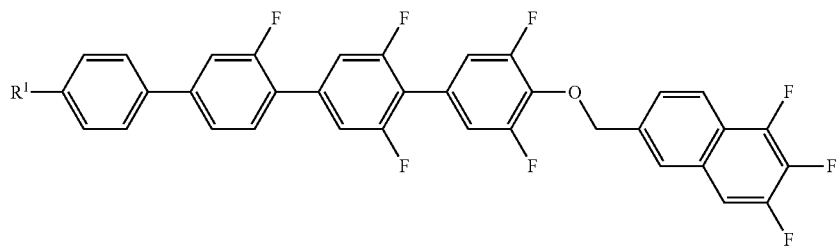
(46-1)
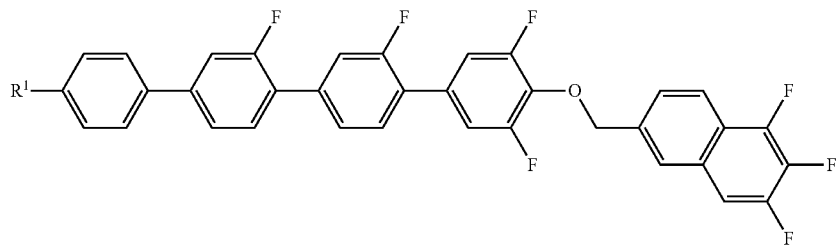
(46-2)
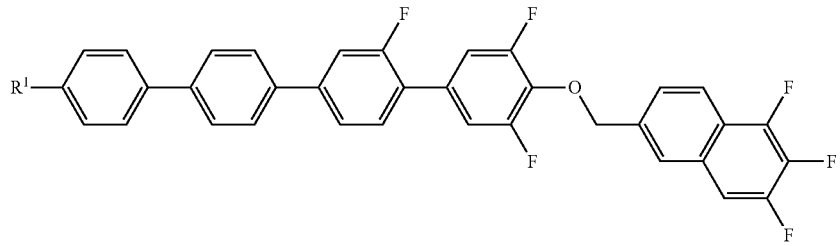
(46-3)
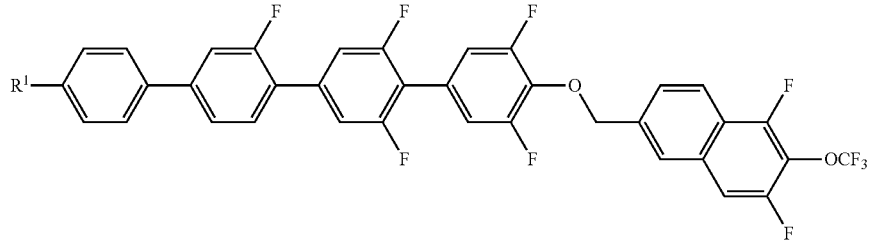
(46-4)

(46-5)
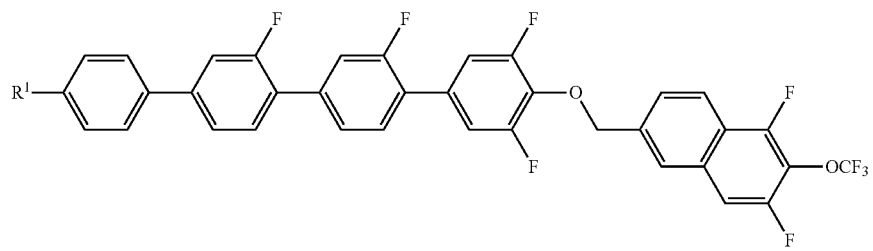
(46-6)
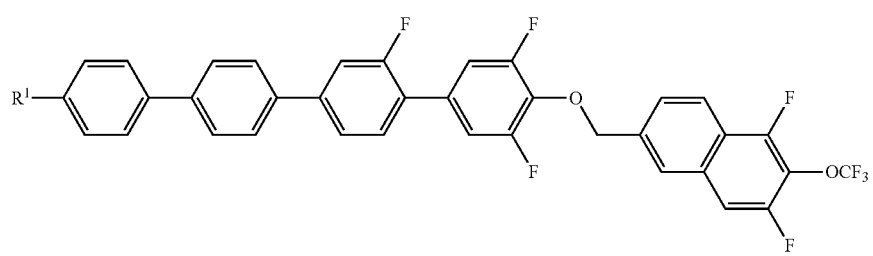
[Chem. 52]
(47-1)
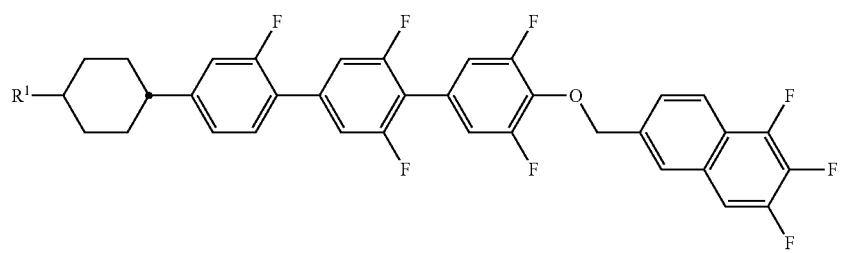
(47-2)
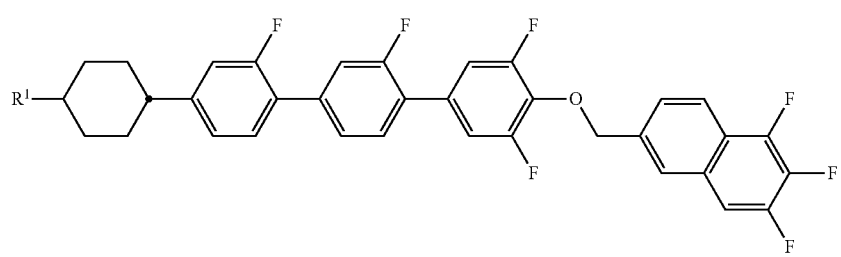
(47-3)
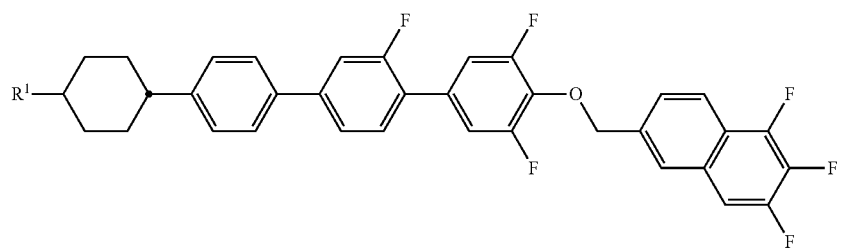
(47-4)
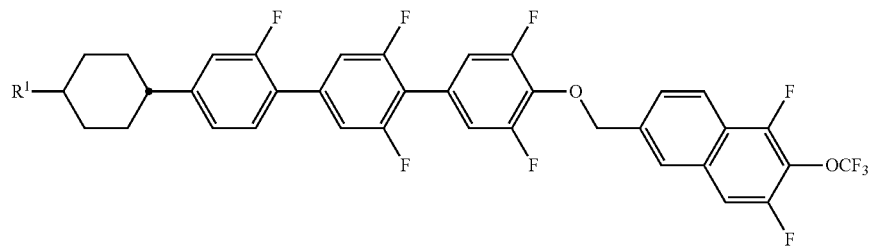

-continued
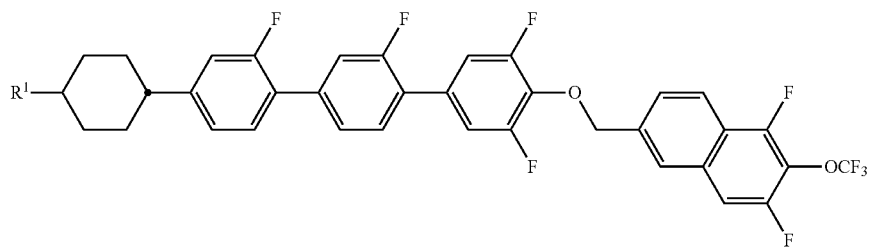
(47-5)
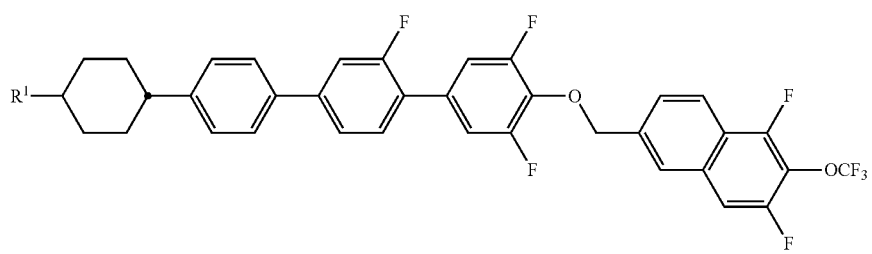
(47-6)
[Chem. 53]
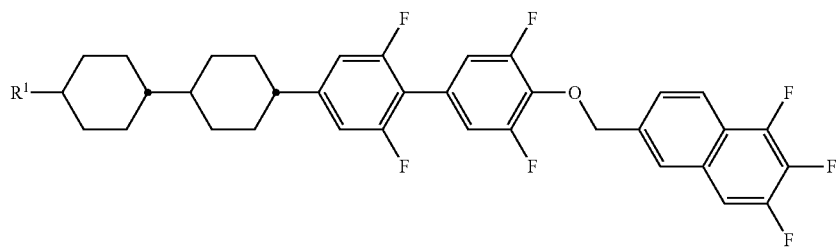
(48-1)
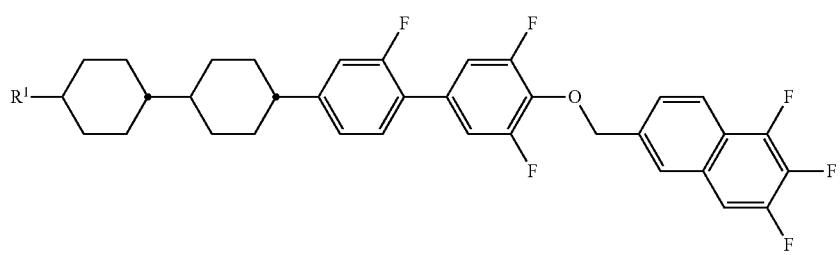
(48-2)
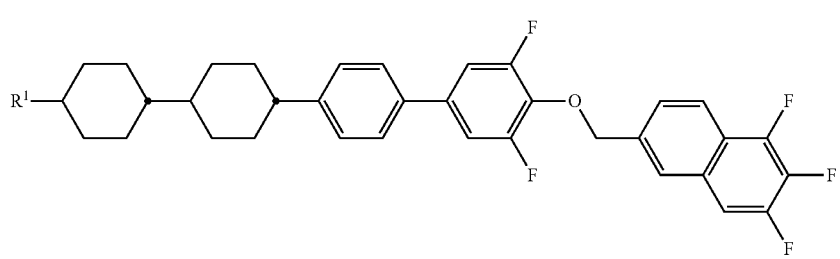
(48-3)
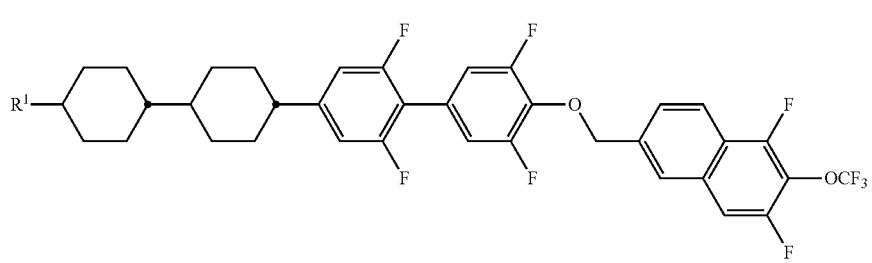
(48-4)

-continued
(48-5)
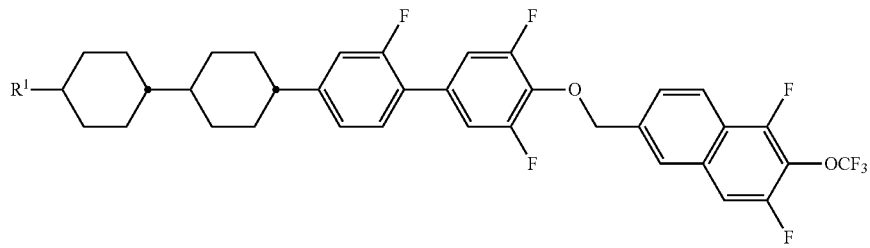
(48-6)
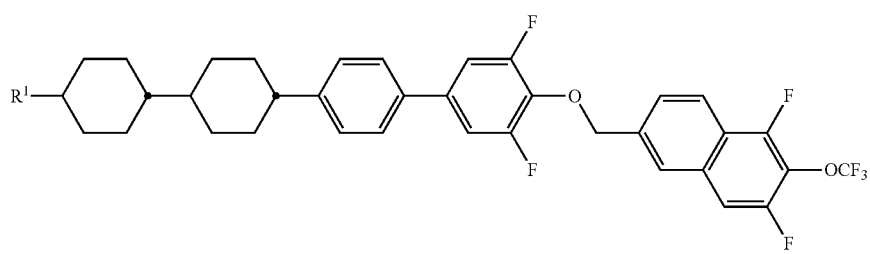
[Chem. 54]
(49-1)
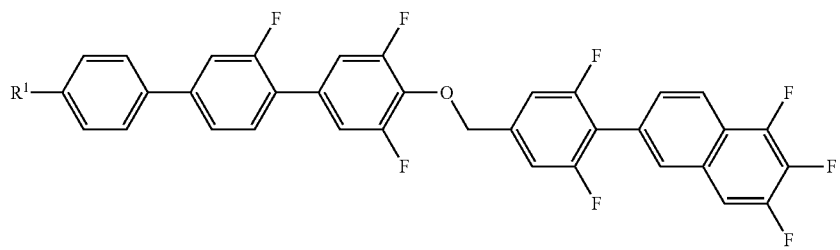
(49-2)
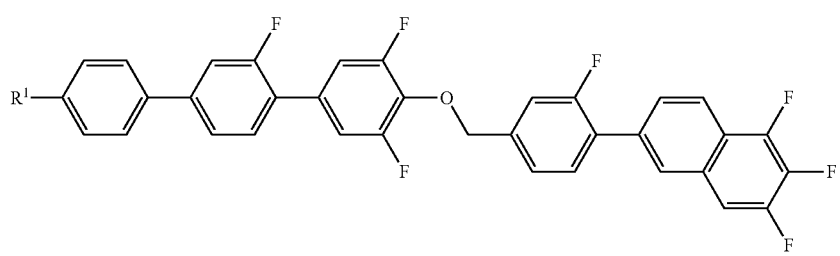
(49-3)
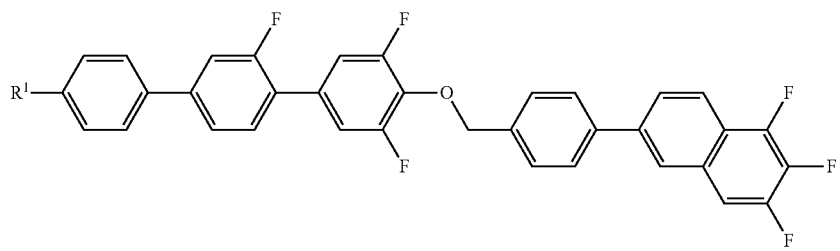
(49-4)
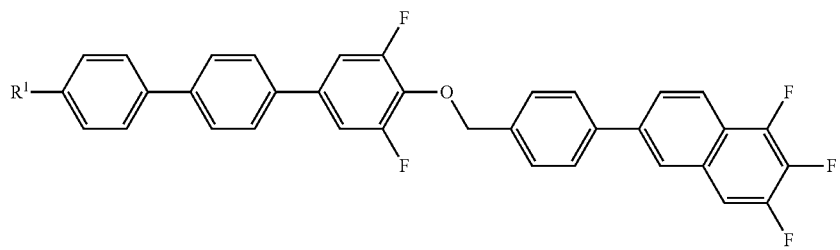

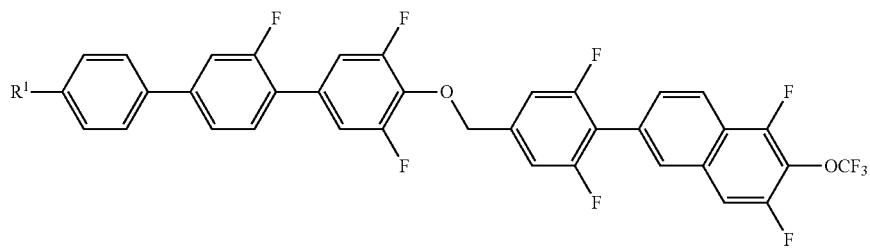
(49-5)
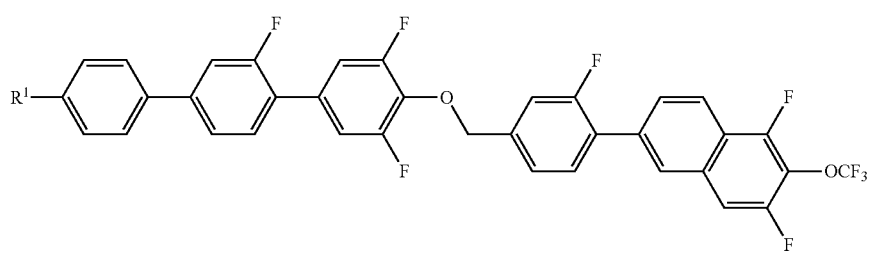
(49-6)
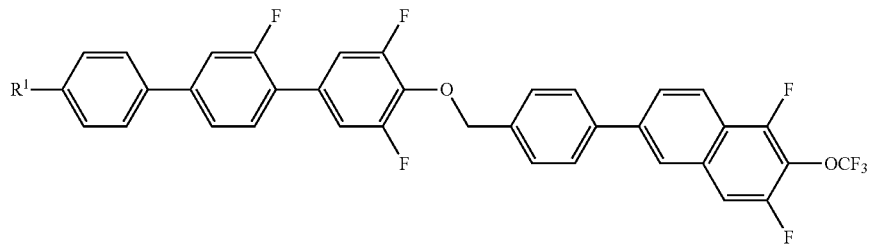
(49-7)
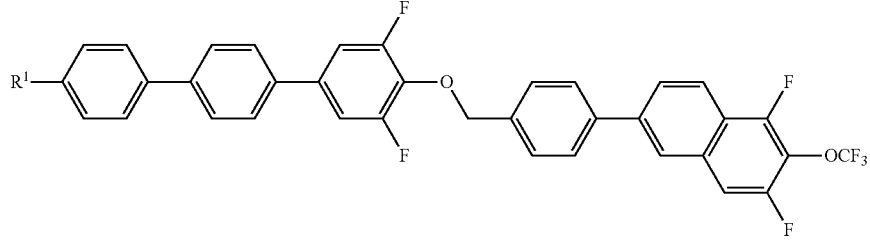
(49-8)
[Chem. 55]
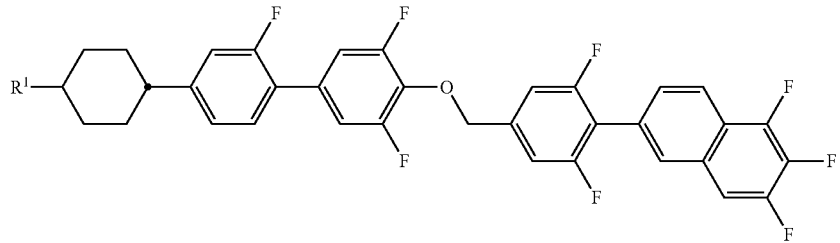
(50-1)
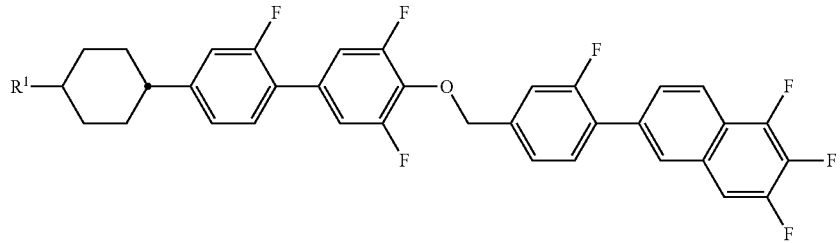
(50-2)

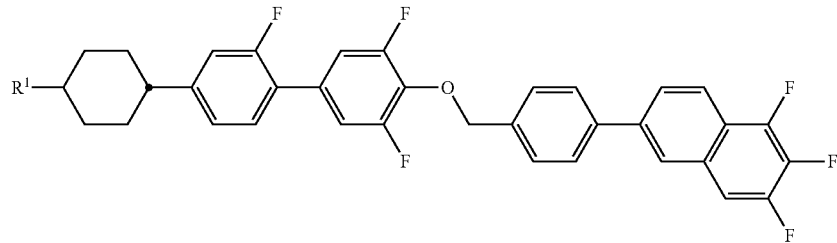
(50-3)
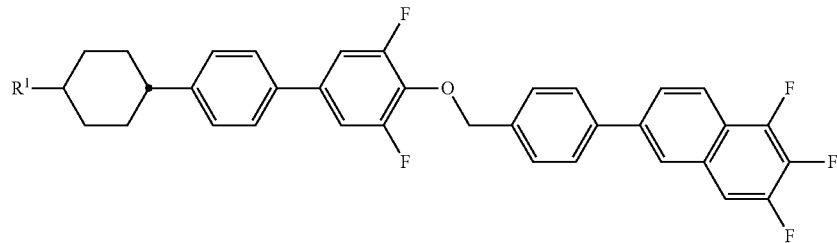
(50-4)
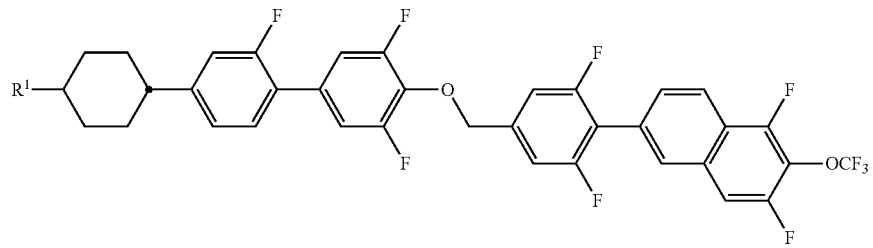
(50-5)
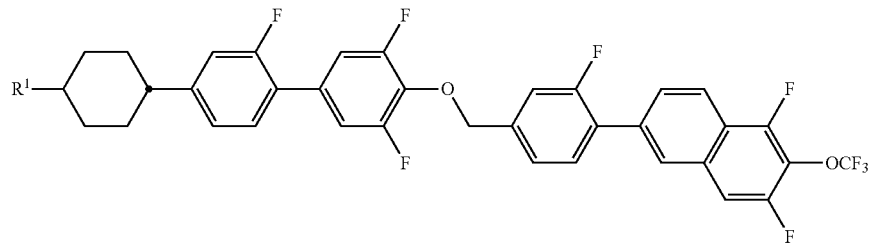
(50-6)
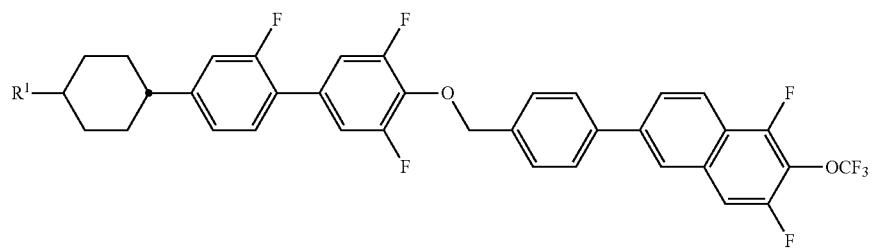
(50-7)
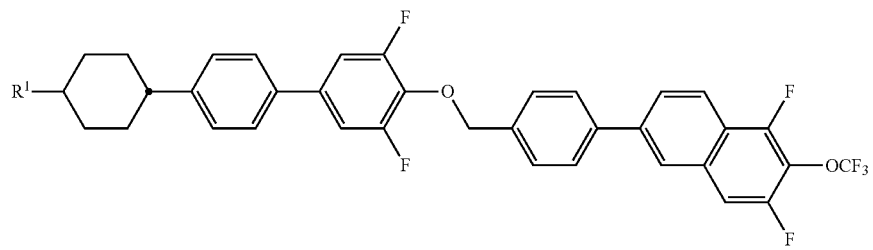
(50-8)

[Chem. 56]
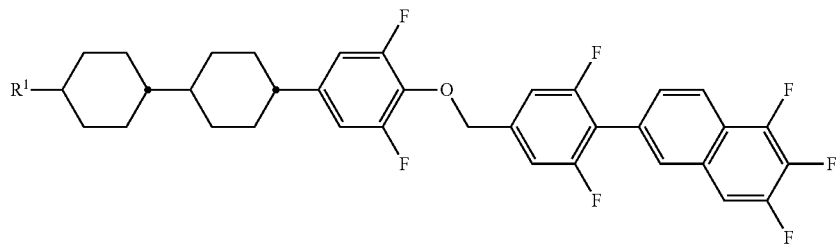
(51-1)
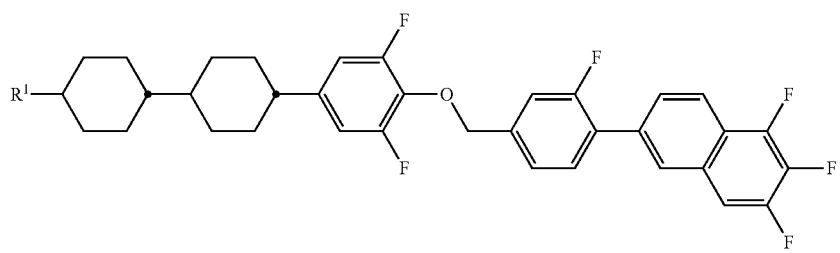
(51-2)
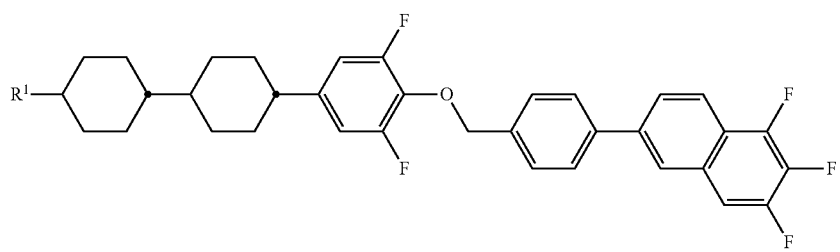
(51-3)
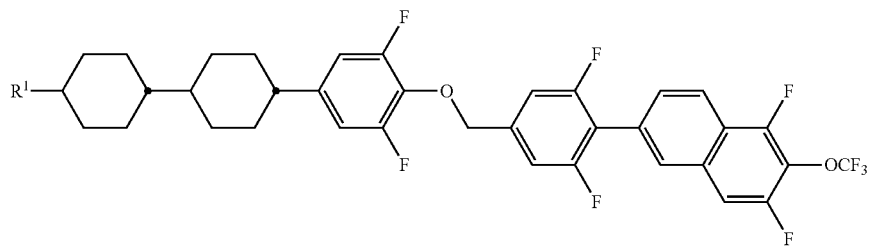
(51-4)
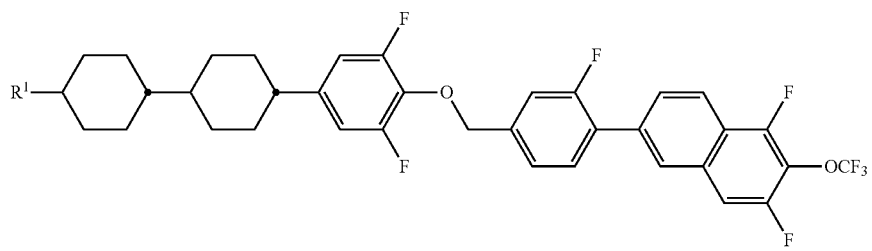
(51-5)
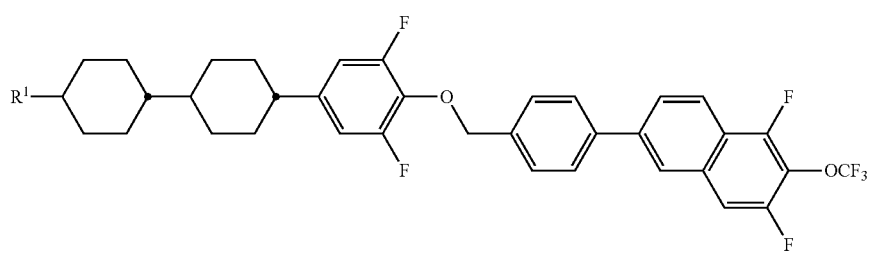
(51-6)

[Chem. 57]
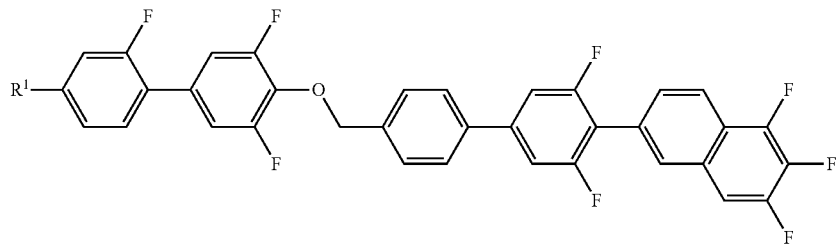
(52-1)
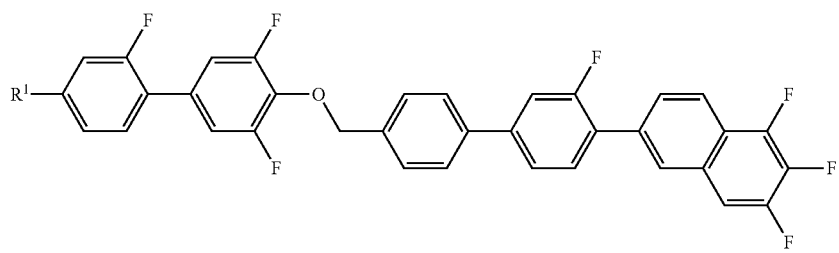
(52-2)
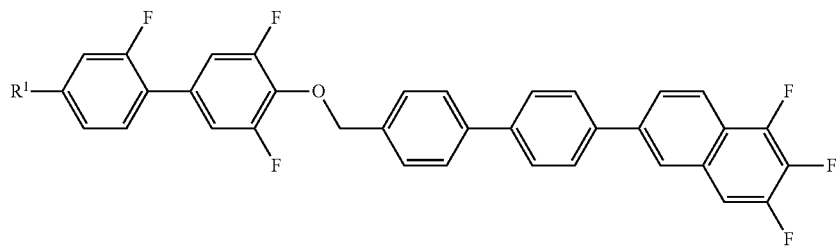
(52-3)
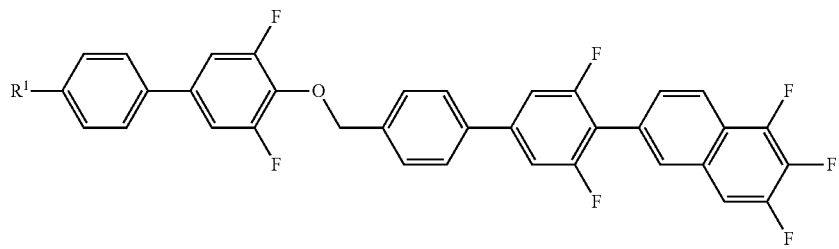
(52-4)
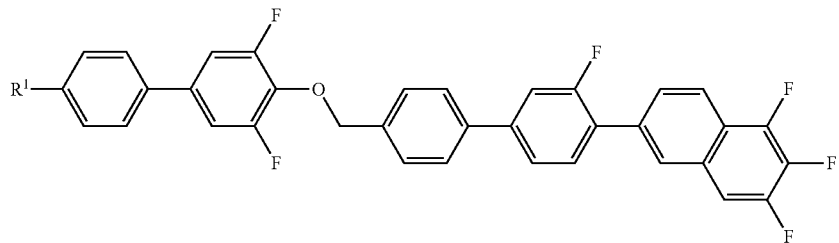
(52-5)
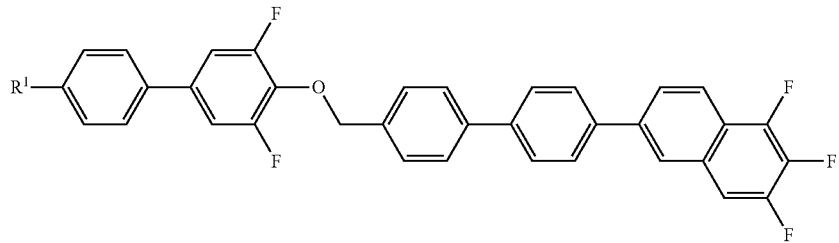
(52-6)

[Chem. 58]
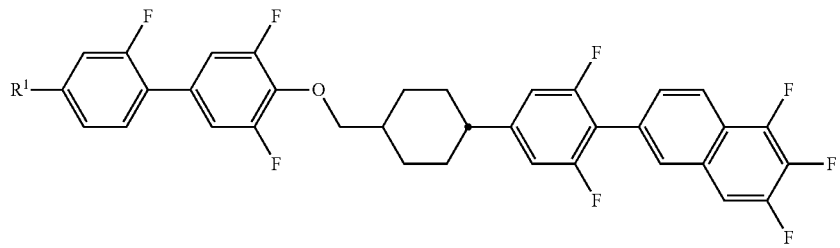
(53-1)
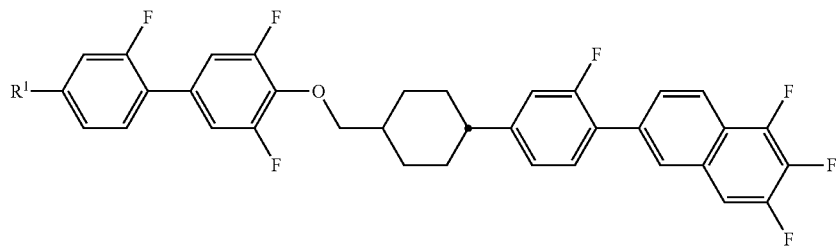
(53-2)
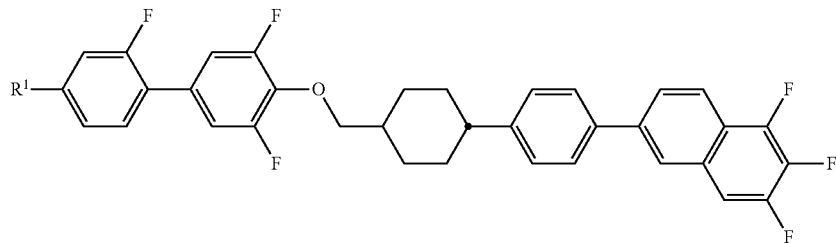
(53-3)
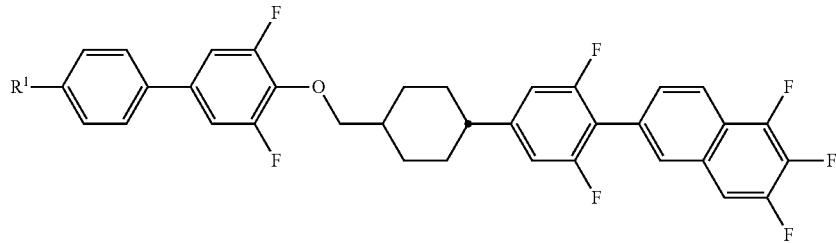
(53-4)
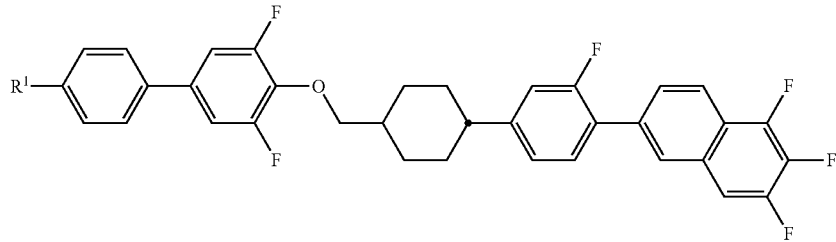
(53-5)
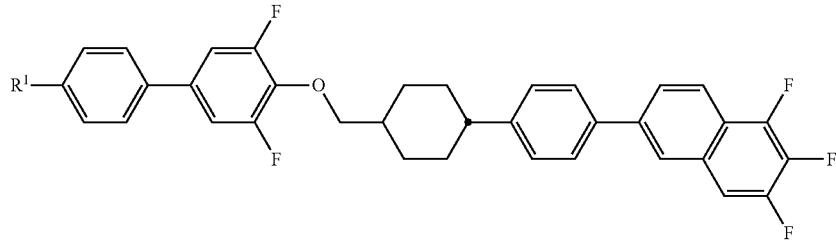
(53-6)

[Chem. 59]
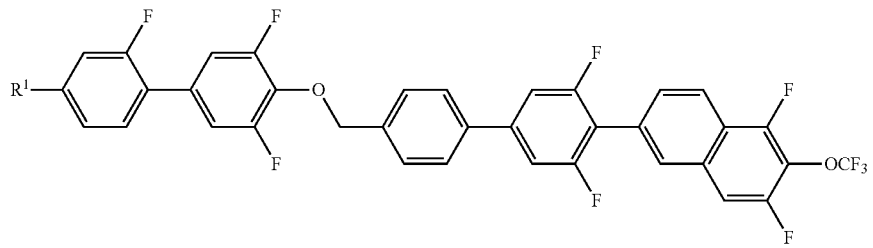
(54-1)
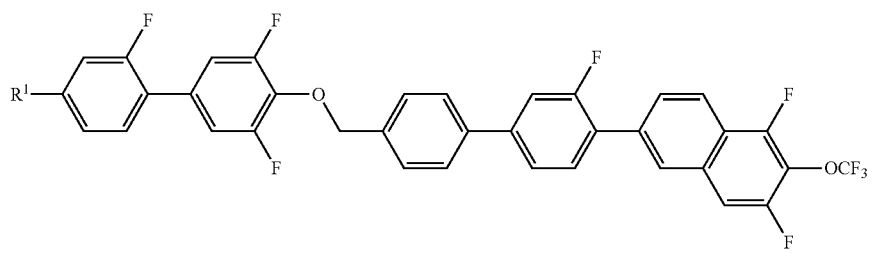
(54-2)
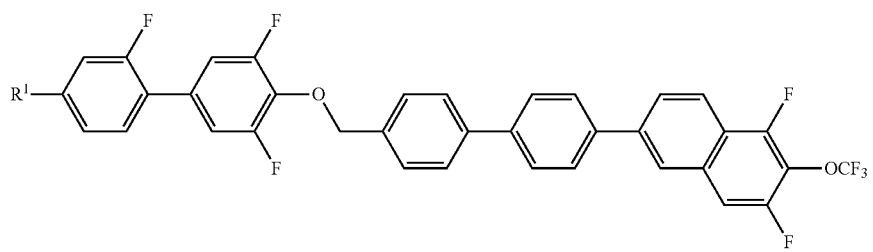
(54-3)
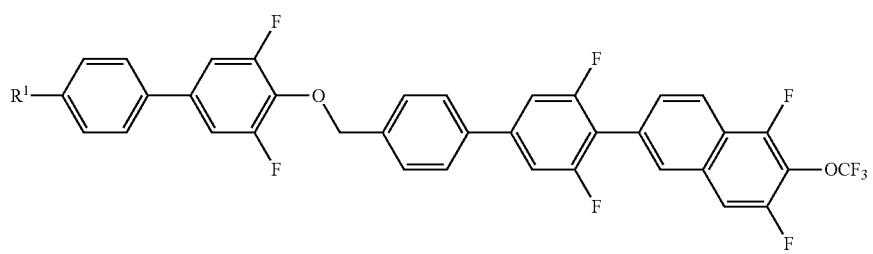
(54-4)
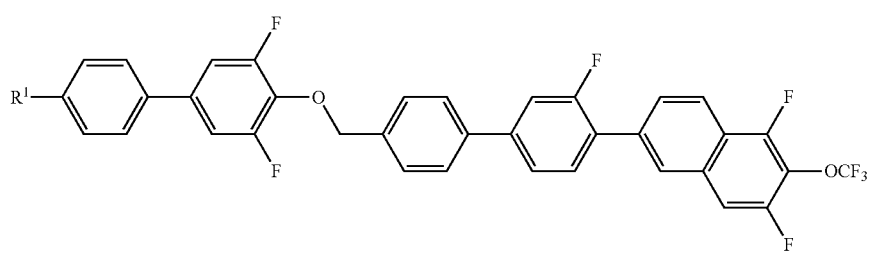
(54-5)
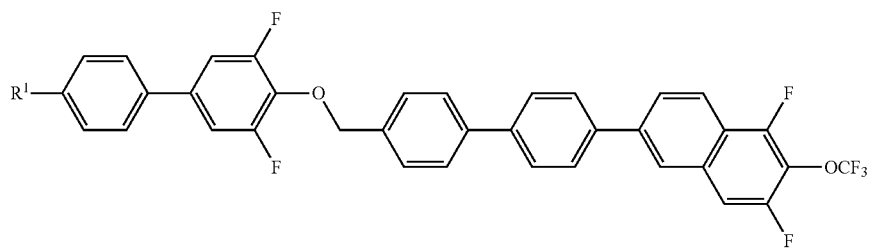
(54-6)

[Chem. 60]
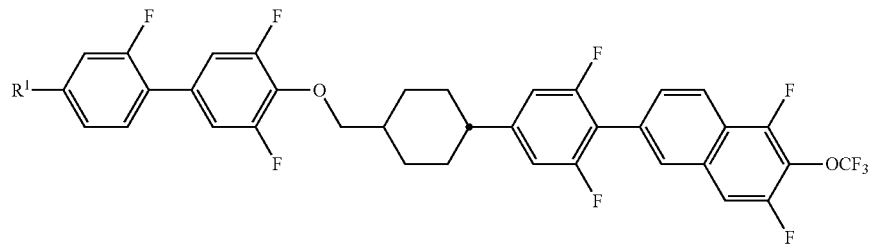
(55-1)
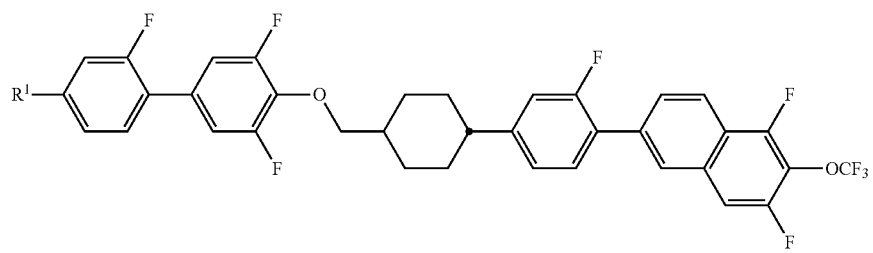
(55-2)
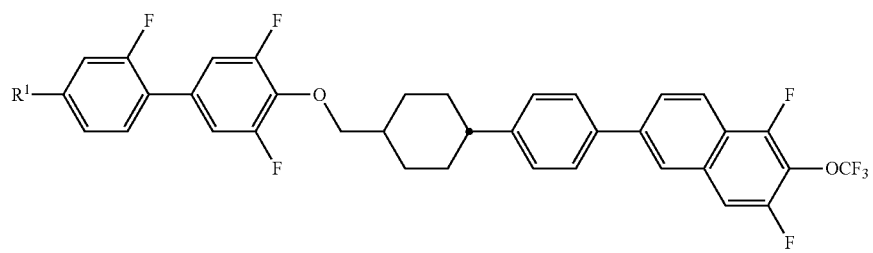
(55-3)
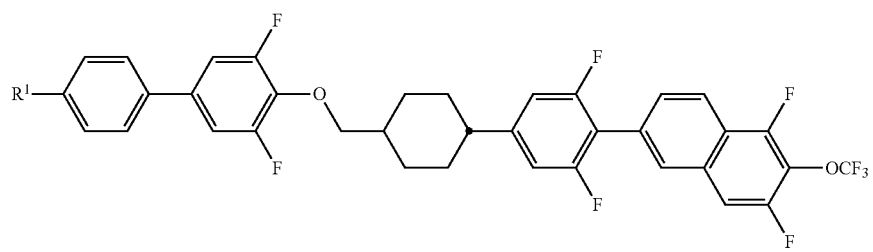
(55-4)
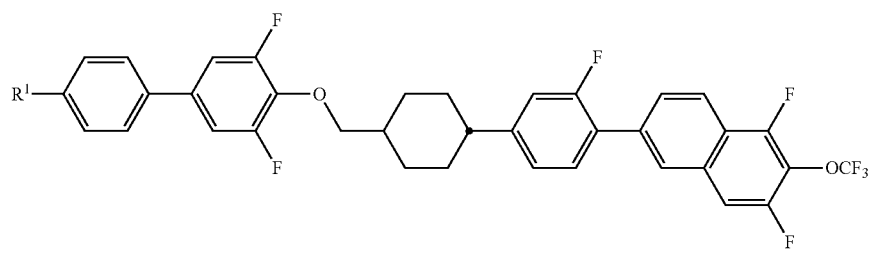
(55-5)
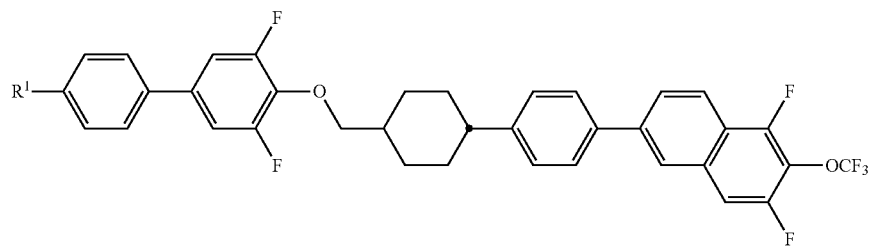
(55-6)

[Chem. 61]
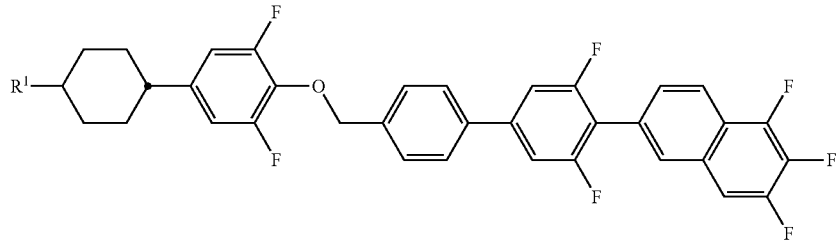
(56-1)
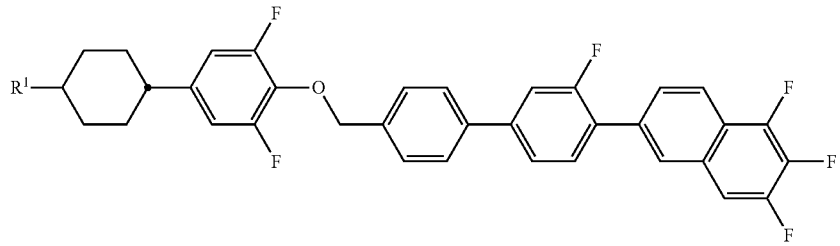
(56-2)
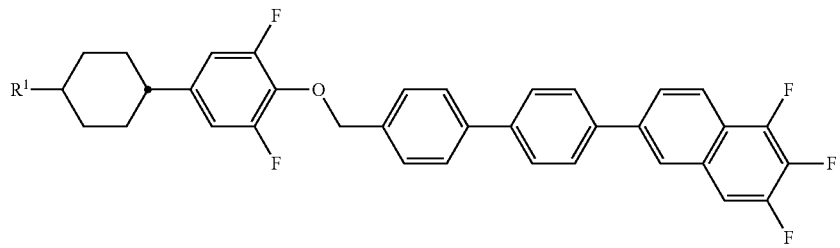
(56-3)
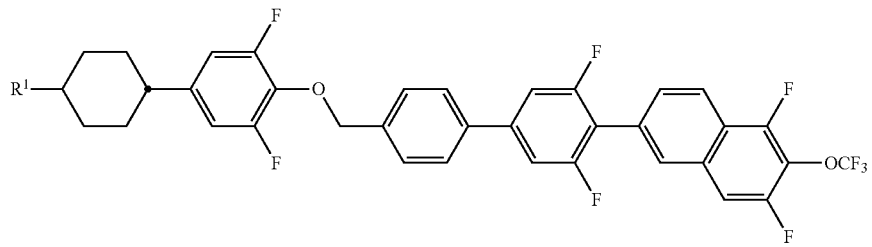
(56-4)
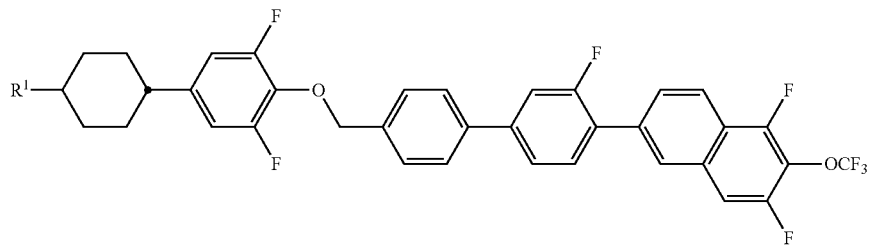
(56-5)
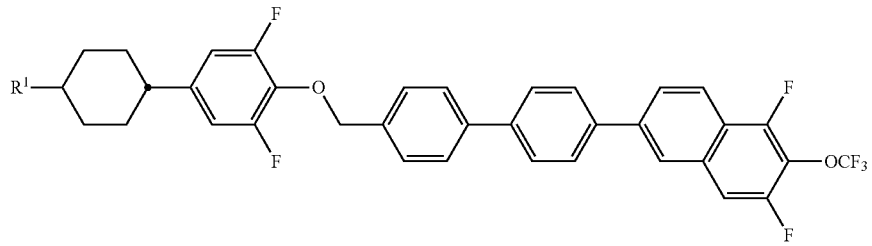
(56-6)

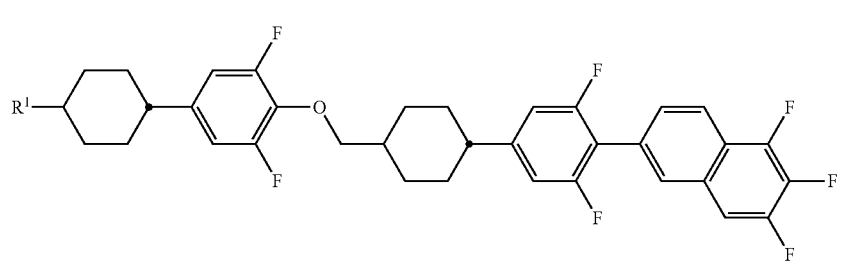
(57-1)
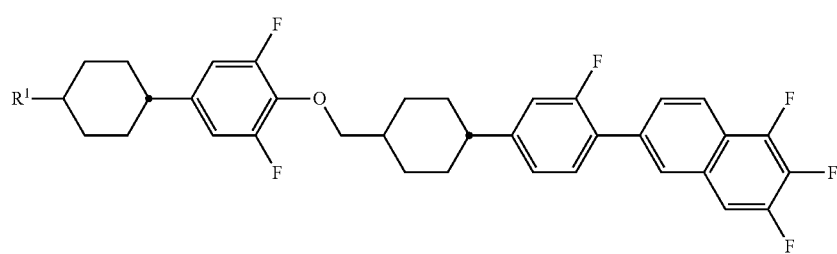
(57-2)
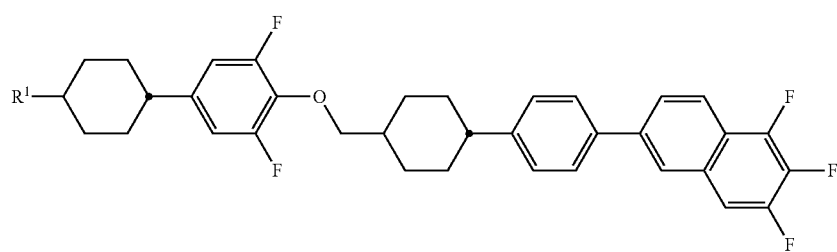
(57-3)
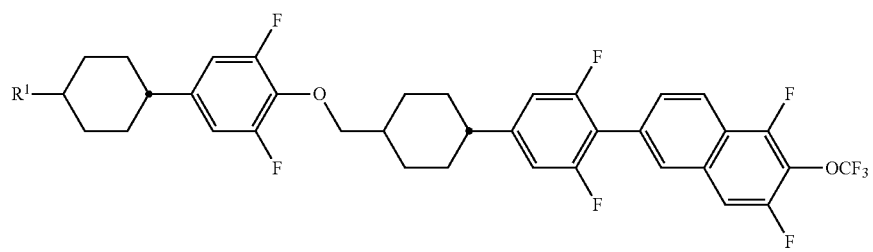
(57-4)
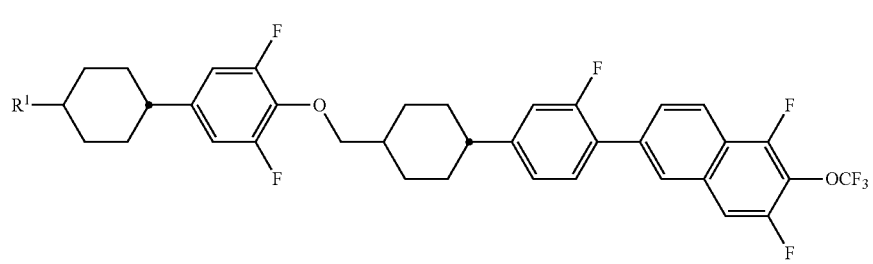
(57-5)
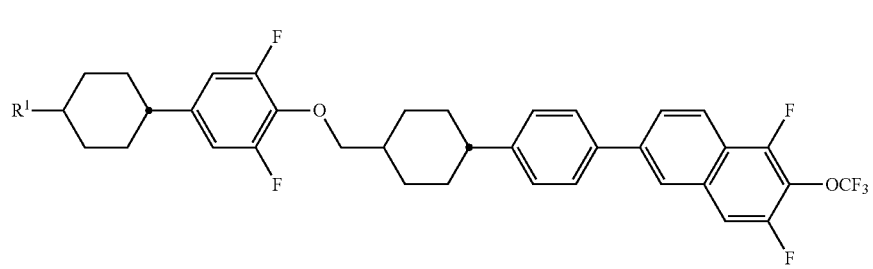
(57-6)

[Chem. 63]
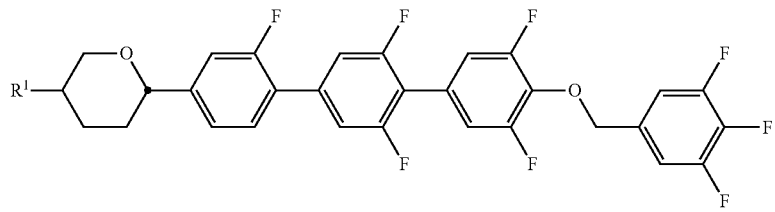
(58-1)
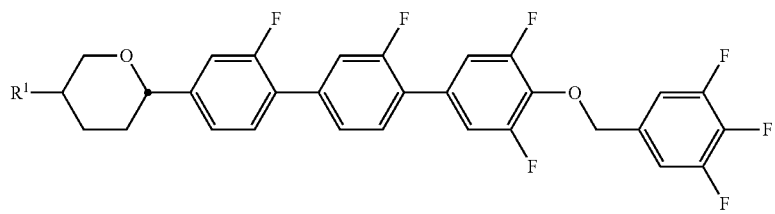
(58-2)
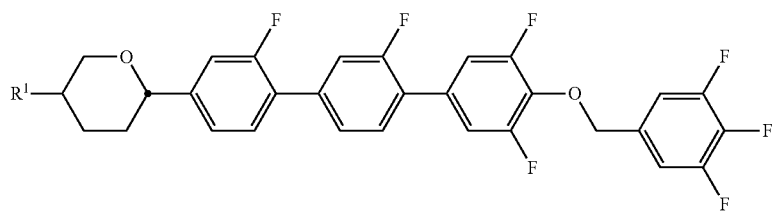
(58-3)
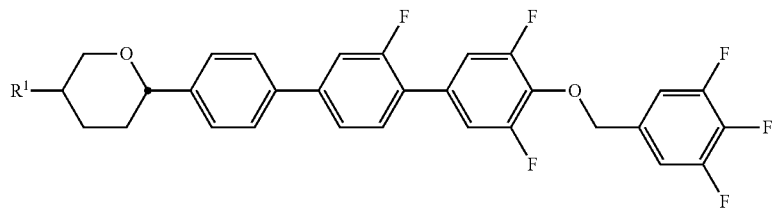
(58-4)
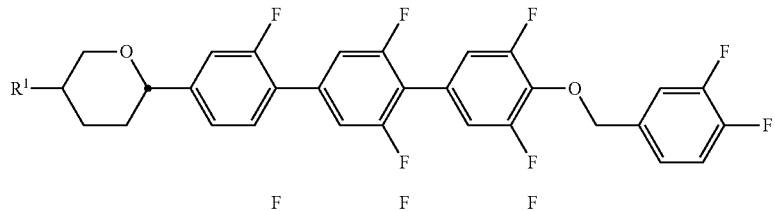
(58-5)
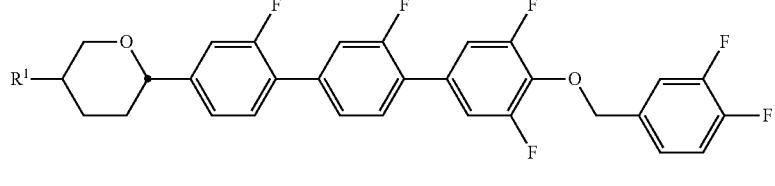
(58-6)
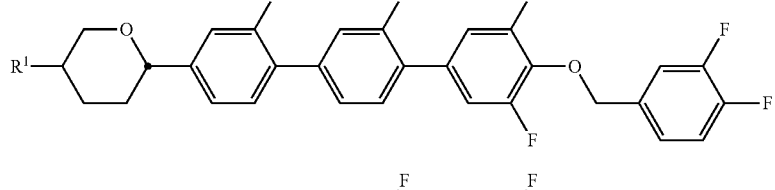
(58-7)
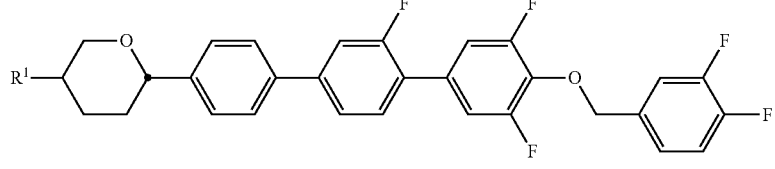
(58-8)

[Chem. 64]
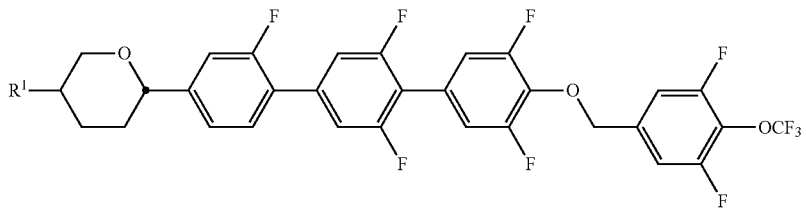
(59-1)
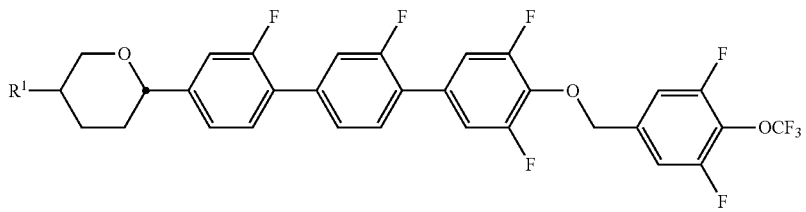
(59-2)
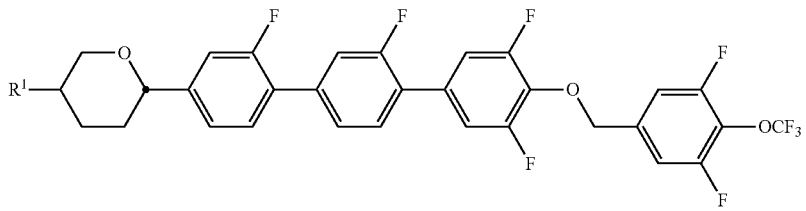
(59-3)
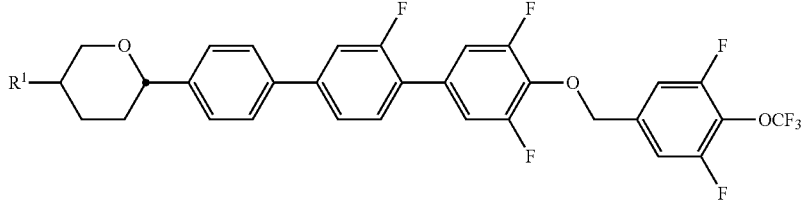
(59-4)
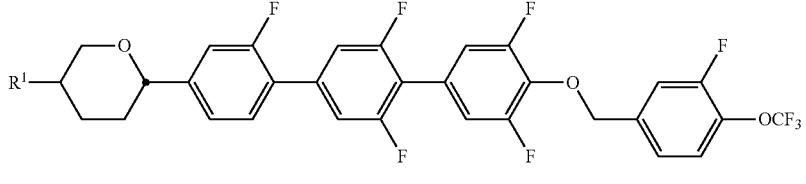
(59-5)
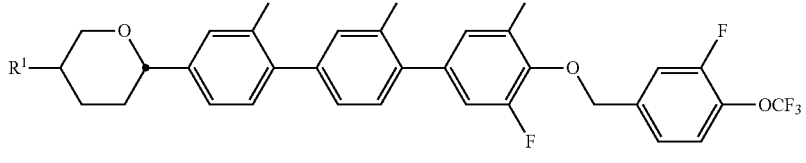
(59-6)
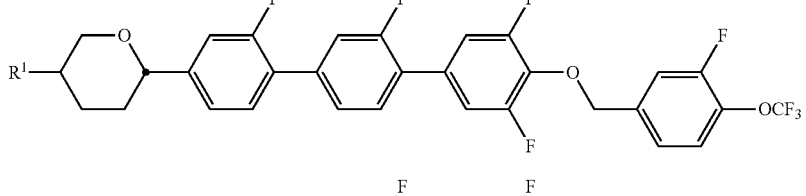
(59-7)
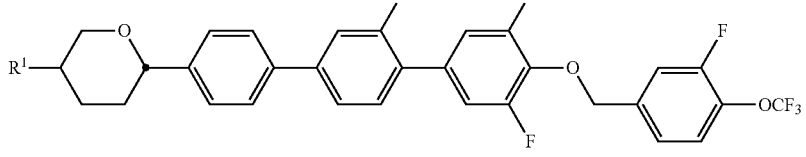
(59-8)

[Chem. 65]
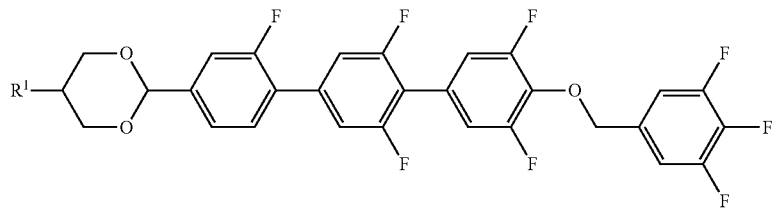
(60-1)
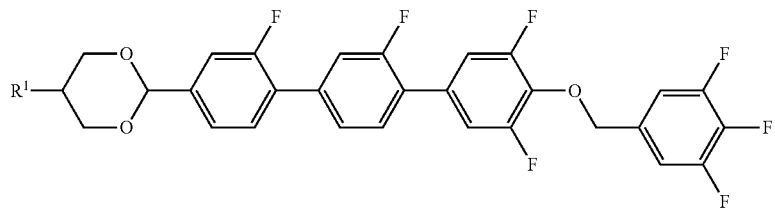
(60-2)
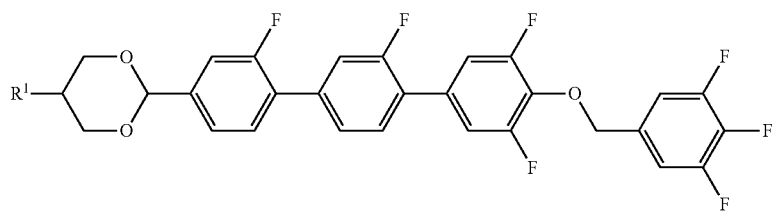
(60-3)
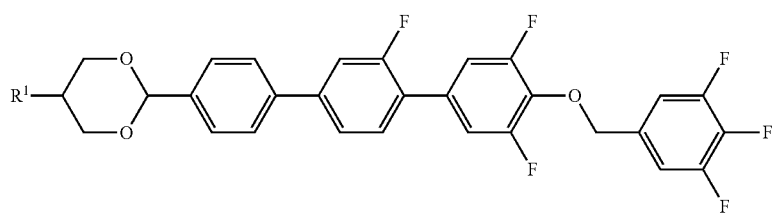
(60-4)
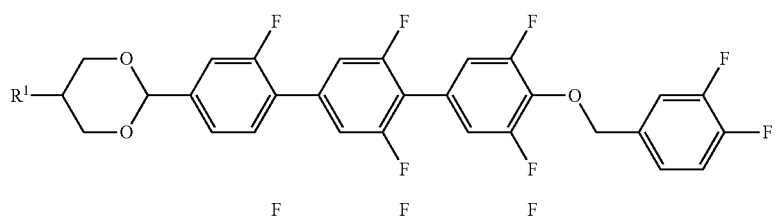
(60-5)
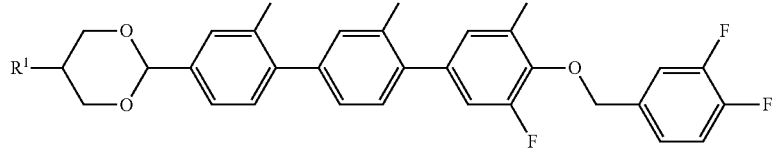
(60-6)
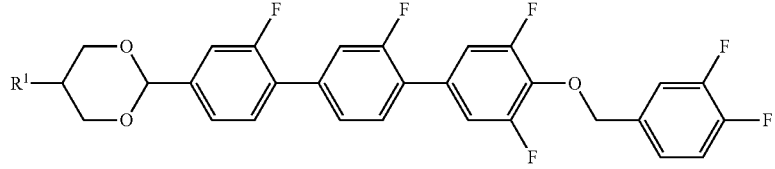
(60-7)
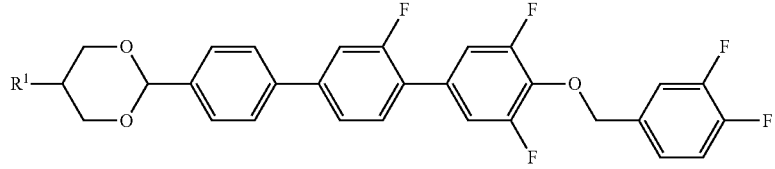
(60-8)

[Chem. 66]
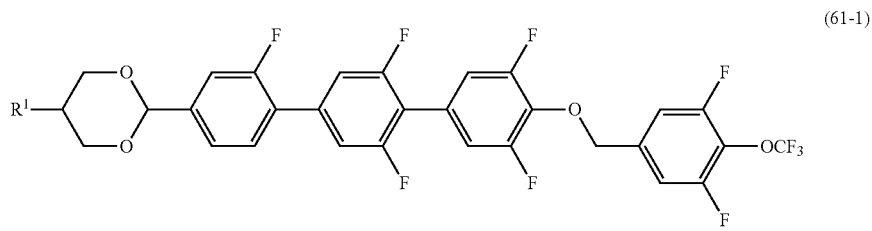 (61-1)
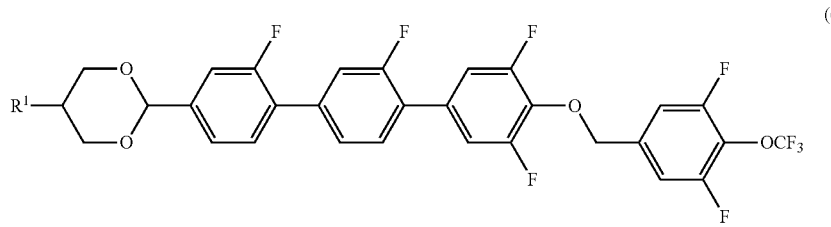 (61-2)
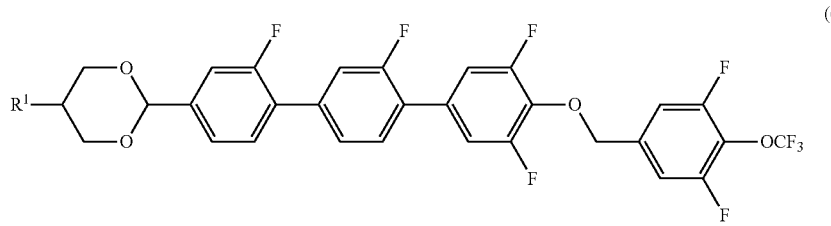 (61-3)
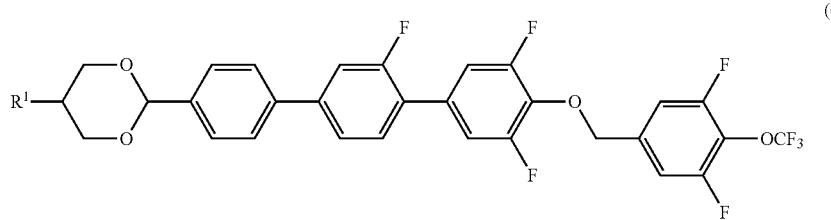 (61-4)
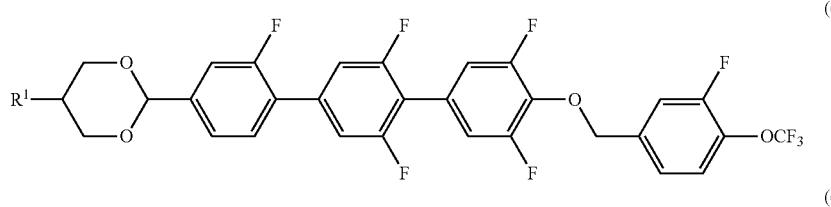 (61-5)
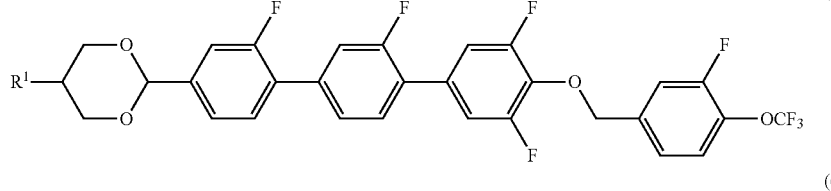 (61-6)
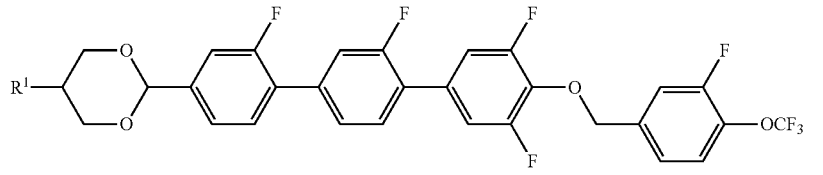 (61-7)
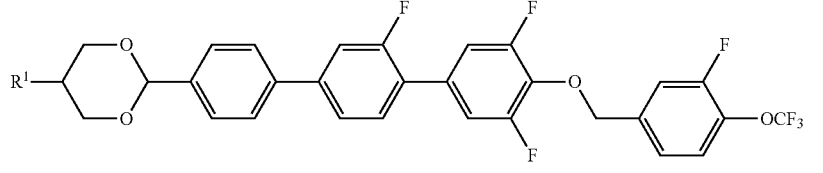 (61-8)

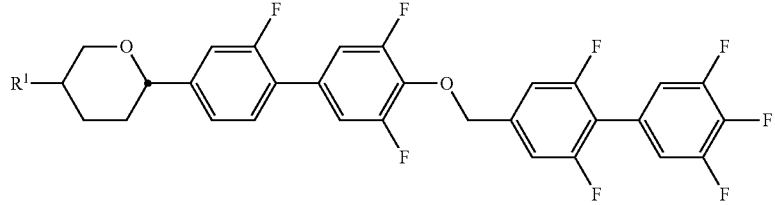
(62-1)
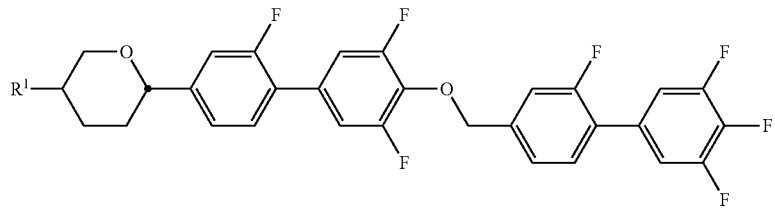
(62-2)
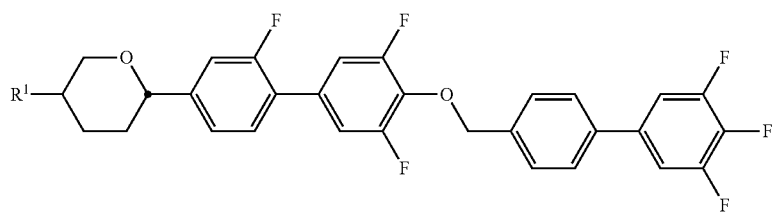
(62-3)
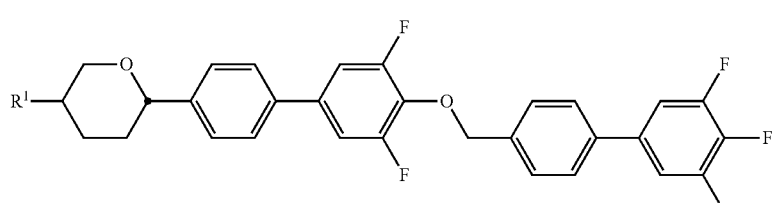
(62-4)
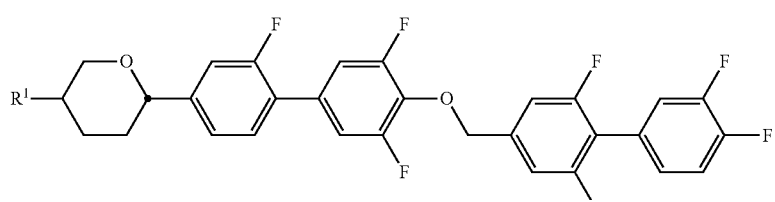
(62-5)
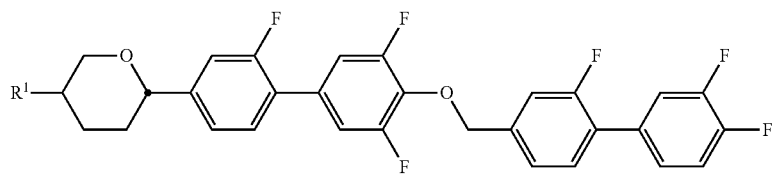
(62-6)
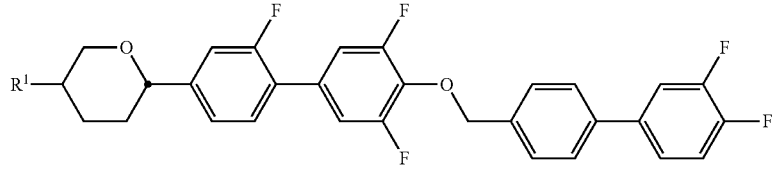
(62-7)

(62-8)
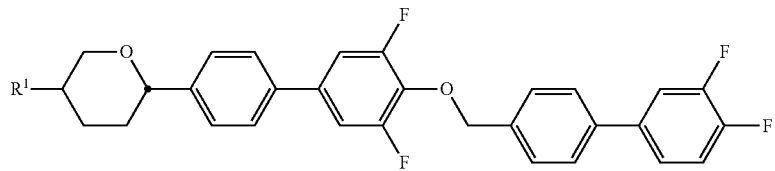
[Chem. 68]
(63-1)
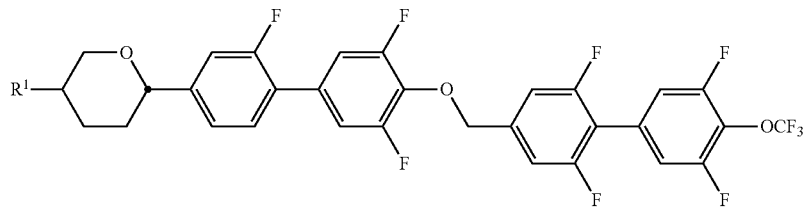
(63-2)
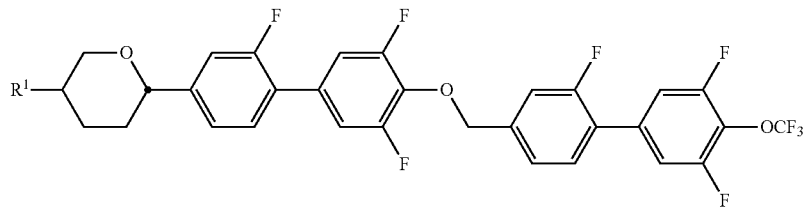
(63-3)
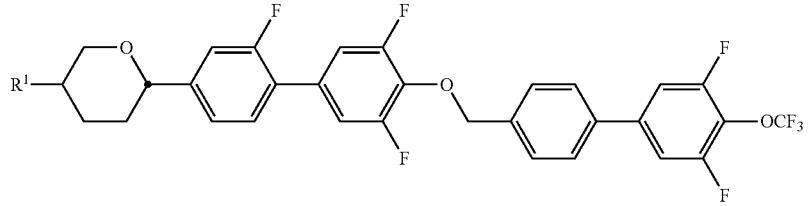
(63-4)
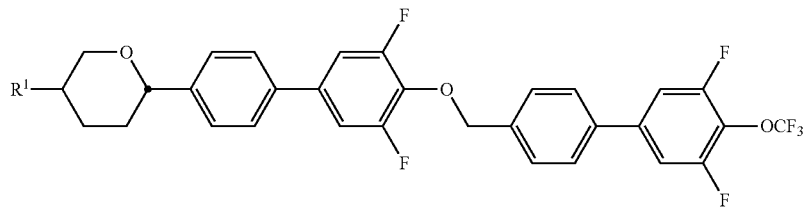
(163-5)
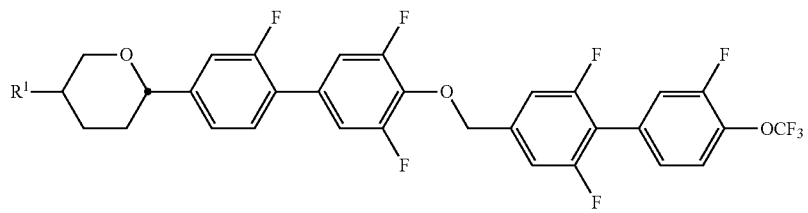
(63-6)
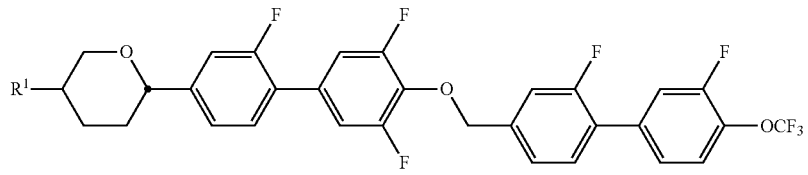

-continued
(63-7)
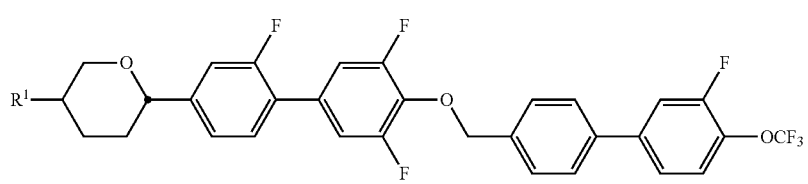
(63-8)
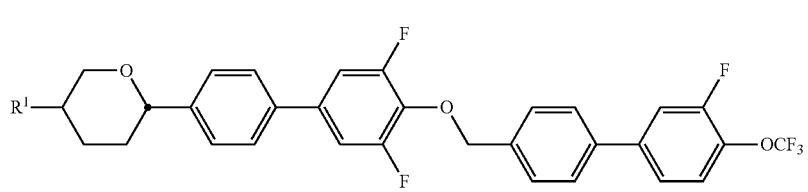
[Chem. 69]
(64-1)
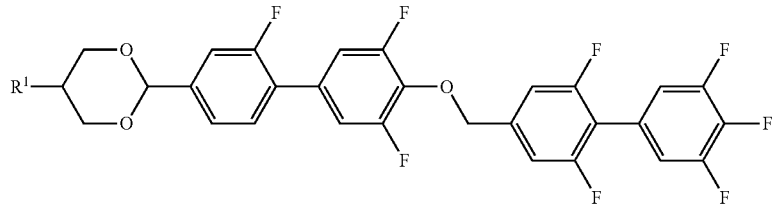
(64-2)
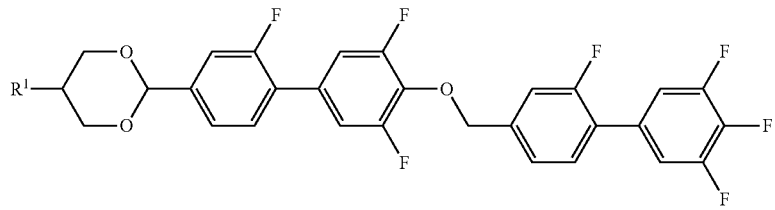
(64-3)
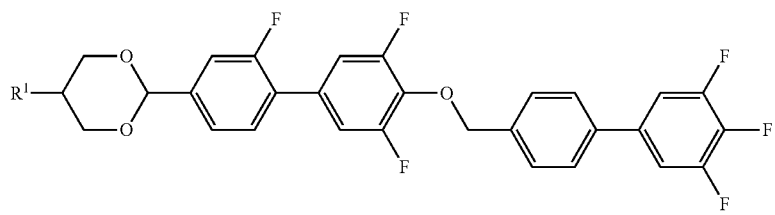
(64-4)
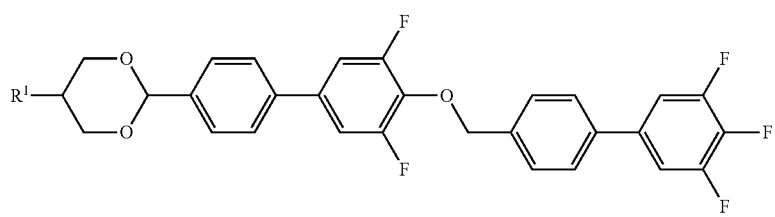
(64-5)
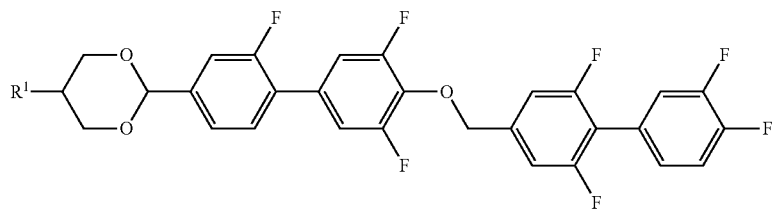

-continued
(64-6)
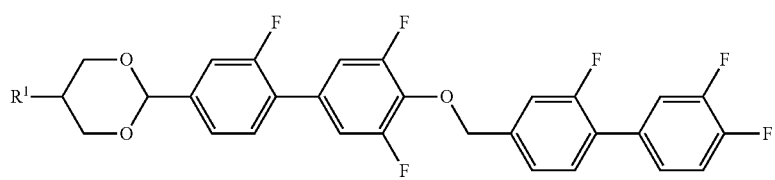
(64-7)
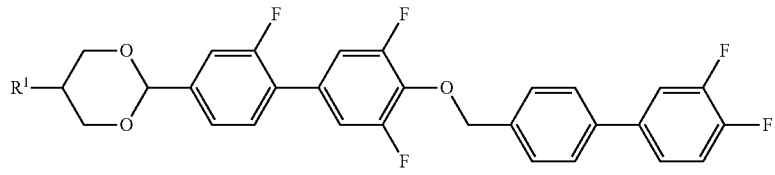
(64-8)
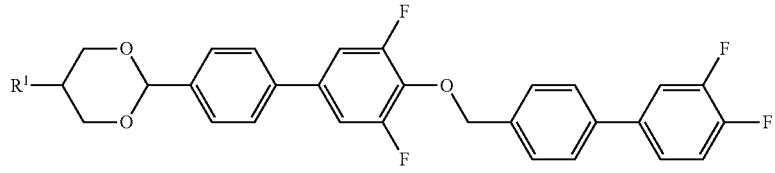
[Chem. 70]
(65-1)
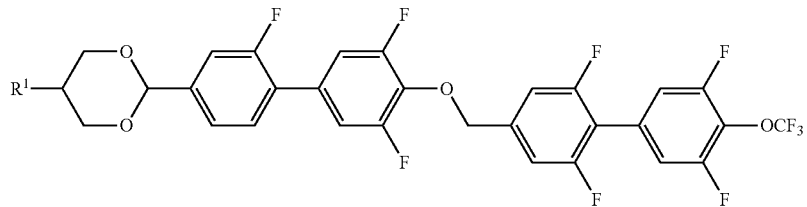
(65-2)
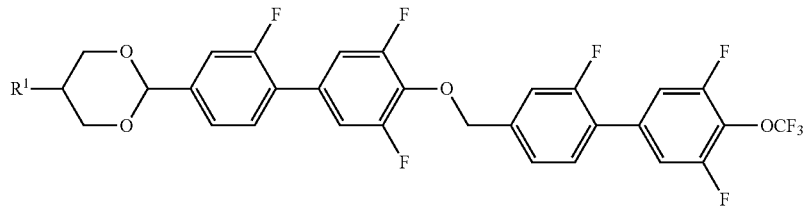
(65-3)
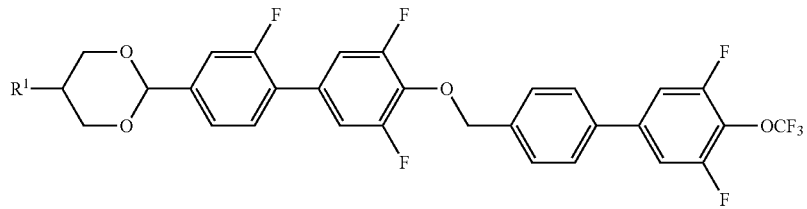
(65-4)
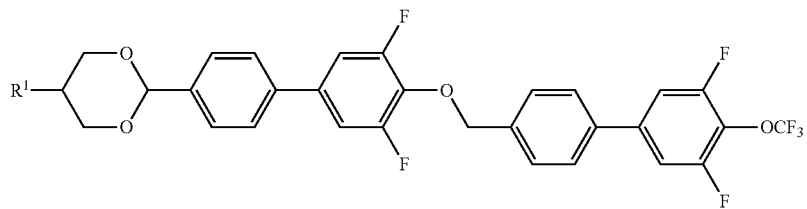

(65-5)
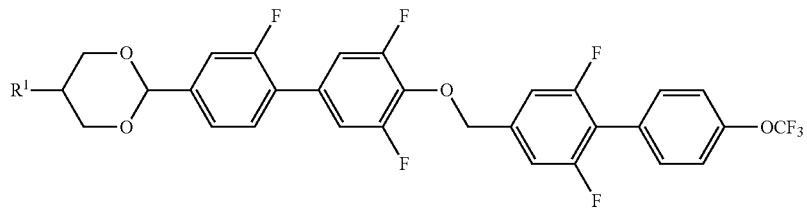
(65-6)
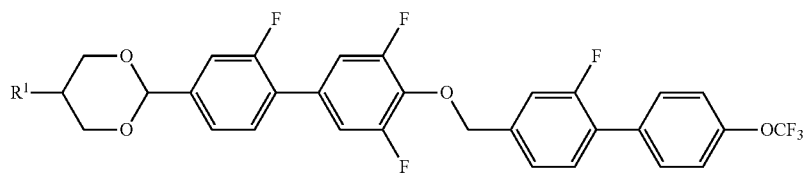
(65-7)
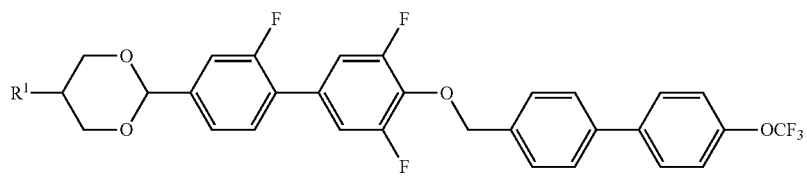
(65-8)
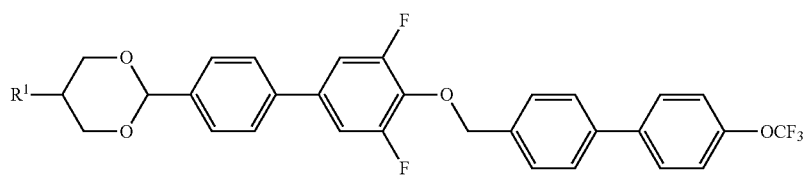
[Chem. 71]
(66-1)
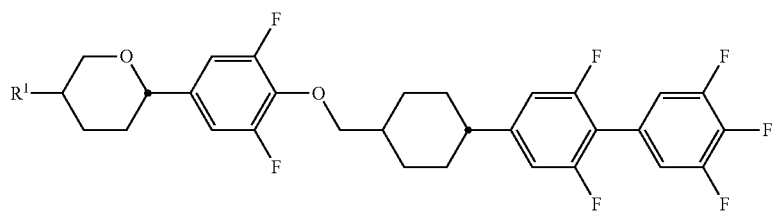
(66-2)
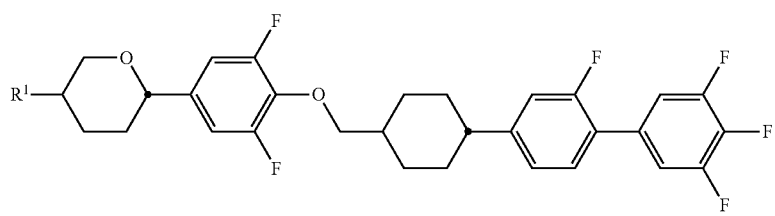
(66-3)
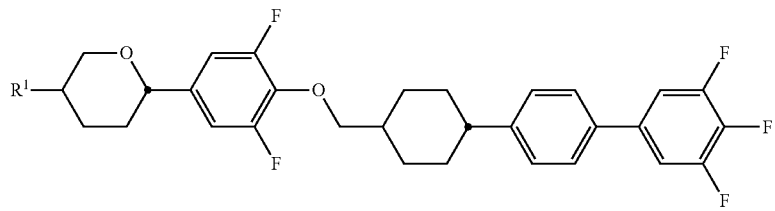

(66-4)
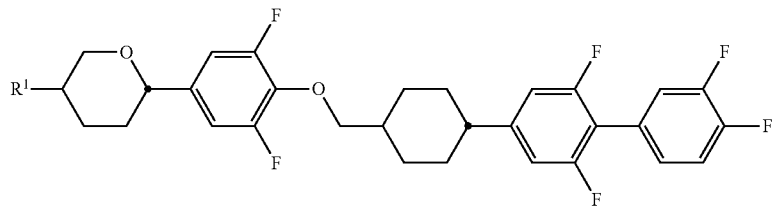
(66-5)
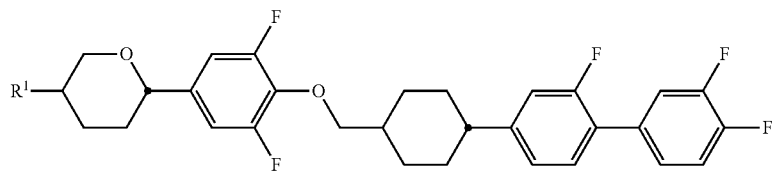
(66-6)
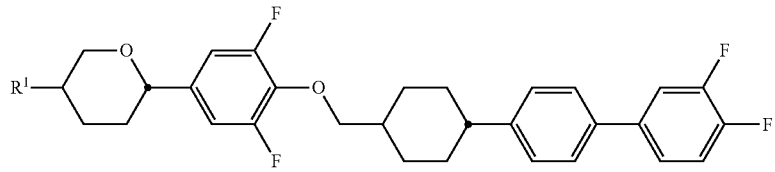
[Chem. 72]
(67-1)
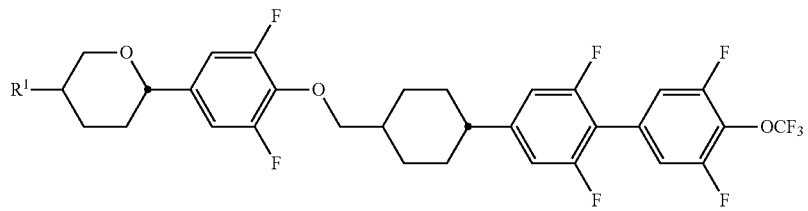
(67-2)
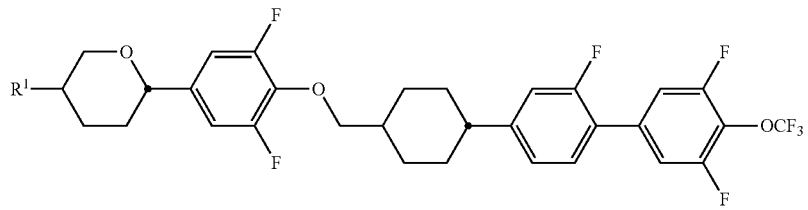
(67-3)
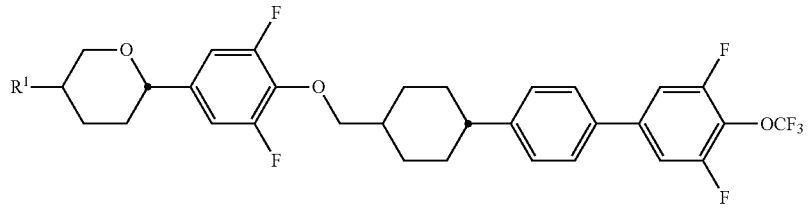
(67-4)
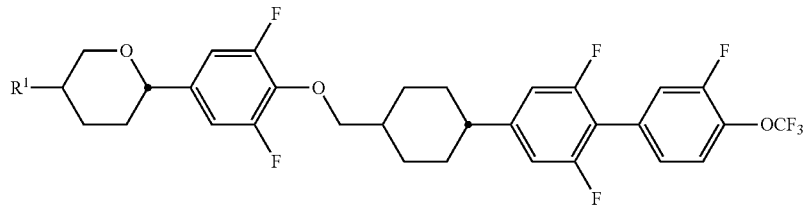

(67-5)
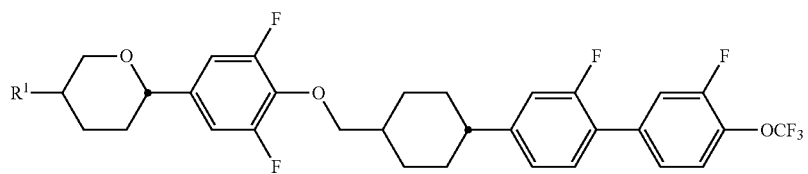
(67-6)
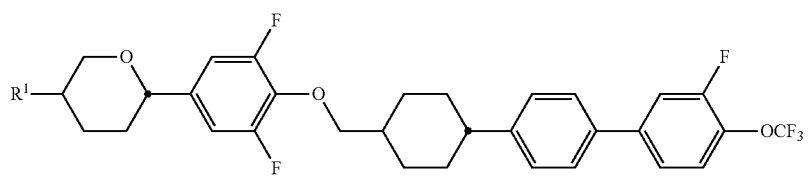
(67-7)
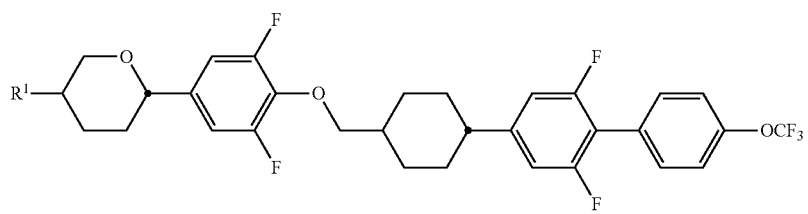
(67-8)
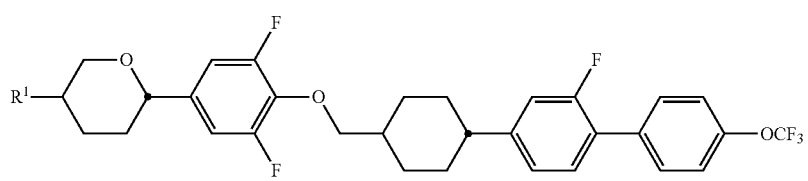
(67-9)
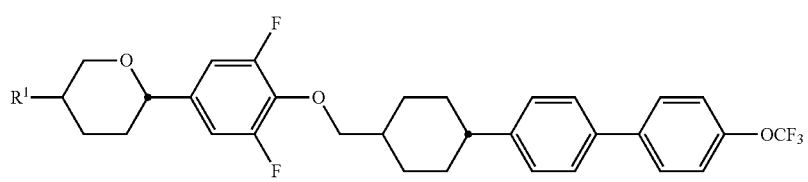
[Chem. 73]
(68-1)
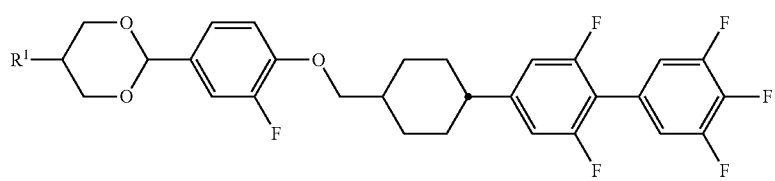
(68-2)
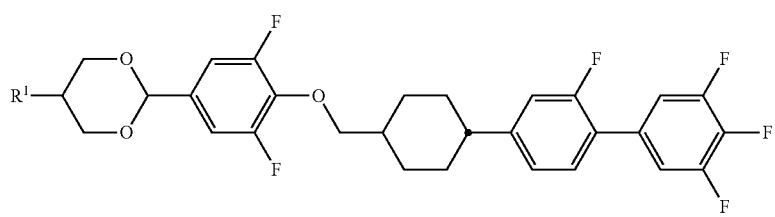

-continued
(68-3)
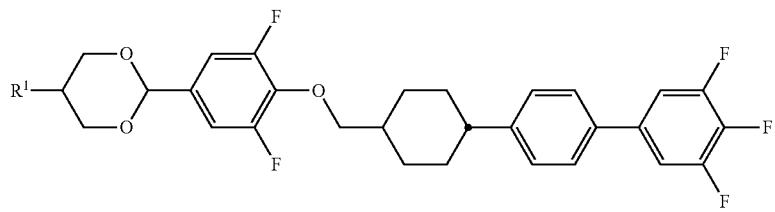
(68-4)
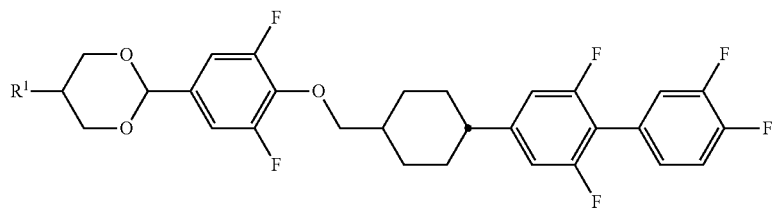
(68-5)
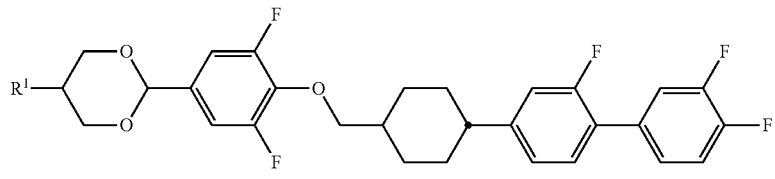
(68-6)
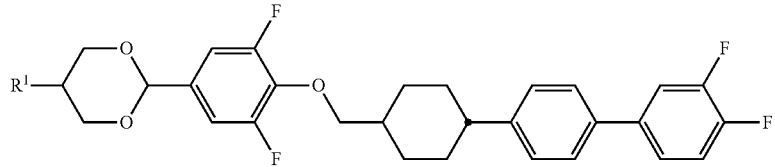
(68-7)
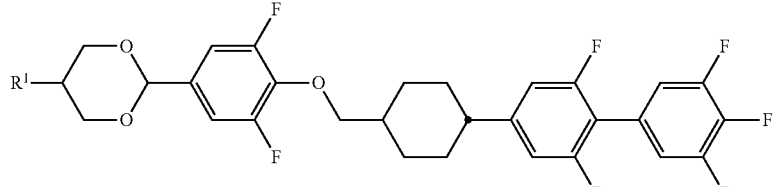
[Chem. 74]
(69-1)
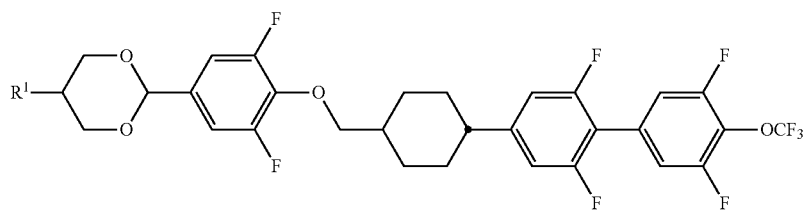
(69-2)
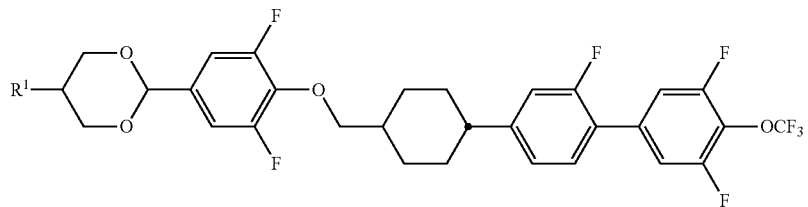

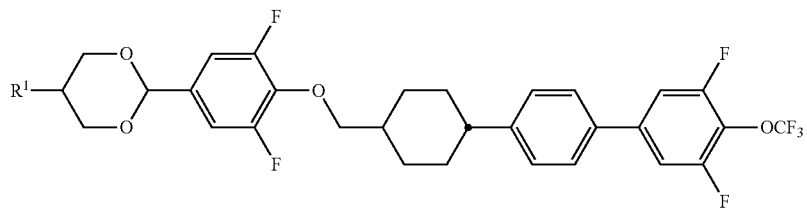

(69-3)

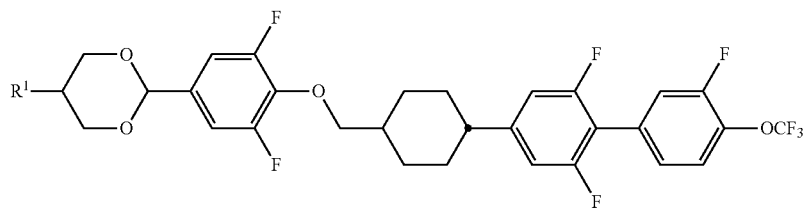

(69-4)

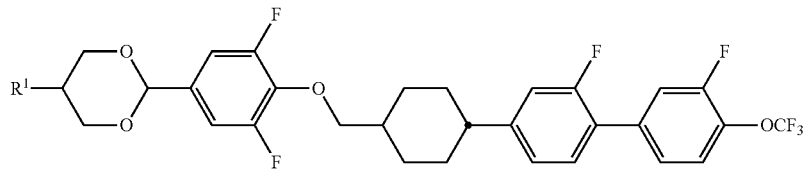

(69-5)

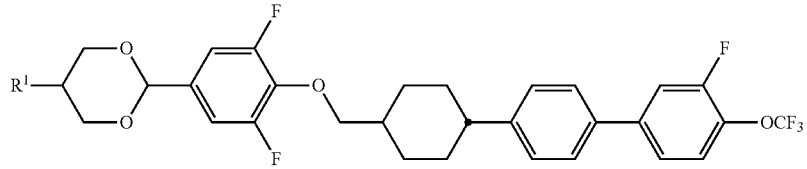

(69-6)

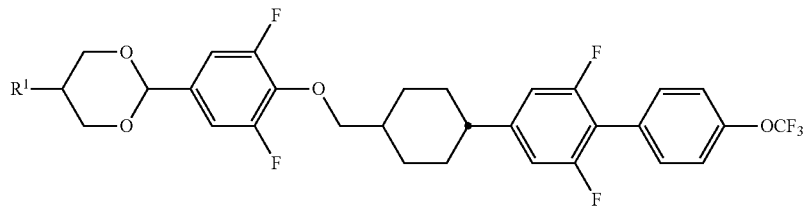

(69-7)

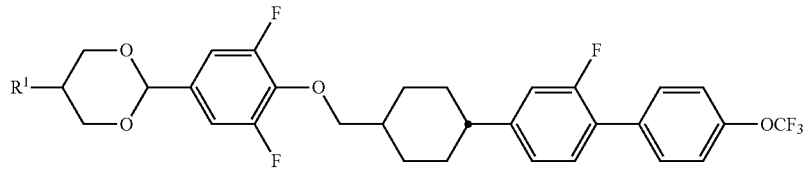

(69-8)

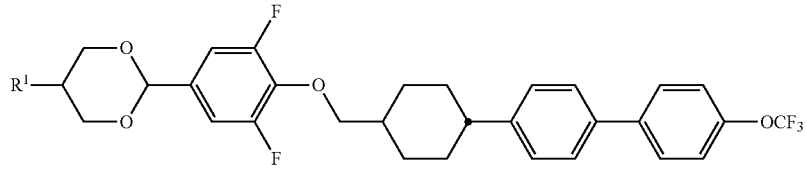

(69-9)

(where $R^1$ represents the same groups as specified for $R^1$ in General Formula (1)).

In the case where the amount of the compound represented by General Formula (1) is small in the liquid crystal composition of the present invention, the effects of the compound are not produced; hence, the lower limit of the amount thereof in the liquid crystal composition is preferably 1% ("%" in the composition refers to mass %), more preferably 2%, and further preferably 5%. In the case where the amount of the compound is excessive, a problem such as a precipitation is caused; hence, the upper limit of the amount thereof is preferably 50%, more preferably 30%, further preferably 20%, and especially preferably 10%. The compounds represented by General Formula (1) may be used alone or in combination at the same time.

In order to adjust the physical properties of a liquid crystal composition, a compound other than the compound represented by General Formula (1) may be used, and a compound which does not exhibit a liquid crystal phase can be optionally added as well as a compound which exhibits a liquid crystal phase.

The composition of the present invention preferably contains a first component that is at least one of the compounds represented by General Formula (1) and another component that is at least one of the following second to sixth components which are representative examples of preferred compounds which can be used in combination with the compound represented by General Formula (1).

In particular, the second component is a fluorine-based (halogen-based) p-type liquid crystal compound, and examples thereof include compounds represented by General Formulae (A1) to (A3).

[Chem. 75]

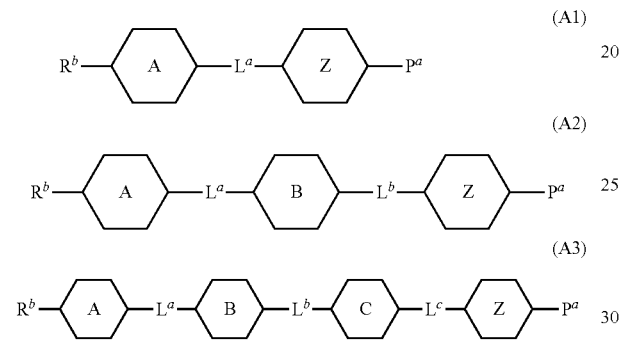

In General Formulae, $R^b$ represents an alkyl group having 1 to 12 carbon atoms which may be linear or branched and which may have a cyclic structure of a 3- to 6-membered ring; in such a group, any —$CH_2$— moiety may be substituted with —O—, —CH=CH—, —CH=CF—, —CF=CH—, —CF=CF—, or —C≡C—, and any hydrogen atom may be substituted with a fluorine atom or a trifluoromethoxy group. $R^b$ is preferably a linear alkyl group having 1 to 7 carbon atoms, a linear 1-alkenyl group having 2 to 7 carbon atoms, a linear 3-alkenyl group having 4 to 7 carbon atoms, or an alkyl group having 1 to 5 carbon atoms and having an end substituted with an alkoxy group having 1 to 3 carbon atoms. In the case where the branched structure has an asymmetric carbon atom, the compound may be an optically active compound or a racemic compound.

Rings A, B, and C each independently represent a trans-1, 4-cyclohexylene group, a trans-decahydronaphthalene-trans-2,6-diyl group, a 1,4-phenylene group which may be substituted with at least one fluorine atom, a naphthalene-2,6-diyl group which may be substituted with at least one fluorine atom, a tetrahydronaphthalene-2,6-diyl group which may be substituted with at least one fluorine atom, a 1,4-cyclohexenylene group which may be substituted with a fluorine atom, a 1,3-dioxane-trans-2,5-diyl group, a pyrimidine-2,5-diyl group, or a pyridine-2,5-diyl group; a trans-1,4-cyclohexylene group, a trans-decahydronaphthalene-trans-2,6-diyl group, a naphthalene-2,6-diyl group which may be substituted with a fluorine atom, and a 1,4-phenylene group which may be substituted with one or two fluorine atoms are preferred. In particular, in the case where Ring B is a trans-1,4-cyclohexylene group or a trans-decahydronaphthalene-trans-2,6-diyl group, Ring A is preferably a trans-1,4-cyclohexylene group; in the case where Ring C is a trans-1,4-cyclohexylene group or a trans-decahydronaphthalene-trans-2,6-diyl group, Rings B and A are each preferably a trans-1,4-cyclohexylene group. In General Formula (A3), Ring A is preferably a trans-1,4-cyclohexylene group.

$L^a$, $L^b$, and $L^c$ are each a linking group and independently represent a single bond, an ethylene group (—$CH_2CH_2$—), a 1,2-propylene group (—CH($CH_3$)$CH_2$— and —$CH_2$CH($CH_3$)—), a 1,4-butylene group, —COO—, —OCO—, —$OCF_2$—, —$CF_2O$—, —CH=CH—, —CH=CF—, —CF=CH—, —CF=CF—, —C≡C—, or —CH=NN=CH—; preferably a single bond, an ethylene group, a 1,4-butylene group, —COO—, —$OCF_2$—, —$CF_2O$—, —CF=CF—, or —C≡C—; and especially preferably a single bond or an ethylene group. In General Formula (A2), at least one of the linking groups preferably represents a single bond; in General Formula (A3), at least two of them each preferably represent a single bond.

Ring Z is an aromatic ring and is represented by any one of General Formulae (La) to (Lc).

[Chem. 76]

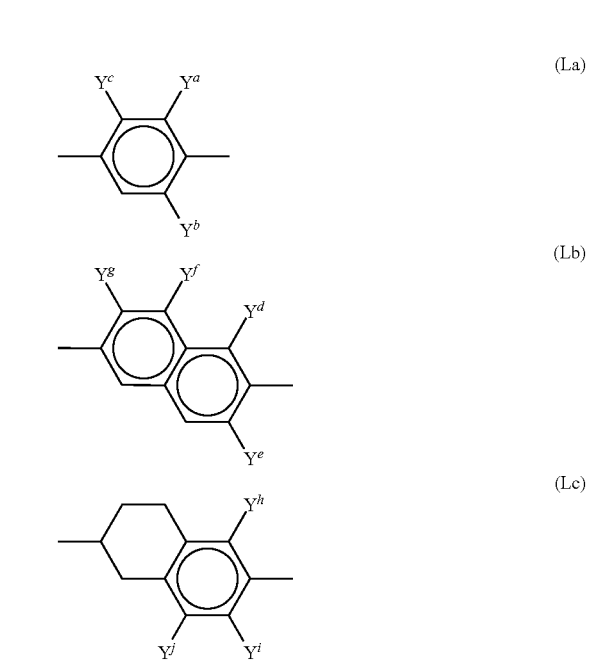

In General Formulae (La) to (Lc), $Y^a$ to $Y^j$ each independently represent a hydrogen atom or a fluorine atom. In General Formula (La), it is preferred that at least one of $Y^a$ and $Y^b$ be a fluorine atom; in General Formula (Lb), it is preferred that at least one of $Y^d$ to $Y^f$ be a fluorine atom, and, in particular, it is further preferred that $Y^d$ be a fluorine atom; and in General Formula (Lc), it is preferred that at least one of $Y^h$ and $Y^i$ be a fluorine atom, and, in particular, it is further preferred that $Y^h$ be a fluorine atom.

An end group $P^a$ represents a fluorine atom, a chlorine atom, a trifluoromethoxy group, a difluoromethoxy group, a trifluoromethyl group or difluoromethyl group, an alkoxy group having 2 or 3 carbon atoms and substituted with at least 2 fluorine atoms, an alkyl group having 2 or 3 carbon atoms and substituted with at least 2 fluorine atoms, an alkenyl group having 2 or 3 carbon atoms and substituted with at least 2 fluorine atoms, or an alkenyloxy group having 2 or 3 carbon atoms and substituted with at least 2 fluorine atoms. A fluorine atom, a trifluoromethoxy group, and difluoromethoxy group are preferred, and a fluorine atom is especially preferred.

The third component is a cyano-based p-type liquid crystal compound, and examples thereof include compounds represented by General Formulae (B1) to (B3).
[Chem. 77]

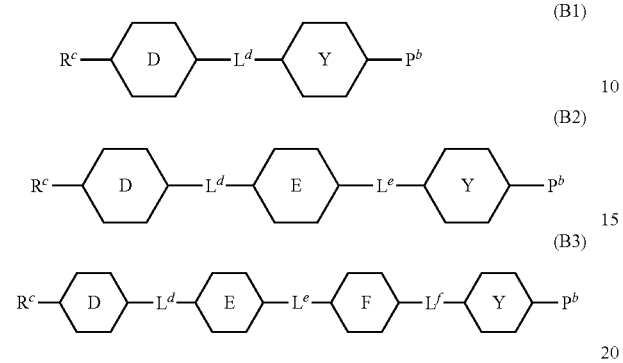

In each of General Formulae (B1) to (B3), $R^c$ represents an alkyl group having 1 to 12 carbon atoms which may be linear or branched and which may have a cyclic structure of a 3- to 6-membered ring; in such a group, any —$CH_2$— moiety may be substituted with —O—, —CH=CH—, —CH=CF—, —CF=CH—, —CF=CF—, or —C≡C—, and any hydrogen atom may be substituted with a fluorine atom or a trifluoromethoxy group. $R^c$ is preferably a linear alkyl group having 1 to 7 carbon atoms, a linear 1-alkenyl group having 2 to 7 carbon atoms, a linear 3-alkenyl group having 4 to 7 carbon atoms, or an alkyl group having 1 to 5 carbon atoms and having an end substituted with an alkoxy group having 1 to 3 carbon atoms. In the case where the branched structure has an asymmetric carbon atom, the compound may be an optically active compound or a racemic compound.

Rings D, E, and F each independently represent a trans-1,4-cyclohexylene group, a trans-decahydronaphthalene-trans-2,6-diyl group, a 1,4-phenylene group which may be substituted with at least one fluorine atom, a naphthalene-2,6-diyl group which may be substituted with at least one fluorine atom, a tetrahydronaphthalene-2,6-diyl group which may be substituted with at least one fluorine atom, a 1,4-cyclohexenylene group which may be substituted with a fluorine atom, a 1,3-dioxane-trans-2,5-diyl group, a pyrimidine-2,5-diyl group, or a pyridine-2,5-diyl group; a trans-1,4-cyclohexylene group, a trans-decahydronaphthalene-trans-2,6-diyl group, a naphthalene-2,6-diyl group which may be substituted with a fluorine atom, and a 1,4-phenylene group which may be substituted with one or two fluorine atoms are preferred. In particular, in the case where Ring E is a trans-1,4-cyclohexylene group or a trans-decahydronaphthalene-trans-2,6-diyl group, Ring D is preferably a trans-1,4-cyclohexylene group; in the case where Ring F is a trans-1,4-cyclohexylene group or a trans-decahydronaphthalene-trans-2,6-diyl group, Rings D and E are each preferably a trans-1,4-cyclohexylene group. In General Formula (B3), Ring D is preferably a trans-1,4-cyclohexylene group.

$L^d$, $L^e$, and $L^f$ are each a linking group and independently represent a single bond, an ethylene group (—$CH_2CH_2$—), a 1,2-propylene group (—$CH(CH_3)CH_2$— and —$CH_2CH(CH_3)$—), a 1,4-butylene group, —COO—, —OCO—, —$OCF_2$—, —$CF_2O$—, —CH=CH—, —CH=CF—, —CF=CH—, —CF=CF—, —C≡C—, —$OCH_2$—, —$CH_2O$—, or —CH=NN=CH—; preferably a single bond, an ethylene group, —COO—, —$OCF_2$—, —$CF_2O$—, —CF=CF—, or —C≡C—; and especially preferably a single bond, an ethylene group, or —COO—. In General Formula (B2), at least one of the linking groups preferably represents a single bond; in General Formula (B3), at least two of them each preferably represent a single bond.

$P^b$ represents a cyano group.

Ring Y is an aromatic group and is represented by any one of General Formulae (Ld) to (Lf).
[Chem. 78]

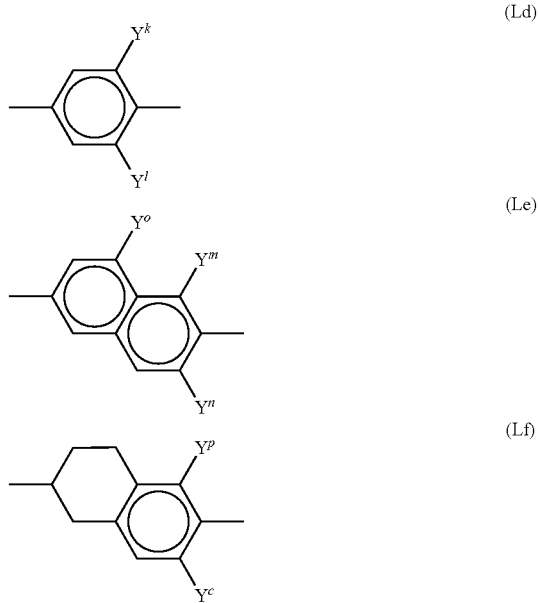

In General Formulae (Ld) to (Lf), $Y^k$ to $Y^Q$ each independently represent a hydrogen atom or a fluorine atom. In General Formula (Ld), it is preferred that at least one of $Y^k$ and $Y^l$ be a fluorine atom; in General Formula (Le), it is preferred that at least one of $Y^m$ to $Y^o$ be a fluorine atom, and, in particular, it is especially preferred that $Y^m$ be a fluorine atom; and in General Formula (Lf), it is preferred that at least one of $Y^p$ and $Y^q$ be a fluorine atom, and, in particular, it is especially preferred that $Y^p$ be a fluorine atom.

The fourth component is a non-polar liquid crystal compound having a dielectric anisotropy of approximately zero, and examples thereof include compounds represented by General Formulae (C1) to (C3).
[Chem. 79]

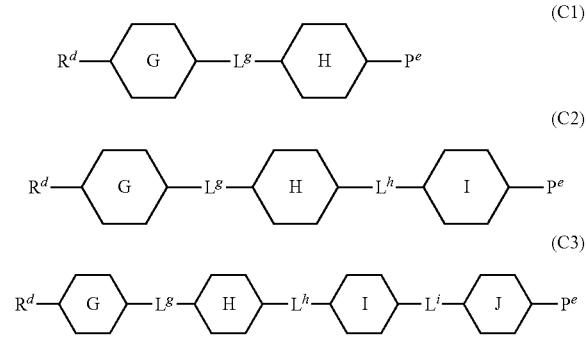

In each of General Formulae (C1) to (C3), $R^d$ and $P^e$ each independently represent an alkyl group having 1 to 12 carbon atoms which may be linear or branched and which may have a cyclic structure of a 3- to 6-membered ring; in such a group, any —$CH_2$— moiety may be substituted with —O—, —CH=CH—, —CH=CF—, —CF=CH—, —CF=CF—, or —C≡C—, and any hydrogen atom may be substituted with a fluorine atom or a trifluoromethoxy group. $R^d$ and $P^e$ are each preferably a linear alkyl group having 1 to 7 carbon atoms, a linear 1-alkenyl group having 2 to 7 carbon atoms, a linear 3-alkenyl group having 4 to 7 carbon atoms, a linear alkoxy group having 1 to 3 carbon atoms, or a linear alkyl group having 1 to 5 carbon atoms and having an end substituted with an alkoxy group having 1 to 3 carbon atoms; furthermore, at least one of $R^d$ and $P^e$ is especially preferably a linear alkyl group having 1 to 7 carbon atoms, a linear 1-alkenyl group having 2 to 7 carbon atoms, or a linear 3-alkenyl group having 4 to 7 carbon atoms.

Rings G, H, I, and J each independently represent a trans-1,4-cyclohexylene group, a trans-decahydronaphthalene-trans-2,6-diyl group, a 1,4-phenylene group which may be substituted with one or two fluorine atoms or methyl groups, a naphthalene-2,6-diyl group which may be substituted with at least one fluorine atom, a tetrahydronaphthalene-2,6-diyl group which may be substituted with one or two fluorine atoms, a 1,4-cyclohexenylene group which may be substituted with one or two fluorine atoms, a 1,3-dioxane-trans-2,5-diyl group, a pyrimidine-2,5-diyl group, or a pyridine-2,5-diyl group; each compound preferably contains at most one of a trans-decahydronaphthalene-trans-2,6-diyl group, a naphthalene-2,6-diyl group which may be substituted with at least one fluorine atom, a tetrahydronaphthalene-2,6-diyl group which may be substituted with one or two fluorine atoms, a 1,4-cyclohexenylene group which may be substituted with a fluorine atom, a 1,3-dioxane-trans-2,5-diyl group, a pyrimidine-2,5-diyl group, and a pyridine-2,5-diyl group, and the other rings are preferably a trans-1,4-cyclohexenylene group or a 1,4-phenylene group which may be substituted with one or two fluorine atoms or methyl groups. The total number of fluorine atoms contained in Rings G, H, I, and J is preferably not more than two, and more preferably zero or one.

$L^g$, $L^h$, and $L^i$ are each a linking group and independently represent a single bond, an ethylene group (—$CH_2CH_2$—), a 1,2-propylene group (—CH($CH_3$)$CH_2$— and —$CH_2$CH ($CH_3$)—), a 1,4-butylene group, —COO—, —OCO—, —$OCF_2$—, —$CF_2O$—, —CH=CH—, —CH=CF—, —CF=CH—, —CF=CF—, —C≡C—, or —CH=NN=CH—; and preferably a single bond, an ethylene group, a 1,4-butylene group, —COO—, —OCO—, —$OCF_2$—, —$CF_2O$—, —CF=CF—, —C≡C—, or —CH=NN=CH—. In General Formula (C2), at least one of the linking groups preferably represents a single bond; in General Formula (C3), at least two of them each preferably represent a single bond.

Compounds represented by General Formulae (C1) to (C3) exclude compounds represented by General Formulae (A1) to (A3) and compounds represented by General Formulae (B1) to (B3).

Compounds represented by General Formulae (A1) to (A3), compounds represented by General Formulae (B1) to (B3), and compounds represented by General Formulae (C1) to (C3) do not have structures in which hetero atoms are directly connected to each other.

The fifth component is an optically active compound used for inducing a helical structure in a liquid crystal composition. Such a compound is preferably a compound having an asymmetric carbon atom, and more preferably a compound having a 1-methylheptyloxy group.

The sixth component is a compound which has a polymerizable functional group and which can be polymerized by being irradiated with ultraviolet light or by being heated and is added to enhance a response speed or improve molecular orientation in a liquid crystal composition. The polymerizable group is preferably an acryloxy group or a methacryloxy group, and more preferably a methacryloxy group. The number of the polymerizable functional groups is preferably one to three, and more preferably two.

In the present invention, a compound represented by General Formula (1) can be produced as follows. Needless to say, the spirit and scope of the present invention are not limited by the following examples of production.

(Production 1)

A compound represented by General Formula (70)

[Math. 80]

$$X-(A^2-Z^2)_n-A^3 \qquad (70)$$

(where $A^2$ represents a 1,4-phenylene group which may be substituted with at least one fluorine atom, $Z^2$, n, and $A^3$ each independently represent the same ones as specified for $Z^2$, n, and $A^3$ in General Formula (1), and X represents a chlorine atom, a bromine atom, or an iodine atom) is allowed to react with metal or alkylmetal to form organic metal, the organic metal is subsequently allowed to react with N,N-dimethylformamide, and then the product is hydrolyzed to produce a benzaldehyde derivative represented by General Formula (71):

[Chem. 81]

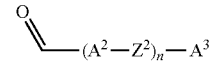

(71)

(where $A^2$ represents a 1,4-phenylene group which may be substituted with at least one fluorine atom, and $Z^2$, n, and $A^3$ each independently represent the same ones as specified for $Z^2$, n, and $A^3$ in General Formula (1)).

Any solvent which allows the reaction to properly proceed can be used; however, an ether solvent such as tetrahydrofuran or diethyl ether is preferably used.

Any metal or alkylmetal which allows the reaction to properly proceed can be used as the metal or alkylmetal for the preparation of the organic metal; however, the metal is preferably magnesium metal, metallic lithium, or zinc metal, and the alkylmetal is preferably normal butyllithium, secondary butyllithium, tertiary butyllithium, or lithium diisopropylamide.

The reaction temperature in the preparation of the organic metal is not limited provided that the reaction properly proceeds; however, the reaction temperature is preferably in the range of −78° C. to a temperature which enables the reflux of the solvent. The reaction temperature in the reaction with dimethylformamide is not limited provided that the reaction properly proceeds; however, the reaction temperature preferably ranges from −78° C. to room temperature, and more preferably −40° C. to 10° C.

In order to prepare a compound in which $A^2$ in General Formula (71) represents a 1,4-cyclohexylene group or 2,6-dioxa-1,4-cyclohexylene group. phosphorus ylide prepared through a reaction of methoxymethyl triphenylphosphine salt with a base is allowed to react with a compound represented by General Formula (72-1) or (72-2)

[Chem. 82]

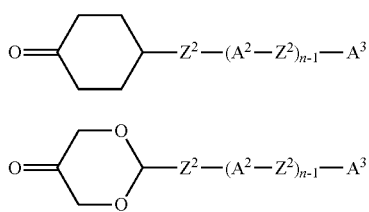

(where $A^2$, $Z^2$, n, and $A^3$ are each independently represent the same ones as specified for $A^2$, $Z^2$, n, and $A^3$ in General Formula (1)), and then the product is hydrolyzed with an acid aqueous solution to produce a compound represented by General Formula (71) in which the $A^2$ directly connected to formyl group is 1,4-cyclohexylene group or 2,6-dioxa-1,4-cyclohexylene group.

Any solvent which allows the reaction to properly proceed can be used; however, the solvent is preferably an ether solvent such as diethyl ether or tetrahydrofuran.

The reaction temperature is not limited provided that the reaction properly proceeds; however, the reaction temperature preferably ranges from −40° C. to room temperature.

The base is preferably a metal hydride such as sodium hydride; alkali metal alkoxide such as sodium methoxide, sodium ethoxide, or tertiary butoxide; or alkyllithium such as normal butyllithium or secondary butyllithium.

Then, a reducing agent is used to reduce the carbonyl group of the compound represented by General Formula (71) to produce a compound represented by General Formula (73):

[Chem. 83]

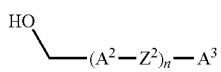

(where $A^2$, $Z^2$, n, and $A^3$ each independently represent the same ones as specified for $A^2$, $Z^2$, n, and $A^3$ in General Formula (1)).

Preferred reducing agents are lithium aluminum hydrides, such as lithium aluminum hydride and bis(methoxyethoxy) lithium aluminum dihydride, and boron hydrides such as sodium tetrahydroborate and lithium tetrahydroborate.

The solvent employed in use of lithium aluminum hydrides is not limited provided that the reaction properly proceeds; however, the solvent is preferably an ether solvent such as tetrahydrofuran or diethyl ether. The solvent employed in use of boron hydrides is not limited provided that the reaction properly proceeds; however, the solvent is preferably an ether solvent, such as tetrahydrofuran or diethyl ether, or an alcohol solvent, such as methanol or ethanol, and more preferably mixed with a small amount of water.

The reaction temperature is not limited provided that the reaction properly proceeds; however, the reaction temperature is preferably in the range of 0° C. to a temperature which enables the reflux of the solvent.

Then, a compound represented by General Formula (74)
[Chem. 84]

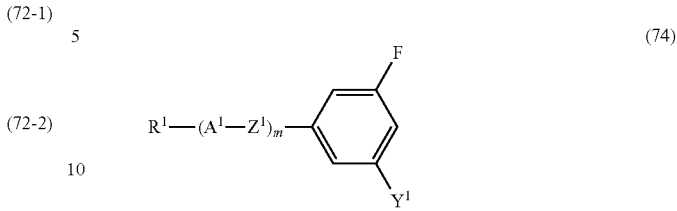

(where $R^1$, $A^1$, $Z^1$, m, and $Y^1$ each independently represent the same ones as specified for $R^1$, $A^1$, $Z^1$, m, and $Y^1$ in General Formula (1)) is allowed to react with a base to derive an organic metal such as phenyllithium, the organic metal is subsequently allowed to react with a boric acid ester, and the product is hydrolyzed and then oxidized with an oxidant to produce a phenol derivative represented by General Formula (75):

[Chem. 85]

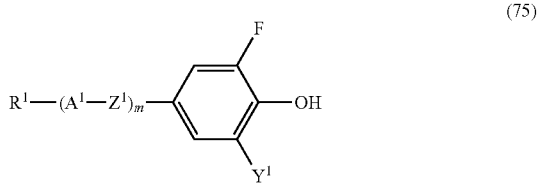

(where $R^1$, $A^1$, $Z^1$, m, and $Y^1$ each independently represent the same ones as specified for $R^1$, $A^1$, $Z^1$, m, and $Y^1$ in General Formula (1)).

Any solvent which allows the reaction to properly proceed can be used; however, an ether solvent such as tetrahydrofuran or diethyl ether is preferably used.

The reaction temperature at which the phenyllithium is derived is not limited provided that the reaction properly proceeds; however, the reaction temperature is preferably in the range of −78° C. to −10° C., and more preferably −40° C. to −20° C. The reaction temperature in the reaction with a boric acid ester is not limited provided that the reaction properly proceeds; however, the reaction temperature is preferably from −40° C. to −10° C. The temperature in the oxidation is not limited provided that the reaction properly proceeds; however, the temperature is preferably from −10° C. to 40° C.

Any base that allows the reaction to properly proceed can be used; however, the base is preferably alkyllithium, such as normal butyllithium or secondary butyllithium, or a lithium amide such as lithium diisopropylamide or lithium dibutylamide.

Any boric acid ester which allows the reaction to properly proceed can be used; however, the boric acid ester is preferably trimethyl borate or triisopropyl borate.

Any oxidant which allows the reaction to properly proceed can be used; however, the oxidant is preferably hydrogen peroxide, performic acid, peracetic acid, or perbenzoic acid.

Then, the compound represented by General Formula (73) is condensed with the phenol derivative represented by General Formula (75) in the presence of triphenylphosphine and an azodicarboxylate to produce a compound represented by General Formula (1).

Any solvent which allows the reaction to properly proceed can be used; however, the solvent is preferably an ether solvent, such as tetrahydrofuran or diethyl ether, or a chlorine-based solvent such as dichloromethane or chloroform.

The reaction temperature is not limited provided that the reaction properly proceeds; however, the reaction temperature is preferably in the range of −20° C. to room temperature.

Any azodicarboxylate that allows the reaction to properly proceed can be used; however, the azodicarboxylate is preferably diethyl azodicarboxylate or diisopropyl azodicarboxylate.

The compound of the present invention has an excellent storage stability after the compound is added to a liquid crystal composition. The term "high storage stability" refers to the following condition: in the case where a liquid crystal composition is stored, a uniform liquid crystal state is maintained therein without, for example, the precipitation of crystals or the occurrence of separation.

EXAMPLES

The present invention will now be described further in detail with reference to Examples but is not limited thereto.

Phase transition temperature was measured with a polarizing microscope having a temperature-controlled stage and a differential scanning calorimeter (DSC) in combination.

In order to evaluate storage stability, a liquid crystal composition was left to stand for two weeks at room temperature, and the precipitation of crystals and the occurrence of separation were visually observed.

In compositions of Examples and Comparative Examples, the term "%" is on a mass basis.

The term "$T_{n-i}$" refers to temperature of transition between a nematic phase and an isotropic phase.

Compounds are abbreviated as follows.
THF: tetrahydrofuran
DMF: N,N-dimethylformamide
DIAD: diisopropyl azodicarboxylate
TPP: triphenylphosphine
Pr: n-propyl group
Bu: n-butyl group Example 1

Production of [2,6-difluoro-4-(2-fluoro-4-(trans-4-propylphenyl)phenyl)phenyloxy]-[4-(3,4,5-trifluorophenyl)phenyl]methane (12-3)

[Chem. 86]

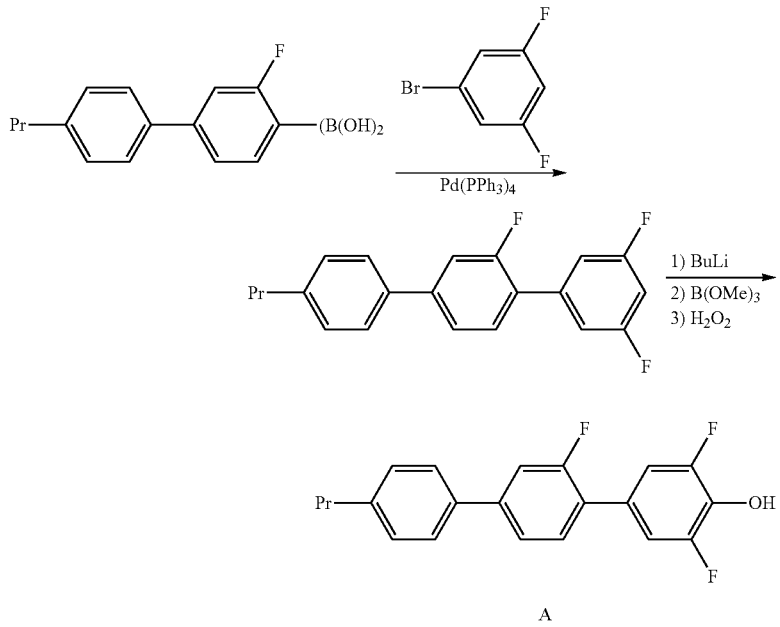

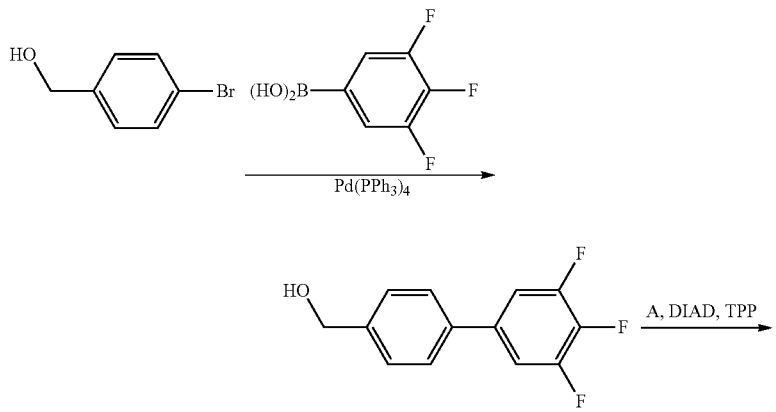

-continued

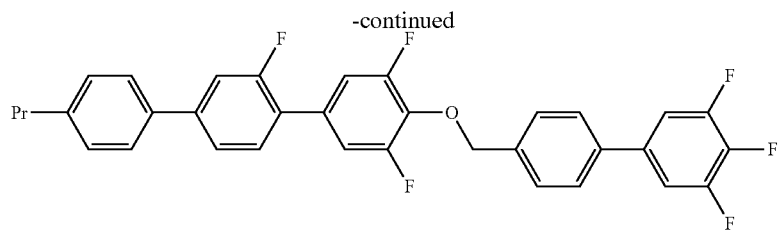

(1-1) Under a nitrogen atmosphere, a suspension solution containing 3,5-difluorobromobenzene (71 g), potassium carbonate (75 g), tetrakis(triphenylphosphine)palladium (0) (2.2 g), and ethanol (250 mL) was heated to 70° C., and a solution in which 2-fluoro-4-(4-propylphenyl)phenylboronic acid (100 g, prepared by a method disclosed in EP 2123623) had been dissolved in ethanol (200 mL) was dropped thereinto. Then, the resulting solution was stirred at 70° C. for 5 hours. The solution was cooled with ice and filtered to separate precipitated crystals and an inorganic salt, the obtained solid was dissolved in a solution containing hexane and toluene (4:1), and then the solution was purified by silica gel column chromatography. The purified product was recrystallized from ethanol to yield 18.7 g of 3,5-difluoro-[2-fluoro-4-(4-propylphenyl)phenyl]benzene.

(1-2) Under a nitrogen atmosphere, the 3,5-difluoro-[2-fluoro-4-(4-propylphenyl)phenyl]benzene (18.7 g) obtained in the process (1-1) was dissolved in THF (90 mL), and the solution was cooled to −40° C. or lower. Then, 1.6 mol/L of an n-butyllithium/hexane solution (40 mL) was added thereto at a rate which did not allow the internal temperature to be −35° C. or higher, and the product was stirred at −40° C. for an hour. Then, trimethyl borate (7.1 g) was added thereto at −40° C. at a rate which did not allow the internal temperature to be −35° C. or higher. The temperature was slowly increased to room temperature, the product was further stirred for 30 minutes at room temperature, 10% hydrochloric acid (50 mL) was subsequently added thereto under cooling with ice to separate the organic layer, and the organic layer was washed with a saturated salt solution. Then, a 30% hydrogen peroxide solution (8.4 g) was slowly added thereto, and then the product was stirred at 40° C. for 14 hours. The product was cooled with ice, and a 10% aqueous sodium sulfite solution was added thereto at a rate which did not allow the internal temperature to exceed 20° C., thereby separating the organic layer. Toluene was added to the water layer for extraction, the organic layer was added thereto and then washed with a saturated salt solution, and sodium sulfate was added thereto for dehydration. The solvent was distilled off under reduced pressure, and the product was purified by silica gel column chromatography and then recrystallized from hexane, thereby yielding 14.6 g of 2,6-difluoro-4-[2-fluoro-4-(4-propylphenyl)phenyl]phenol (A).

(1-3) Under dry nitrogen, 4-bromobenzyl alcohol (30 g), anhydrous potassium carbonate (33.1 g), and tetrakis(triphenylphosphine)palladium (0) (0.93 g) were dissolved in ethanol (100 mL), and the solution was heated to 70° C. Under heating, a solution in which 3,4,5-trifluorophenyl borate (29.6 g) had been dissolved in ethanol (90 mL) was added thereto, and the product was stirred at 70° C. for 6 hours. The product was cooled to room temperature, an insoluble matter was removed by filtration, the solvent was distilled off under reduced pressure, and toluene and water were added thereto for separation. Toluene was added to the water layer for extraction, and the organic layer was added thereto and then washed with a saturated salt solution. Anhydrous sodium sulfate was added thereto for dehydration, and the solvent was distilled off under reduced pressure. The residue was purified by silica gel column chromatography and then recrystallized from a mixed solvent of toluene and hexane, thereby yielding 29.2 g of a white solid that was 4-(3,4,5-trifluorophenyl)benzyl alcohol.

(1-4) Under dry nitrogen, the 4-(3,4,5-trifluorophenyl)benzyl alcohol (2.8 g) obtained in the process (1-3), the product (A) obtained in the process (1-2) (4.0 g), and triphenylphosphine (3.7 g) were dissolved in THF (20 mL), and the solution was cooled with ice. Under cooling with ice, DIAD (2.6 g) was added thereto at a rate which did not allow the internal temperature to be 15° C. or higher, and the product was stirred for an hour at room temperature. Water (1 mL) was added thereto, and the solvent was subsequently distilled off under reduced pressure. Methanol (150 mL) and a 70% tert-butyl hydroperoxide solution (1 g) were added to the residue, and the product was stirred for 2 hours at room temperature. The precipitate was separated by filtration, and the solid content was purified by silica gel column chromatography and then recrystallized from acetone, thereby yielding 3.4 g of a white solid that was [2,6-difluoro-4-(2-fluoro-4-(4-propylphenyl)phenyl)phenyloxy]-[4-(3,4,5-trifluorophenyl)phenyl]methane.

MS m/z: 562 [M+]

Phase transition temperature (° C.): Cr 131 N, 229 Iso $^1$HNMR (CDCl$_3$, TMS internal standard substance) δ (ppm)=7.56-7.50 (6H, m), 7.45-7.34 (3H, m), 7.27 (2H, d, j=8.0 Hz), 7.23-7.15 (4H, m), 5.26 (2H, s), 2.64 (2H, t, j=7.6 Hz), 1.68 (2H, sextet, j=7.6 Hz), 0.98 (3H, t, j=7.2 Hz)

Example 2

Production of [2,6-difluoro-4-(2-fluoro-4-(trans-propylcyclohexyl)phenyl)phenyloxy]-[3,5-difluoro-4-(4-trifluoromethoxyphenyl)phenyl]methane (18-1)

[Chem. 87]

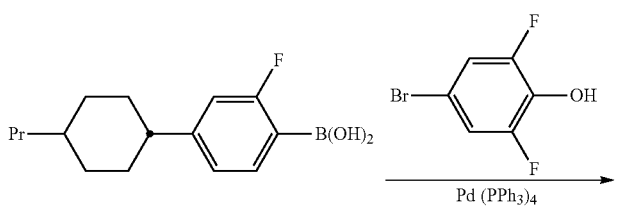

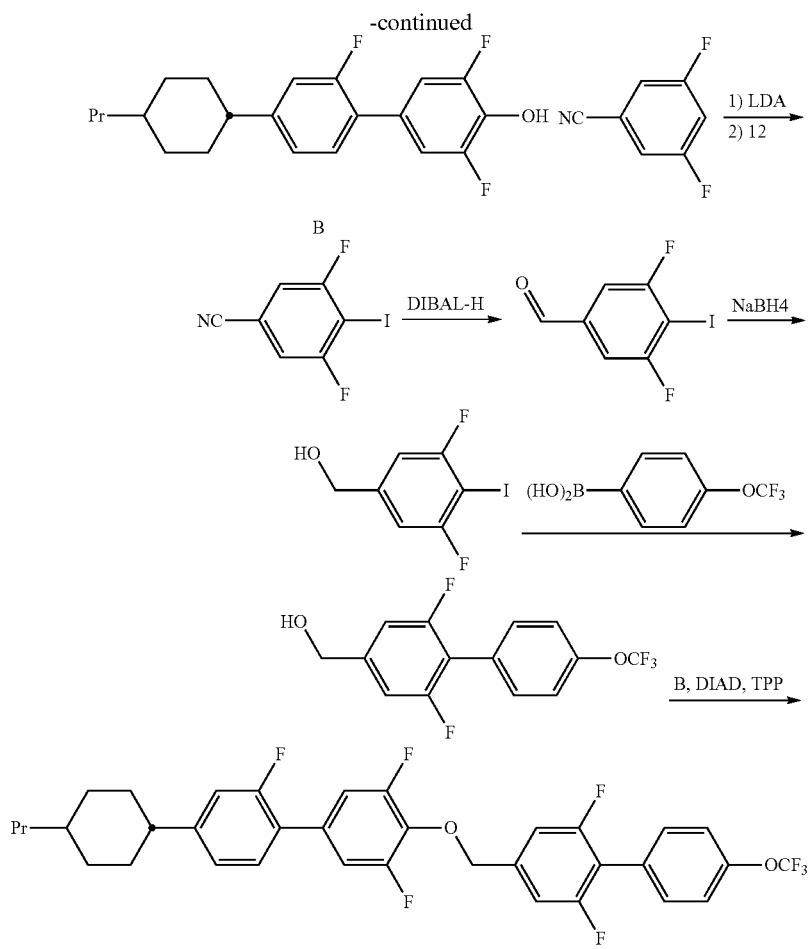

(2-1) Under dry nitrogen, 4-bromo-2,6-difluorophenol (24.2 g), 2 mol/L of an aqueous potassium carbonate solution (90 mL), tetrakis(triphenylphosphine)palladium (0) (1.35 g), and ethanol (90 mL) were mixed with each other, and the mixture was heated to 70° C. Under heating, a solution in which 2-fluoro-4-(trans-4-propylcyclohexyl)phenyl borate (34.0 g, prepared by a method disclosed in EP 220665) had been dissolved in ethanol (100 mL) was added thereto, and the product was stirred at 70° C. for 7 hours. The product was cooled with ice, 6N hydrochloric acid and dichloromethane were added thereto for separation, dichloromethane was added to the water layer for extraction, the organic layer was added thereto and washed with water, and then anhydrous sodium sulfate was added thereto for dehydration. The solvent was distilled off under reduced pressure, and the product was purified by silica gel column chromatography and then recrystallized from hexane, thereby yielding 27.3 g of a slightly brown solid that was 2,6-difluoro-4-[2-fluoro-4-(trans-4-propylcyclohexyl)phenyl]phenol (B).

(2-2) Under dry nitrogen, diisopropylamine (65.5 g) was dissolved in THF (130 mL), and the solution was cooled to −76° C. Under cooling, 1.6 mol/L of an n-butyllithium/hexane solution (375 mL) was added thereto at a rate which did not allow the internal temperature to be −65° C. or higher, and then the product was stirred at −76° C. for 30 minutes. Then, a solution in which 3,5-difluorobenzonitrile (60 g) had been dissolved in THF (180 mL) was added thereto at a rate which did not allow the internal temperature to be −65° C. or higher, and then the product was stirred at −76° C. for an hour. Then, a solution in which iodine (115.0 g) had been dissolved in THF (230 mL) was added thereto at a rate which did not allow the internal temperature to be −60° C. or higher, and then the temperature was slowly increased to room temperature. A 15% aqueous sodium sulfite solution (500 mL) was added thereto for separation, toluene was added to the water layer for extraction, and the organic layer was added thereto and washed twice with a saturated salt solution. Anhydrous sodium sulfate was added thereto for dehydration, the solvent was distilled off under reduced pressure, and then the product was purified by silica gel column chromatography, thereby yielding a slightly brown solid that was 3,5-difluoro-4-iodobenzonitrile (70.7 g).

(2-3) Under dry nitrogen, the 3,5-difluoro-4-iodobenzonitrile (70.7 g) obtained in the process (2-2) was dissolved in dichloromethane (350 mL), and the solution was cooled to −10° C. Under cooling, 1.5 mol/L of diisobutyl aluminum hydride (180 mL) was added thereto at a rate which did not allow the internal temperature to exceed 0° C., and the product was stirred at room temperature for an hour. The reaction solution was added to 6N hydrochloric acid, the product was stirred for 30 minutes and then subjected to separation, and the organic layer was washed with 10% hydrochloric acid and a saturated salt solution and then dehydrated with sodium sulfate. The solvent was distilled off under reduced pressure, and the product was purified by silica gel column chromatography, thereby yielding a slightly yellow solid that was 3,5-difluoro-4-iodobenzaldehyde (57.9 g).

(2-4) The 3,5-difluoro-4-iodobenzaldehyde (57.9 g) obtained in the process (2-3), ethanol (240 mL), and water (50 mL) were mixed with each other, and the mixture was cooled with ice. Under cooling with ice, sodium tetrahydroborate (2.45 g) was added thereto, and then the product was stirred at room temperature for an hour. Then, 10% hydrochloric acid and dichloromethane were added thereto for separation, dichloromethane was added to the water layer for extraction, and the organic layer was added thereto and washed with saturated aqueous sodium hydrogen carbonate and a saturated salt solution. Anhydrous sodium sulfate was added thereto for dehydration, and the solvent was distilled off under reduced pressure, thereby yielding 53.7 g a yellow solid that was crude 3,5-difluoro-4-iodobenzyl alcohol.

(2-5) Under dry nitrogen, the crude 3,5-difluoro-4-iodobenzyl alcohol (15.0 g) obtained in the process (2-4), anhydrous potassium carbonate (11.5 g), and tetrakis(triphenylphosphine)palladium (0) (2.6 g) were suspended in DMF (75 mL), and the solution was heated to 100° C. Under heating, a solution in which 4-trifluoromethoxyphenyl borate (19.8 g) had been dissolved in DMF (60 mL) was added thereto, and the product was stirred at 100° C. for 8 hours. The product was left to stand for cooling to room temperature, toluene and water were subsequently added thereto for separation, toluene was added to the water layer for extraction, and the organic layer was added thereto and washed with a saturated salt solution. Anhydrous sodium sulfate was added thereto for dehydration, the solvent was distilled off under reduced pressure, and the product was purified by silica gel column chromatography, thereby yielding 20.0 g of a slightly yellow solid that was 3,5-difluoro-4-(4-trifluoromethoxyphenyl)benzyl alcohol.

(2-6) Under dry nitrogen, the product (B) (5.5 g) obtained in the process (2-1), the 3,5-difluoro-4-(4-trifluoromethoxyphenyl)benzyl alcohol (4.8 g) obtained in the process (2-5), and triphenylphosphine (5.0 g) were dissolved in THF (25 mL), and the solution was cooled with ice. Under cooling with ice, DIAD (3.5 g) was added thereto at a rate which did not allow the internal temperature to be 15° C. or higher, and the product was stirred at room temperature for an hour. Water (1 mL) was added thereto, the solvent was subsequently distilled off under reduced pressure, methanol (80 mL) and water (40 mL) were added thereto, and the product was stirred for 30 minutes under cooling with ice. The precipitate was separated by filtration, and then the solid content was purified by silica gel column chromatography, and the purified product was recrystallized from a mixed solvent of ethanol/acetone, thereby producing 4.0 g of a white solid that was [2,6-difluoro-4-(2-fluoro-4-(trans-propylcyclohexyl)phenyl)phenyloxy]-[3,5-difluoro-4-(4-trifluoromethoxyphenyl)phenyl]methane.

Phase transition temperature (° C.): Cr 83 SmA 185 N, 239 Iso

MS m/z: 634 [M$^+$]

$^1$HNMR (CDCl$_3$, TMS internal standard substance) δ (ppm)=7.51 (2H, d, J=8.6 Hz), 7.31-7.27 (3H, m), 7.18-7.11 (4H, m), 7.07-6.98 (2H, m), 5.21 (2H, s), 2.53-2.47 (1H, m), 1.90 (4H, t, j=12.1 Hz), 1.52-1.19 (7H, m), 1.11-1.01 (2H, m), 0.91 (3H, t, J=7.1 Hz)

Example 3

Production of [2,6-difluoro-4(trans-4-propylcyclohexyl)phenyloxy]-[4-(3,5-difluoro-4-(3,4,5-trifluorophenyl)phenyl)phenyl]methane (37-1)

[Chem. 88]

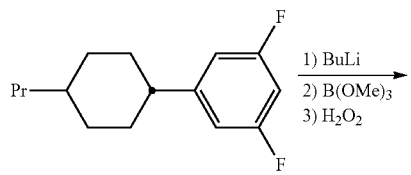

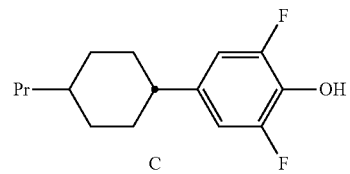

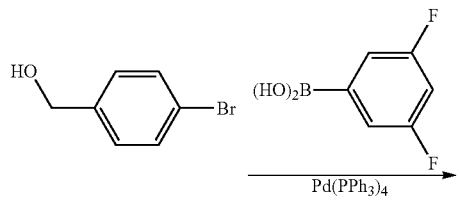

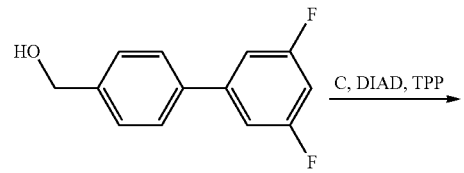

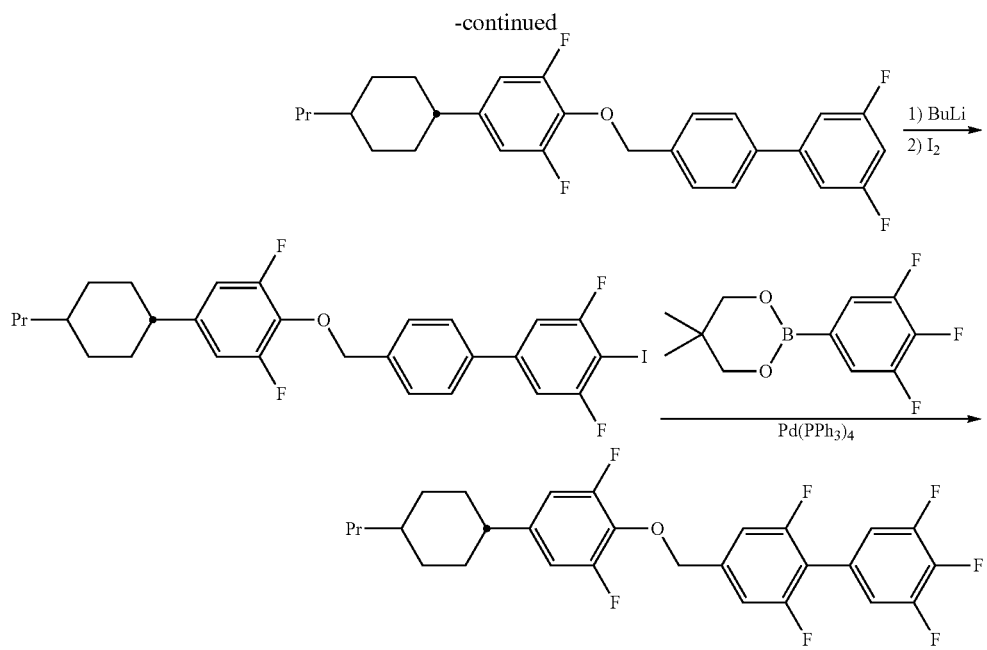

(3-1) In THF (200 mL), 1,3-difluoro-5-(trans-4-propylcyclohexyl)benzene (40 g, prepared by a method described in *Molecular Crystals and Liquid Crystals;* 2001; vol. 364 p. 899) was dissolved, and the solution was cooled to 40° C. Under cooling, 1.6 mol/L of an n-butyllithium/hexane solution (120 mL) was added thereto at a rate which did not allow the internal temperature to be −35° C. or higher, and the product was stirred at −40° C. for an hour. Then, trimethyl borate (20.9 g) was added thereto at a rate which did not allow the internal temperature to be −35° C. or higher, and the temperature was slowly increased to room temperature. Then, 10% hydrochloric acid was added thereto for separation. THF and hexane were added to the water layer for extraction, and the organic layer was added thereto and washed with saturated aqueous sodium hydrogen carbonate. Then, a 15% hydrogen peroxide solution (49.4 g) was added to the resulting organic layer, and the product was stirred at 35° C. for 15 hours. The product was cooled with ice, a 10% aqueous sodium sulfite solution was added thereto, and then toluene was added thereto for separation. Toluene was added to the water layer for extraction; and the organic layer was added thereto, washed with a 10% aqueous sodium sulfite solution and a saturated salt solution, and then dehydrated with anhydrous sodium sulfate. The solvent was distilled off under reduced pressure, the product was purified by silica gel column chromatography, and then the purified product was recrystallized from hexane, thereby obtaining 31.9 g of a white crystal that was 2,6-difluoro-4-(trans-4-propylcyclohexyl)phenol (C).

(3-2) Except that 3,5-difluoroborate was used in place of 3,4,5-trifluorophenyl borate, 8.2 g of a white solid that was 4-(3,5-difluorophenyl)benzyl alcohol was produced as in the process (1-3).

(3-3) Under dry nitrogen, the 4-(3,5-difluorophenyl)benzyl alcohol (8.2 g) obtained in the process (3-2), the product (C) (9.5 g) obtained in the process (3-1), and triphenylphosphine (11.3 g) were dissolved in THF (50 mL), and the solution was cooled with ice. Under cooling with ice, DIAD (8.3 g) was added thereto at a rate which did not allow the internal temperature to exceed 15° C., and then the product was stirred at room temperature for an hour. Water (1 mL) was added thereto; the solvent was subsequently distilled off under reduced pressure; and hexane (200 mL), methanol (150 mL), and water (100 mL) were added thereto for separation. Hexane was added to the water layer for extraction, the organic layer was added thereto and washed with water and a saturated salt solution, and then anhydrous sodium sulfate was added thereto for dehydration. The solvent was distilled off under reduced pressure, the product was purified by silica gel column chromatography, and the purified product was recrystallized from a mixed solvent of acetone/ethanol, thereby obtaining 6.3 g of a white crystal that was [2,6-difluoro-4-(trans-4-propylcyclohexyl)phenyloxy]-[4-(3,5-difluorophenyl)phenyl]methane.

(3-4) Under dry nitrogen, the [2,6-difluoro-4-(trans-4-propylcyclohexyl)phenyloxy]-[4-(3,5-difluorophenyl)phenyl]methan (6.3 g) obtained in the process (3-3) was dissolved in THF (70 mL), and the solution was cooled to −74° C. Under cooling, 1.6 mol/L of an n-butyllithium/hexane solution (10 mL) was added thereto at a rate which did not allow the internal temperature to exceed −65° C., and the product was stirred at −74° C. for an hour. Then, a solution in which iodine (4.2 g) had been dissolved in THF (20 mL) was added thereto at a rate which did not allow the internal temperature to be −65° C. or higher, and then the temperature was slowly increased to room temperature. A 10% aqueous sodium sulfite solution and hexane were added thereto for separation, hexane was added to the water layer for extraction, and the organic layer was added thereto and washed with a saturated salt solution. Anhydrous sodium sulfate was added thereto for dehydration, and the solvent was distilled off under reduced pressure, thereby yielding 8.1 g of a yellow solid that was crude [2,6-difluoro-4-(trans-4-propylcyclohexyl)phenyloxy]-[4-(3,5-difluoro-4-iodophenyl)phenyl]methane.

(3-5) Under dry nitrogen, the [2,6-difluoro-4-(trans-4-propylcyclohexyl)phenyloxy]-[4-(3,5-difluoro-4-iodophenyl)phenyl]methane (8.1 g) obtained in the process (3-4), 3,4,5-trifluorophenyl borate (4.1 g), anhydrous potassium carbonate (2.9 g), and tetrakis(triphenylphosphine) palladium (0) (0.32 g) were suspended in DMF (40 mL); and the solution was stirred at 100° C. for 11 hours. The product was left to stand for cooling to room temperature, toluene and water were added thereto for separation, toluene was added to the water layer for extraction, and the organic layer was added thereto and washed with a saturated salt solution. Anhydrous sodium sulfate was added thereto for dehydration, the solvent was distilled of under reduced pressure, and the product was purified by silica gel column chromatography, and then the purified product was recrystallized from acetone, thereby obtaining 3.5 g of a colorless crystal that was [2,6-difluoro-4-(trans-4-propylcyclohexyl)phenyloxy]-[4-(3,5-difluoro-4-(3,4,5-trifluorophenyl)phenyl)phenyl]methane.

Phase transition temperature (° C.): Cr 121.6 N 192.0 Iso
MS m/z: 586 [M⁺]

¹HNMR (CDCl₃, TMS internal standard substance) δ (ppm)=7.58 (4H, d, =2.4 Hz), 7.26-7.15 (4H, m), 6.75 (2H, d, J=9.6 Hz), 5.17 (2H, s), 2.41-2.35 (1H, m), 1.86 (4H, d, j=11.0 Hz), 1.40-1.17 (7H, m), 1.06-0.96 (2H, m), 0.90 (3H, t, J=7.2 Hz)

Example 4

Production of [trans-4-(3,5-difluoro-4-(3,5-difluoro-4-(3,4,5-trifluorophenylmethyloxy)phenyl)phenyl)cyclohexyl]-(2,6-difluoro-4-propylphenyloxy)methane (44-1)

[Chem. 89]

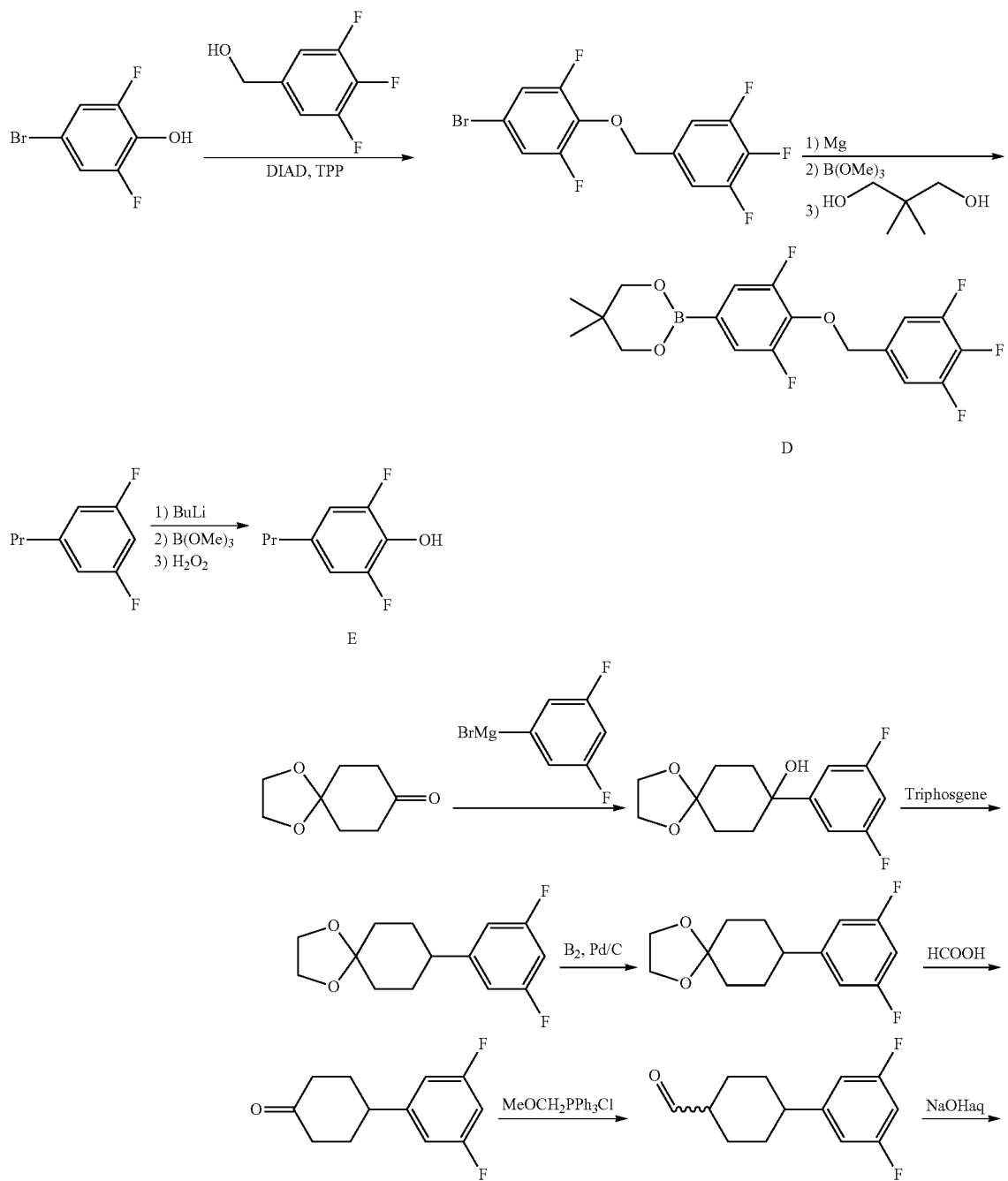

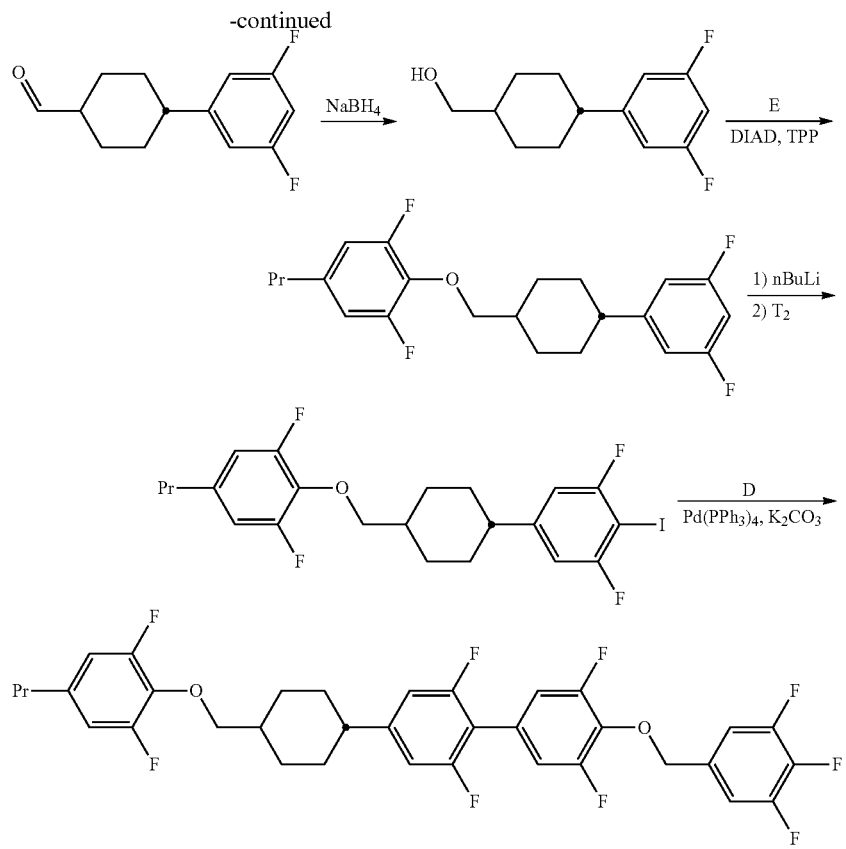

(4-1) Under a nitrogen atmosphere, 4-bromo-2,6-difluorophenol (10 g), 3,4,5-trifluorobenzyl alcohol (5.8 g), and triphenylphosphine (11.2 g) were dissolved in THF (50 mL), and the solution was cooled to −10° C. Under cooling, DIAD (7.9 g) was added thereto at a rate which did not allow the internal temperature to be 5° C. or higher, and the product was stirred at room temperature for two hours. Water (1 mL) was added thereto, and the organic solvent was subsequently distilled off under reduced pressure, and hexane (200 mL) and a 70% aqueous tert-butylhydroperoxide solution (2 g) were added thereto, and the product was stirred at room Temperature for an hour. The precipitate was removed by filtration, and the resulting solution was purified by silica gel column chromatography, thereby yielding 14.4 g of a colorless liquid that was (4-bromo-2,6-difluorophenyloxy)-(3,4,5-trifluorophenyl)methane.

(4-2) Under a nitrogen atmosphere, magnesium metal (1.2 g) was suspended in THF (3 mL), and a solution in which the (4-bromo-2,6-difluorophenyloxy)-(3,4,5-trifluorophenyl)methane (14.4 g) obtained in the process (4-1) had been dissolved in THF (45 mL) was added thereto at a rate which allowed moderate reflux, and then the product was stirred at 60° C. for an hour. The reaction solution was cooled with ice, a solution in which trimethyl borate (4.7 g) had been dissolved in THF (10 mL) was added thereto at a rate which did not allow the internal temperature to be 10° C. or higher, and then the product was stirred at room temperature for an hour. The solution was cooled with ice, 10% hydrochloric acid (100 mL) and toluene (100 mL) were added thereto, the product was stirred, and the organic layer was separated. Toluene was added to the water layer for extraction, and the organic layer was added thereto and washed with a saturated salt solution. Anhydrous magnesium sulfate (30 g) and neopentylglycol (5.5 g) were added thereto, and the product was stirred at room temperature for an hour. The insoluble matter was removed by filtration, and the resulting solution was concentrated under reduced pressure, thereby yielding 17.0 g of a brown solid that was 5,5-dimethyl-2-[3,5-difluoro-4-(3,4,5-trifluorophenylmethyloxy)phenyl]-[1,3,2]dioxaborinane (D).

(4-3) Under a nitrogen atmosphere. 3,5-difluoropropyl benzene (134 g, synthesized as described in *Molecular Crystals and Liquid Crystals;* 1995; 260; 93-106) was dissolved in THF (650 mL), and the solution was cooled to −40° C. or lower. Then, 1.6 mol/L of an n-butyllithium/hexane solution (640 mL) was added thereto at a rate which did not allow the internal temperature to be −35° C. or higher, and the product was stirred at −40° C. for an hour. Then, a solution in which trimethyl borate (116 g) had been dissolved in THF (350 mL) was added thereto at −40° C. at a rate Which did not allow the internal temperature to be −35° C. or higher. The temperature was slowly increased to room temperature, the product was stirred at room temperature for 30 minutes, 10% hydrochloric acid (400 mL) was added thereto under cooling with ice to separate the organic layer, and the organic layer was washed with a saturated salt solution. Then, a 15% hydrogen peroxide solution (215 g) was slowly added thereto, and then the product was stirred for 6 hours under heating at 40° C. The product was cooled with ice, and then a 20% aqueous sodium sulfite solution (300 mL) was added thereto at a rate which did not allow the internal temperature to exceed 20° C., thereby separating the organic layer. Ethyl acetate (500 mL) was added to the water layer for extraction, the organic layer was added thereto and then washed with a saturated salt solution, and sodium sulfate was added thereto for dehydration. The solvent was distilled off under reduced pressure, hexane (800 mL) was added thereto, an insoluble matter was removed by filtration, and the filtrate was concentrated under reduced pressure, thereby yielding a yellow liquid that was 2,6-difluoro-4-propylphenol ((E), 123 g).

(4-4) Under an argon atmosphere, 20.3 g of magnesium was suspended in THF (40 mL), and a, solution of 3,5-difluorobromobenzene (149 g) in THF (450 mL) was dropped thereinto at an internal temperature ranging from 40 to 60° C. The resulting solution was stirred at room temperature for an hour, a solution of 1,4-cyclohexanedione monoethylene ketal (100 g) in THF (300 mL) was subsequently dropped thereinto at an internal temperature ranging from 40 to 60° C., and the product was stirred at room temperature for an hour. Water (250 mL), 10% hydrochloric acid (200 mL), and 750 mL of toluene were added to the solution in sequence, the resulting solution was stirred at room temperature for 30 minutes, and then the organic layer was separated. The organic layer was washed twice with a saturated salt solution, and then anhydrous sodium sulfate was added thereto for dehydration. The solvent was distilled off under reduced pressure, thereby yielding 178 g of a pale yellow solid that was 4-(3,5-difluorophenyl)-4-hydroxycyclohexanone ethylene ketal.

(4-5) Under an argon atmosphere, the 4-(3,5-difluorophenyl)-4-hydroxycyclohexanone ethylene ketal (178 g) obtained in the process (4-4) and 120 g. of pyridine were dissolved in 700 mL of toluene, and a solution of 68 g of triphosgene in toluene (276 mL) was dropped thereinto at an internal temperature of 22° C. or lower. The solution was stirred at an internal temperature ranging from 20 to 25° C. for 2 hours and then added to water (800 mL). The organic layer was washed twice with water (300 mL) and further twice with a saturated salt solution (300 mL) in sequence, thereby yielding a solution of 1-(3,5-difluorophenyl)-4-cyclohexenone ethylene ketal in toluene.

(4-6) To the solution obtained in the process (4-5), 15 g of 5% palladium on carbon (50% moisture content) was added, and the product was stirred in an autoclave for 4 hours at a hydrogen pressure of 0.4 MPa and an external temperature of 40° C. The catalyst was removed by filtration, and the resulting solution was concentrated to some extent, thereby yielding a solution of 4-(3,5-difluorophenyl)cyclohexanone ethylene ketal in toluene.

(4-7) To the solution obtained in the process (4-6), 500 mL of formic acid was added, and the resulting solution was stirred at an internal temperature of 40° C. for 4 hours. Then, 500 mL of water was added thereto; the resulting solution was stirred; the organic layer was washed with a saturated salt solution, a saturated aqueous sodium hydrogen carbonate, and a saturated salt solution in sequence; and then anhydrous sodium sulfate was added thereto for dehydration. The solvent was distilled off to produce 119 g of a pale yellow solid that was 4-(3,5-difluorophenyl)cyclohexanone.

(4-8) Under an argon atmosphere, (methoxymethyl)triphenylphosphonium chloride (263 g) was suspended in THF (800 mL), 90 g of potassium-t-butoxide was added thereto at an internal temperature of 0° C. or lower, and the solution was stirred at an internal temperature of 0° C. for 20 minutes. A solution of the 4-(3,5-difluorophenyl)cyclohexanone (119 g) obtained in the process (4-7) in THF (300 mL) was added thereto at an internal temperature of 5° C. or lower, and the product was stirred at an internal temperature ranging from −5 to 8° C. for 30 minutes. Water (10 mL) was added thereto; the solvent was subsequently distilled off under reduced pressure; water (400 mL), methanol (400 mL), hexane (500 mL), and 7.3 g of a 70% aqueous t-butyl hydroperoxide solution were added to the residue; and the product was stirred at room temperature for an hour. The organic layer was separated, hexane was added to the water layer for extraction, the organic layer was subsequently added thereto and washed with a 50% aqueous methanol solution and further twice with water in sequence, and the solvent was distilled off under reduced pressure. Then, 10% hydrochloric acid (400 mL) and THF (400 mL) were added to the residue, and the product was heated for an hour under reflux. The organic layer was separated, ethyl acetate was added to the water layer for extraction, and then the organic layer was added thereto and washed twice with a saturated salt solution. The solvent was distilled off under reduced pressure, methanol (300 mL) and a 10% aqueous sodium hydroxide solution (20 mL) were added to the residue, and the product was stirred at 5 to −15° C. for an hour. The product was neutralized with 10% hydrochloric acid; water (300 mL), THF (200 mL), and ethyl acetate (400 mL) were subsequently added thereto; the organic layer was washed twice with a saturated salt solution; and then anhydrous sodium sulfate was added thereto for dehydration. The solvent was distilled off under reduced pressure to yield 112 g of a pale yellow oil that was trans-4-(3,5-difluorophenyl) cyclohexane carbaldehyde.

(4-9) The trans-4-(3,5-difluorophenyl)cyclohexane carbaldehyde (112 g) obtained in the process (4-8) was dissolved in a mixture of ethanol (224 mL), THF (30 mL), and water (30 mL), sodium boron hydride (9.4 g) was slowly added thereto at an external temperature of 5° C.; and the product was stirred at an external temperature of 5° C. for 10 minutes. The reaction solution was slowly added to 10% hydrochloric acid (450 mL), the resulting solution was stirred for some time, the organic layer was separated, ethyl acetate was added to the water layer for extraction, and the organic layer was added thereto and washed twice with a saturated salt solution. Anhydrous sodium sulfate was added thereto for dehydration, and then the solvent was distilled off under reduced pressure, thereby yielding 110 g of a pale yellow oil that was trans-4-(3,5-difluorophenyl)cyclohexyl methanol.

(4-10) Under an argon atmosphere, the product (E) (70 g) obtained in the process (4-3), the trans-4-(3,5-difluorophenyl)cyclohexyl methanol (82.6 g) obtained in the process (4-9), and triphenylphosphine (110 g) were dissolved in THF (400 mL); and then DIAD (81.2 g) was dropped thereinto at an internal temperature of 23° C. or lower. The resulting solution was stirred at room temperature for 10 minutes, 10 mL of water was added thereto, and the solvent was distilled off under reduced pressure. Hexane (200 mL), water (200 mL), and methanol (300 mL) were added to the residue; the organic layer was separated; hexane was added to the water layer for extraction; and then the organic layer was added thereto and washed twice with a 50% aqueous methanol solution (200 mL) and further with a saturated salt solution (200 mL) in sequence. The resulting solution was purified by column chromatography (silica gel/hexane), and the solvent was distilled off under reduced pressure to produce 132.4 g of a pale yellow solid. The pale yellow solid was recrystallized from ethanol (200 mL) to yield 80.2 g of a colorless solid that was 4-(3,5-difluorophenyl)cyclohexyl-(2,6-difluoro-4-propylphenyloxy)methane.

(4-11) Under an argon atmosphere, the 4-(3,5-difluorophenyl)cyclohexyl-(2,6-difluoro-4-propylphenyloxy)methane (40 g) obtained in the process (4-10) was dissolved in THF (400 mL), and 1.6 mol/L of an n-butyllithium/hexane solution (70 mL) was dropped thereinto at an internal temperature ranging from −50 to −60° C. The solution was heated to −40° C. and then cooled again, and a solution of iodine (32 g) in THF (80 mL) was dropped thereinto at −50° C. or lower. The resulting solution was heated to an internal temperature of 0° C., a 10% aqueous sodium sulfite solution (100 mL) was dropped thereinto, the product was stirred at room temperature for an hour, and the organic layer was separated. Ethyl acetate was added to the water layer for extraction, the organic layer was added thereto and washed with a 5% aqueous sodium sulfite solution and further twice with a saturated salt solution, and anhydrous sodium sulfate was added thereto for dehydration. The solvent was distilled off to produce 52.8 g of a pale yellow solid that was 4-(3,5-difluoro-4-iodophenyl)cyclohexyl-(2,6-difluoro-4-propylphenyloxy)methane.

(4-12) Under an argon atmosphere, the 4-(3,5-difluoro-4-iodophenyl)cyclohexyl-(2,6-difluoro-4-propylphenyloxy)methane (6.0 g) obtained in the process 4-11, anhydrous potassium carbonate (2.5 g), and tetrakis(triphenylphosphine)palladium (0) (0.67 g) were suspended in DMF (30 mL); and the solution was heated to 100° C. A solution in which the product (D) (6.9 g) obtained in the process (4-2) had been dissolved in DMF (20 mL) was added thereto under heating, and the resulting solution was stirred at 100° C. for 13 hours. The solution was left to stand for cooling to room temperature, toluene and water were subsequently added thereto for separation, toluene was added to the aqueous layer for extraction, and the organic layer was added thereto and washed with a saturated salt solution. Anhydrous sodium sulfate was added thereto for dehydration, and the solvent was distilled off under reduced pressure. The residue was purified by silica gel column chromatography, and the purified product was recrystallized from ethanol, thereby yielding 2.5 g of a white solid that was [trans-4-(3,5-difluoro-4-(3,5-difluoro-4-(3,4,5-trifluorophenylmethyloxy)phenyl)phenyl)cyclohexyl]-(2,6-difluoro-4-propylphenyloxy)methane.

Phase transition temperature (° C.): Cr 114 N 175 Iso
MS m/z: 652 [M⁺]
¹HNMR (CDCl₃, TMS internal standard substance) δ (ppm)=7.16-7.04 (4H, m), 6.86 (2H, d, J=9.2 Hz), 6.71 (2H, d, J=9.0 Hz), 5.13 (2H, s), 3.94 (2H, d, J=6.3 Hz), 2.58-2.48 (3H, m), 2.10-1.97 (4H, m), 1.88-1.80 (1H, m), 1.66-1.43 (4H, m), 1.31-1.21 (2H, m), 0.93 (3H, t, J=7.1 Hz)

Example 5

Production of [2,6-difluoro-4-(2-fluoro-4-(trans-4-propylcyclohexyl)phenyl)phenyloxy]-[4-(5,6,7-trifluoro-2-naphthyl)phenyl]methane (50-3)

[Chem. 90]

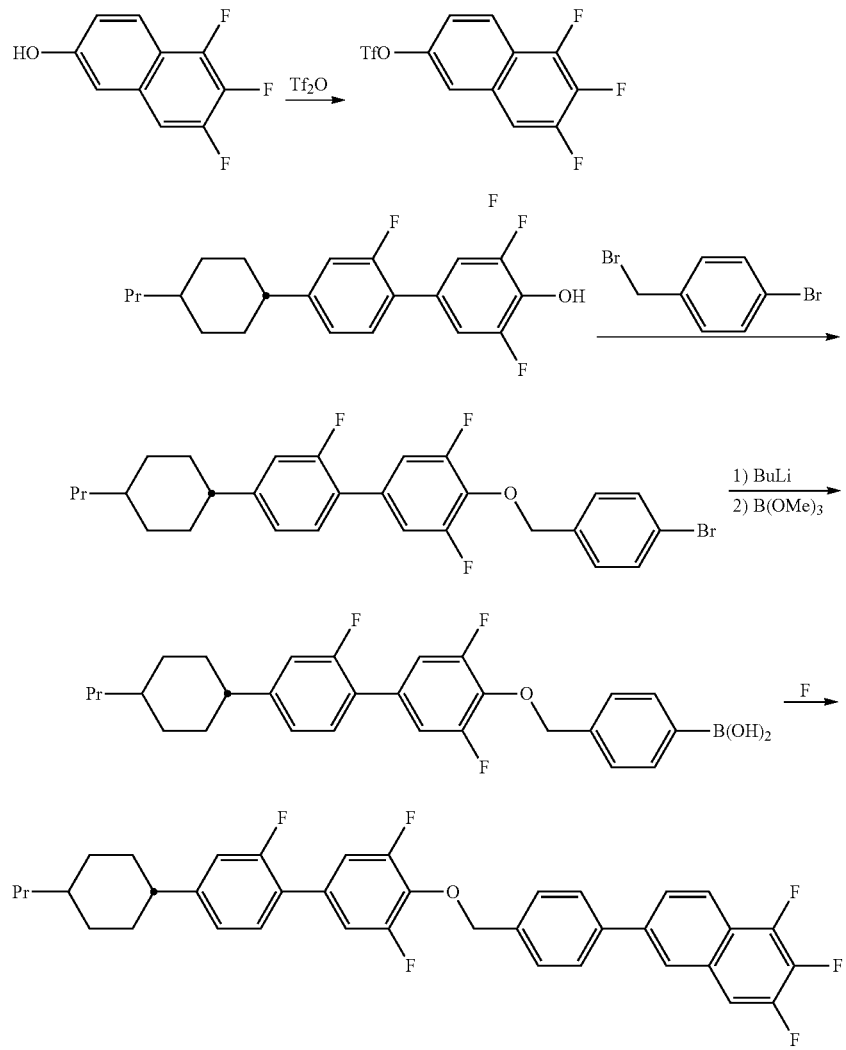

(5-1) Under a nitrogen atmosphere. 5,6,7-trifluoro-2-naphthol (208 g, produced as disclosed in Japanese Unexamined Patent Application Publication No. 2004-91361) and pyridine (125 g were dissolved in dichloromethane (1000 mL), and the solution was cooled with ice. A solution in which trifluoromethanesulfonic anhydride (310 g) had been dissolved in dichloromethane (620 mL) was added thereto at a rate which did not allow the internal temperature to exceed 15° C., and the resulting solution was stirred at room temperature for 7 hours. Then, 15% hydrochloric acid (700 mL) was added thereto under cooling with ice, and the organic layer was separated. The organic layer was washed with saturated aqueous sodium hydrogen carbonate and a saturated salt solution in sequence, and sodium sulfate was added thereto for dehydration. The solvent was distilled off under reduced pressure, and then the product was purified by silica gel column chromatography, thereby yielding a transparent liquid that was trifluoromethanesulfonic acid=5,6,7-trifluoronaphthalene-2-yl ester (297 g, (F)).

(5-2) The 2,6-difluoro-4-[2-fluoro-4-(trans-4-propylcyclohexyl)phenyl]phenol (10 g) obtained in the process (2-1), 4-bromobenzyl bromide (7.2 g), and anhydrous potassium carbonate (5.9 g) were dissolved in DMF (50 mL), and the solution was stirred at 70° C. for 2 hours. The solution was left to stand for cooling to room temperature, water (100 mL) and toluene (100 mL) were added thereto for separation, toluene (100 mL) was added to the water layer for extraction, the organic layer was added thereto and washed with water (100 mL) and a saturated salt solution (100 mL), and anhydrous sodium sulfate was added thereto for dehydration. The solvent was distilled off under reduced pressure, the product was subsequently purified by silica gel column chromatography, and the purified product was recrystallized from a mixed solvent of ethanol/acetone, thereby yielding 14.0 g of a white solid that was [2,6-difluoro-4-(2-fluoro-4-(trans-4-propylcyclohexyl)phenyl)phenyloxy]-(4-bromophenyl)methane.

(5-3) Under a nitrogen atmosphere, the [2,6-difluoro-4-(2-fluoro-4-(trans-4-propylcyclohexyl)phenyl)phenyloxy]-(4-bromophenyl)methane (14.0 g) obtained in the process (5-2) was dissolved in THF (140 mL), and the solution was cooled to −60° C. Then, 1.6 mol/L of an n-butyllithium/hexane solution (20 mL) was added thereto at a rate which did not allow the internal temperature to be −55° C. or higher, and the product was subsequently stirred at −60° C. for an hour. Then, trimethyl borate (3.7 g) was added thereto at a rate which did not allow the internal temperature to be −55° C. or higher, and the temperature was slowly increased to room temperature. Water (70 mL) was added thereto for separation, toluene (100 mL) was added to the water layer for extraction, and the organic layer was added thereto and washed twice with a saturated salt solution (100 mL). Anhydrous sodium sulfate was added thereto for dehydration, and the solvent was distilled off under reduced pressure. The residue was recrystallized from a mixed solvent of hexane/toluene, thereby yielding 11.1 g of a slightly yellow solid that was 4-[2,6-difluoro-4-(2-fluoro-4-(trans-4-propylcyclohexyl)phenyl) phenyloxymethyl]phenylboronic acid.

(5-4) Under a nitrogen atmosphere, the trifluoromethanesulfonic acid=5,6,7-trifluoronaphthalene-2-yl ester (6.9 g, (F)) obtained in the process (5-1), tetrakis(triphenylphosphine)palladium (0) (0.24 g), an aqueous solution of 2M potassium carbonate (16 mL), and THF (35 mL) were mixed with each other, and the mixture was heated to 40° C. Then, a solution in which the 4-[2,6-difluoro-4-(2-fluoro-4-(trans-4-propylcyclohexyl)phenyl)phenyloxymethyl]phenylboronic acid (11.1 g obtained in the process (5-3) had been dissolved in THF (55 mL) was added thereto at a rate which allowed moderate reflux, and the product was stirred at 40° C. for an hour. The resulting solution was left to stand for cooling to room temperature, water (100 mL) and toluene (150 mL) were added thereto for separation, toluene (100 mL) was added to the water layer for extraction, and the organic layer was added thereto and washed twice with a saturated salt solution (150 mL). Anhydrous sodium sulfate was added thereto for dehydration, the solvent was distilled off under reduced pressure, the residue was purified by silica gel column chromatography, and the purified product was recrystallized from acetone and a mixed solvent of hexane/toluene, thereby yielding 7.0 g of a white solid that was [2,6-difluoro-4-(2-fluoro-4-(trans-4-propylcyclohexyl)phenyl)phenyloxy]-[4-(5,6,7-trifluoro-2-naphthyl)phenyl]methane.

MS m/z: 618 [M+]

Example 6

[2,6-difluoro-4-(4-(trans-5-propyltetrahydropyran-2-yl)phenyl)phenyloxy]-[4-(3,4,5-trifluorophenyl)phenyl]methane (62-4)

[Chem. 91]

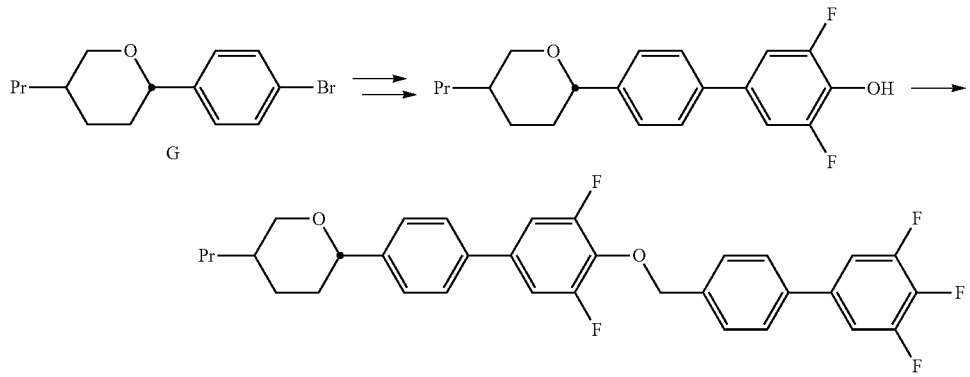

The intermediate G was produced by a method described in the literature (Eur. J. Org. Chem; 2008; 3479-3487), and the subsequent processes were carried out as in Examples 1 to 5 to produce [2,6-difluoro-4-(4-(trans-5-propyltetrahydropyran-2-yl)phenyl)phenyloxy]-[4-(3,4,5-trifluorophenyl)phenyl]methane.

MS m/z: 552 [M+]

Example 7

Preparation-1 of Liquid Crystal Composition

A host liquid crystal composition (H) composed of the following components was prepared.
[Chem. 92]

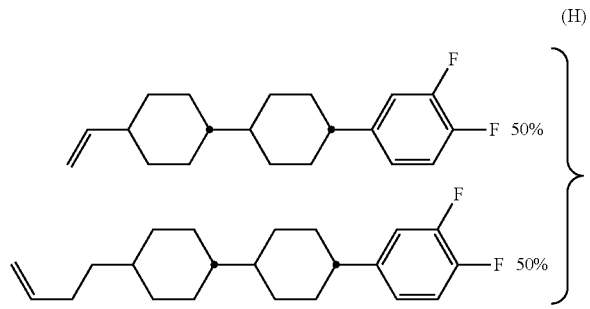

(H)

The liquid crystal composition (H) had the following physical properties.

Upper limit of temperature of nematic phase ($T_{n-i}$): 117.2° C.
Dielectric anisotropy ($\Delta\in$): 4.38
Refractive index anisotropy ($\Delta n$): 0.0899
Viscosity ($\eta_{20}$): 20.3 mPa·s A liquid crystal composition (M-A) composed of the host liquid crystal (H) (90%) and [2,6-difluoro-4-(2-fluoro-4-(trans-4-propylphenyl)phenyl)phenyloxy]-[4-(3,4,5-trifluorophenyl)phenyl]methane (12-3) obtained in Example 1 (10%) was prepared. This composition had the following physical properties.

$T_{n-i}$: 126.4° C.
$\Delta\in$: 6.11
$\Delta n$: 0.104
$\eta_{20}$: 24.6 mPa·s Use of the [2,6-difluoro-4-(2-fluoro-4-(trans-4-propylphenyl)phenyl)phenyloxy]-[4-(3,4,5-trifluorophenyl)phenyl]methane gave the following effects: a large enhancement in $T_{n-i}$ (extrapolated $T_{n-i}$=209° C.), a positive increase in $\Delta\in$ (extrapolated $\Delta\in$=21.7), a large increase in $\Delta n$ (extrapolated $\Delta n$=0.234), and relatively suppressed increase in viscosity (extrapolated $\eta_{20}$=63.3 mPa·s). The prepared liquid crystal composition (M-A) kept in a homogeneous state of nematic liquid crystal for two weeks or longer at room temperature, which showed that good miscibility was exhibited in the liquid crystal composition.

Example 8

Preparation-2 of Liquid Crystal Composition

A liquid crystal composition (M-B) composed of the host liquid crystal (H) (95%) and the [2,6-difluoro-4-(2-fluoro-4-(trans-propylcyclohexyl)phenyl)phenyloxy]-[3,5-difluoro-4-(4-trifluoromethoxyphenyl)phenyl]methane obtained in Example 2 (5%) was prepared. This composition had the following physical properties.

$T_{n-i}$: 121.7° C.
$\Delta\in$: 5.05
$\Delta n$: 0.0923
$\eta_{20}$: 21.5 mPa·s Use of the [2,6-difluoro-4-(2-fluoro-4-(trans-propylcyclohexyl)phenyl)phenyloxy]-[3,5-difluoro-4-(4-trifluoromethoxyphenyl)phenyl]methane gave the following effects: a large enhancement in $T_{n-i}$ (extrapolated $T_{n-i}$=207° C.), a positive increase in $\Delta\in$ (extrapolated $\Delta\in$=17.8), a large increase in $\Delta n$ (extrapolated $\Delta n$=0.138), and relatively suppressed increase in viscosity (extrapolated $\eta_{20}$=43.9 mPa·s). The prepared liquid crystal composition (M-B) kept in a homogeneous state of nematic liquid crystal for two weeks or longer at room temperature.

Example 9

Preparation-3 of Liquid Crystal Composition

A liquid crystal composition (M-C) composed of the host liquid crystal (H) (95%) and the [2,6-difluoro-4(trans-4-propylcyclohexyl)phenyloxy]-[4-(3,5-difluoro-4-(3,4,5-trifluorophenyl)phenyl)phenyl]methane obtained in Example 3 (5%) was prepared. This composition had the following physical properties.

$T_{n-i}$: 120.5° C.
$\Delta\in$: 5.73
$\Delta n$: 0.0950
$\eta_{20}$: 22.9 mPa·s Use of the [2,6-difluoro-4(trans-4-propylcyclohexyl)phenyloxy]-[4-(3,5-difluoro-4-(3,4,5-trifluorophenyl)phenyl)phenyl]methane gave the following effects: a large enhancement in $T_{n-i}$ (extrapolated $T_{n-i}$=186° C.), a positive increase in $\Delta\in$ (extrapolated $\Delta\in$=30.3), a large increase in $\Delta n$ (extrapolated $\Delta n$=0.250), and relatively suppressed increase in viscosity (extrapolated $\eta_{20}$=77.5 mPa·s). The prepared liquid crystal composition (M-C) kept in a homogeneous state of nematic liquid crystal for two weeks or longer at room temperature.

Example 10

Preparation-4 of Liquid Crystal Composition

A liquid crystal composition (M-D) composed of the host liquid crystal (H) (95%) and the [trans-4-(3,5-difluoro-4-(3,5-difluoro-4-(3,4,5-trifluorophenylmethyloxy)phenyl)phenyl)cyclohexyl]-(2,6-difluoro-4-propylphenyloxy)methane obtained in Example 4 (5%) was prepared. This composition had the following physical properties.

$T_{n-i}$: 117.6° C.
$\Delta\in$: 6.22
$\Delta n$: 0.0937
$\eta_{20}$: 21.9 mPa·s Use of the [trans-4-(3,5-difluoro-4-(3,5-difluoro-4-(3,4,5-trifluorophenylmethyloxy)phenyl)phenyl)cyclohexyl]-(2,6-difluoro-4-propylphenyloxy)methane gave the following effects: a large enhancement in $T_{n-i}$ (extrapolated $T_{n-i}$=128° C.), a positive increase in $\Delta\in$ (extrapolated $\Delta\in$=40.1), a large increase in $\Delta n$ (extrapolated $\Delta n$=0.224), and relatively suppressed increase in viscosity (extrapolated $\eta_{20}$=55.9 mPa·s). The prepared liquid crystal composition (M-D) kept in a homogeneous state of nematic liquid crystal for two weeks or longer at room temperature.

Example 11

Preparation-5 of Liquid Crystal Composition

A liquid crystal composition (M-E) composed of the host liquid crystal (H) (95%) and the [2,6-difluoro-4-(2-fluoro-4-(trans-4-propylcyclohexyl)phenyl)phenyloxy]-[4-(5,6,7-trifluoro-2-naphthyl)phenyl]methane obtained in Example 5

(5%) was prepared. The prepared liquid crystal composition (M-E) kept in a homogeneous state of nematic liquid crystal for two weeks or longer at room temperature. In addition, the liquid crystal composition (M-E) was used to produce a liquid crystal display device, and the liquid crystal display device had excellent display properties which were stably maintained for a long time.

Example 12

Preparation-6 of Liquid Crystal Composition

A liquid crystal composition (M-F) composed of the host liquid crystal (H) (95%) and the [2,6-difluoro-4-(4-(trans-5-propyltetrahydropyran-2-yl)phenyl)phenyloxy]-[4-(3,4,5-trifluorophenyl)phenyl]methane obtained in Example 6 (5%) was prepared. The prepared liquid crystal composition (M-F) kept in a homogeneous state of nematic liquid crystal for two weeks or longer at room temperature. In addition, the liquid crystal composition (M-F) was used to produce a liquid crystal display device, and the liquid crystal display device had excellent display properties Which were stably maintained for a long time.

Comparative Example 1

Preparation-6 of Liquid Crystal Composition

A liquid crystal composition (M-G) composed of the host liquid crystal (H) (90%) and 4-[difluoro[(2,3',4,5'-tetrafluoro[1,1'-biphenyl]-4-yl)oxy]methyl]-4''-pentyl-2',3,5-trifluoro-1,1',4',1''-terphenyl (prepared by a method disclosed in WO 2008-105286) (10%)
[Chem. 93]

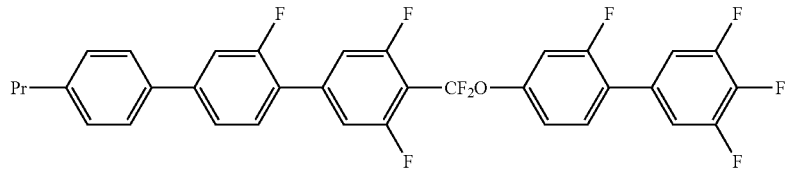

was prepared.
The physical properties of this composition were as follows.
$T_{n-i}$: 118.2° C.
$\Delta\epsilon$: 8.71
$\Delta n$: 0.1053
$\eta_{20}$: 23.7 mPa·s Use of the 4-[difluoro[(2,3',4',5'-tetrafluoro[1,1'-biphenyl]-4-yl)oxy]methyl]-4''-pentyl-2',3,5-trifluoro-1,1',4',1''-terphenyl gave the following effects: an enhancement in $T_{n-i}$ (extrapolated $T_{n-i}$=127.2° C.), a positive increase in $\Delta\epsilon$ (extrapolated $\Delta\epsilon$=47.7), a large increase in $\Delta n$ (extrapolated $\Delta n$=0.244), and relatively suppressed increase in viscosity (extrapolated $\eta_{20}$=53.5 mPa·s). The prepared liquid crystal composition (M-E) was left to stand at room temperature for two weeks with the result that crystals precipitated.

As is clear from comparison of the extrapolated values of the physical properties in Examples 7 and 8 with that in Comparative Example 1, use of the compounds of the present invention enabled sufficiently large increase in $T_{n-i}$ rather than use of the comparative compound. Furthermore, as is clear from comparison of Examples 8 and 10 with Comparative Example 1, the effect of suppressing an increase in viscosity was greater in the compounds of the present invention than in the comparative compound. In addition, the liquid crystal composition containing a compound represented by General. Formula (1) exhibited a stable nematic phase for a long time.

The invention claimed is:
1. A compound represented by General Formula (1)
[Chem. 1]

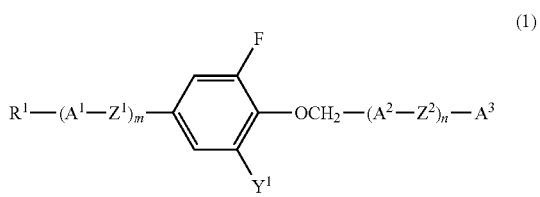

(where $R^1$ represents an alkyl group having 1 to 15 carbon atoms or an alkenyl group having 2 to 15 carbon atoms, and one —CH$_2$— moiety or at least two —CH$_2$— moieties not adjoining each other in $R^1$ are each independently optionally substituted with —O—, —S—, —COO—, —OCO—, or —CO—;

$A^1$ and $A^2$ are each independently a group selected from the group consisting of (a) a 1,4-cyclohexylene group (where one —CH$_2$— moiety or at least two —CH$_2$— moieties not adjoining each other are each independently optionally substituted with —O— or —S—) and (b) a 1,4-phenylene group (where one —CH= moiety or at least two —CH= moieties not adjoining each other are each optionally substituted with —N=, and a hydrogen atom is optionally substituted with a fluorine atom);

$A^3$ is a group represented by General Formula (A-1) or (A-2)

[Chem. 1]

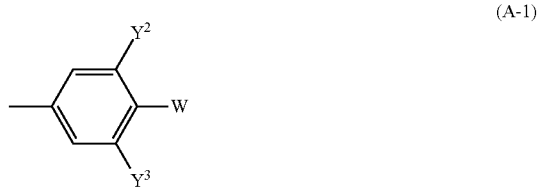

-continued

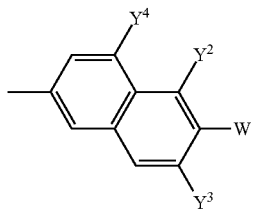

(A-2)

(where W represents a fluorine atom, a chlorine atom, a cyano group, a trifluoromethyl group, a trifluoromethoxy group, or a difluoromethoxy group, and $Y^2$, $Y^3$, and $Y^4$ each independently represent a hydrogen atom, a fluorine atom, or a chlorine atom);

$Z^1$ and $Z^2$ each independently represent —$CH_2O$—, —$OCH_2$—, —$OCF_2$—, —COO—, —OCO—, —$CH_2CH_2$—, —$CF_2CF_2$—, —CH=CH—, —CF=CF—, —C≡C—, or a single bond;

$Y^1$ represents a hydrogen atom, a fluorine atom, or a chlorine atom; and m and n each independently represent 0, 1, 2, or 3 and satisfy the relationship of m+n=3, wherein in the case where multiple $A^1$ moieties are present, the $A^1$ moieties are the same as or different from each other; in the case where multiple $A^2$ moieties are present, the $A^2$ moieties are the same as or different from each other; in the case where multiple $Z^1$ moieties are present, the $Z^1$ moieties are the same as or different from each other; and in the case where multiple $Z^2$ moieties are present, the $Z^2$ moieties are the same as or different from each other, wherein the compound excludes a compound that satisfies each of the following conditions: in is 1; n is 2; $A^2$ in the -($A^2$-$Z^2$)- moiety directly connected to $A^3$ is a 1,4-phenylene group (where a hydrogen atom is optionally substituted with a fluorine atom); $Z^2$ in the -($A^2$-$Z^2$)- moiety directly connected to $A^3$ is a single bond; $Z^1$ and $Z^2$ are each independently —$CH_2O$—, —$OCH_2$—, —$OCF_2$—, —$CH_2CH_2$—, —$CF_2CF_2$—, —CH=CH—, —CF=CF—, —C≡C—, or a single bond; $A^3$ is a group represented by General Formula (A-2); and W in General Formula (A-2) is a fluorine atom).

2. The compound according to claim 1, wherein $A^1$ and $A^2$ in General Formula (1) each independently represent a group selected from the following groups

[Chem. 1]

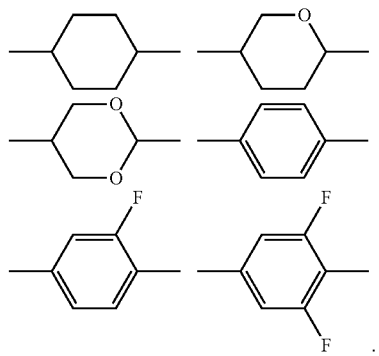

3. The compound according to claim 1, wherein $Y^1$ in General Formula (1) represents a fluorine atom.

4. The compound according to claim 1, wherein, in General Formula (1), $A^3$ is a group represented by General Formula (A-2), and $Y^4$ represents a hydrogen atom.

5. The compound according to claim 1, wherein $Z^1$ and $Z^2$ in General Formula (1) each independently represent —$CH_2O$—, $OCH_2$—, —$CF_2O$—, —$OCF_2$—, or a single bond.

6. The compound according to claim 1, wherein at least any one of $Y^2$ and $Y^3$ in General Formula (1) represents a fluorine atom.

7. The compound according to claim 1, wherein each of $Y^2$ and $Y^3$ in General Formula (1) represents a fluorine atom.

8. The compound according to claim 1, wherein W in General Formula (1) represents a fluorine atom, a trifluoromethoxy group, or a trifluoromethyl group.

9. A liquid crystal composition comprising at least one compound according to claim 1.

10. A liquid crystal display device comprising the liquid crystal composition according to claim 9.

* * * * *